(12) United States Patent
Wizgall et al.

(10) Patent No.: US 11,578,647 B2
(45) Date of Patent: Feb. 14, 2023

(54) ENGINE

(71) Applicant: Arctic Cat Inc., St. Cloud, MN (US)

(72) Inventors: Eberhard Wizgall, Berlin (DE); Dominik Hermann, Berlin (DE)

(73) Assignee: Arctic Cat Inc., St. Cloud, MN (US)

( * ) Notice: Subject to any disclaimer, the term of this patent is extended or adjusted under 35 U.S.C. 154(b) by 0 days.

(21) Appl. No.: 16/816,201

(22) Filed: Mar. 11, 2020

(65) Prior Publication Data
US 2021/0285368 A1    Sep. 16, 2021

(51) Int. Cl.
*F01P 7/02* (2006.01)
*F02B 75/16* (2006.01)
*F01M 9/10* (2006.01)
*F01L 1/02* (2006.01)
*F02D 13/02* (2006.01)
*F02F 7/00* (2006.01)
*F01M 1/06* (2006.01)
*F01M 1/08* (2006.01)
*F01M 11/00* (2006.01)
*F01M 11/12* (2006.01)
*B60K 17/24* (2006.01)
*F01L 1/047* (2006.01)
*F01L 1/24* (2006.01)
(Continued)

(52) U.S. Cl.
CPC .............. *F02B 75/16* (2013.01); *B60K 17/24* (2013.01); *F01L 1/022* (2013.01); *F01L 1/047* (2013.01); *F01L 1/2405* (2013.01); *F01M 1/06* (2013.01); *F01M 1/08* (2013.01); *F01M 9/10* (2013.01); *F01M 11/0004* (2013.01); *F01M 11/12* (2013.01); *F01P 5/12* (2013.01); *F02D 13/0226* (2013.01); *F02D 13/0242* (2013.01); *F02F 7/0043* (2013.01); *F04D 29/046* (2013.01); *F04D 29/061* (2013.01); *F04D 29/669* (2013.01); *F16C 3/14* (2013.01); *F16F 15/264* (2013.01); *F01M 2001/062* (2013.01); *F01M 2011/0087* (2013.01)

(58) Field of Classification Search
CPC ........ F01P 7/00; F01P 7/14; F01P 3/10; F01P 3/12
USPC ............................. 123/41.01, 41.16, 196 AB
See application file for complete search history.

(56) References Cited

U.S. PATENT DOCUMENTS 3,361,007 A    1/1968   Belsanti et al.
3,730,462 A    5/1973   Dick
(Continued)

FOREIGN PATENT DOCUMENTS

EP    0636769 A2    2/1995
GB    2479005 A     9/2011
(Continued)

OTHER PUBLICATIONS

1982 Honda XL250 OEM Parts, Jorgensen's Richfield, Utah, accessed Apr. 10, 2019, URL <https://www.jhsport.com/oem-parts#/Honda_Powersports/XL250RA_(82)_MOTORCYCLE%2c_VIN%23_JH2MD030-CM000002_TO_JH2M . . . >.
(Continued)

*Primary Examiner* — John Kwon
(74) *Attorney, Agent, or Firm* — Lowe Graham Jones PLLC

(57) ABSTRACT

Embodiments are directed toward an engine. In some embodiments, the engine includes a water pump and a balancer shaft. In some embodiments, the water pump has a plain bearing. In some embodiments, plain bearing is supplied with pressurized oil. In some embodiments, the balancer shaft drives the water pump as well as cam shafts.

43 Claims, 57 Drawing Sheets

(51) Int. Cl.
  *F04D 29/06* (2006.01)
  *F04D 29/046* (2006.01)
  *F04D 29/66* (2006.01)
  *F16C 3/14* (2006.01)
  *F16F 15/26* (2006.01)
  *F01P 5/12* (2006.01)

(56) References Cited

U.S. PATENT DOCUMENTS

| | | |
|---|---|---|
| 3,762,671 A | 10/1973 | Schulz |
| 4,201,176 A | 5/1980 | Lustgarten |
| 4,359,018 A | 11/1982 | Wade |
| 4,497,293 A | 2/1985 | Takagi et al. |
| 4,515,110 A | 5/1985 | Perry |
| 4,530,319 A | 7/1985 | Honda |
| 4,584,972 A | 4/1986 | Jayne et al. |
| 4,610,421 A | 9/1986 | Ohta et al. |
| 4,612,884 A | 9/1986 | Ajiki et al. |
| 4,621,598 A | 11/1986 | Miura |
| 4,622,933 A | 11/1986 | Fukuo et al. |
| 4,628,876 A | 12/1986 | Fujikawa et al. |
| 4,662,320 A | 5/1987 | Moriya |
| 4,722,306 A | 2/1988 | Fujikawa et al. |
| 4,727,830 A | 3/1988 | Nagahiro et al. |
| 4,727,831 A | 3/1988 | Nagahiro et al. |
| 4,729,349 A | 3/1988 | Sonoda et al. |
| 4,744,547 A | 5/1988 | Hartel |
| 4,776,306 A | 10/1988 | Matsuura et al. |
| 4,776,310 A | 10/1988 | Gray |
| 4,785,790 A | 11/1988 | Pfeffer et al. |
| 4,790,274 A | 12/1988 | Inoue et al. |
| 4,807,576 A | 2/1989 | Sonoda et al. |
| 4,829,948 A | 5/1989 | Yoshida et al. |
| 4,836,324 A | 6/1989 | Morita et al. |
| 4,854,272 A | 8/1989 | Konno |
| 4,858,574 A | 8/1989 | Fukuo et al. |
| 4,896,634 A | 1/1990 | Kronich |
| 4,901,819 A | 2/1990 | Tamba et al. |
| 4,942,854 A | 7/1990 | Shirai et al. |
| RE33,310 E | 8/1990 | Ajiki et al. |
| 4,958,810 A | 9/1990 | Gold et al. |
| RE33,411 E | 10/1990 | Inoue et al. |
| 4,969,430 A | 11/1990 | Masuda |
| RE33,499 E | 12/1990 | Nakano et al. |
| 5,007,392 A | 4/1991 | Niizato et al. |
| 5,044,813 A | 9/1991 | Gregg |
| 5,049,100 A | 9/1991 | Yamamoto et al. |
| 5,074,254 A | 12/1991 | Takamatsu |
| 5,081,971 A | 1/1992 | Inoue et al. |
| 5,125,374 A | 6/1992 | Saito |
| 5,172,663 A | 12/1992 | Fujiwara |
| 5,191,859 A | 3/1993 | Fujiwara |
| 5,203,228 A | 4/1993 | Miyawaki et al. |
| 5,305,847 A | 4/1994 | Mefford |
| 5,355,847 A | 10/1994 | Ozeki |
| 5,529,032 A | 6/1996 | Oikawa et al. |
| 5,575,254 A | 11/1996 | Tsuchida et al. |
| 5,619,976 A | 4/1997 | Kitagawa et al. |
| 5,690,084 A | 11/1997 | Gunji et al. |
| 5,758,612 A | 6/1998 | Tsuzuku et al. |
| 5,799,547 A | 9/1998 | Agarrat |
| 5,826,560 A | 10/1998 | Ito |
| 5,836,218 A | 11/1998 | Lee |
| 5,884,587 A | 3/1999 | Ichihara |
| 5,915,495 A | 6/1999 | Kerlin et al. |
| 5,934,957 A | 8/1999 | Sato et al. |
| 5,951,264 A | 9/1999 | Hori et al. |
| 6,006,715 A | 12/1999 | Izumi et al. |
| 6,213,063 B1 | 4/2001 | Nakano et al. |
| 6,213,240 B1 | 4/2001 | Buell |
| 6,244,225 B1 | 6/2001 | Takahashi et al. |
| 6,247,430 B1 | 6/2001 | Yapici |
| 6,257,192 B1 | 7/2001 | Yamamura et al. |
| 6,267,087 B1 | 7/2001 | Takahashi et al. |
| 6,305,332 B1 | 10/2001 | Nishi et al. |
| 6,390,869 B2 | 5/2002 | Korenjak et al. |
| 6,405,702 B2 | 6/2002 | Takano et al. |
| 6,705,266 B2 | 3/2004 | Tachikawa et al. |
| 6,913,068 B2 | 7/2005 | Togawa et al. |
| 6,923,287 B2 | 8/2005 | Morii |
| 6,941,924 B2 | 9/2005 | Morii et al. |
| 6,962,131 B2 | 11/2005 | Aketa et al. |
| 7,021,267 B2 | 4/2006 | Kawakubo et al. |
| 7,044,088 B2 | 5/2006 | Aketa et al. |
| 7,051,687 B2 | 5/2006 | Shimizu et al. |
| 7,066,121 B2 | 6/2006 | Michelini et al. |
| 7,104,355 B2 | 9/2006 | Hoi |
| 7,111,612 B2 | 9/2006 | Michelini et al. |
| 7,121,262 B2 | 10/2006 | Michelini et al. |
| 7,140,463 B2 | 11/2006 | Morii et al. |
| 7,152,569 B2 | 12/2006 | Leiber et al. |
| 7,159,558 B2 | 1/2007 | Suzuki et al. |
| 7,163,074 B2 | 1/2007 | Inomori et al. |
| 7,194,985 B2 | 3/2007 | Ivachigai et al. |
| 7,198,020 B1 | 4/2007 | Beddick |
| 7,201,119 B2 | 4/2007 | Tawarada et al. |
| 7,237,638 B2 | 7/2007 | Ishikawa et al. |
| 7,255,068 B2 | 8/2007 | Ashida |
| 7,267,095 B2 | 9/2007 | Takahashi et al. |
| 7,328,691 B2 | 2/2008 | Hataura et al. |
| 7,357,379 B2 | 4/2008 | Asano et al. |
| 7,363,903 B2 | 4/2008 | Matsuda |
| 7,370,617 B2 | 5/2008 | Maehara et al. |
| 7,398,753 B2 | 7/2008 | Masuda et al. |
| 7,430,993 B2 | 10/2008 | Yasui |
| 7,431,116 B2 | 10/2008 | Ashida |
| 7,469,681 B2 | 12/2008 | Hataura et al. |
| 7,484,495 B2 | 2/2009 | Kamio et al. |
| 7,490,688 B2 | 2/2009 | Yamamoto |
| 7,506,718 B2 | 3/2009 | Morita et al. |
| 7,556,013 B2 | 7/2009 | Negoro et al. |
| 7,575,088 B2 | 8/2009 | Mir et al. |
| 7,578,277 B2 | 8/2009 | Inui et al. |
| 7,597,069 B2 | 10/2009 | Ashida |
| 7,600,500 B2 | 10/2009 | Mizuno et al. |
| 7,617,803 B2 | 11/2009 | Fujimoto et al. |
| 7,644,796 B2 | 1/2010 | Taniguchi |
| 7,673,594 B2 | 3/2010 | Hirayama et al. |
| 8,166,927 B2 | 5/2012 | Fukuoka |
| 8,231,419 B2 | 7/2012 | Nakamura |
| 8,276,553 B2 | 10/2012 | Yamanishi et al. |
| 8,424,626 B2 | 4/2013 | Nomura et al. |
| 8,453,438 B2 | 6/2013 | Tsubakino et al. |
| 8,522,911 B2 | 9/2013 | Hurd et al. |
| 8,807,114 B2 | 8/2014 | Itakura |
| 8,844,475 B2 | 9/2014 | Mukouhara et al. |
| 8,960,149 B2 | 2/2015 | Sugishita et al. |
| 9,080,497 B2 | 7/2015 | Yamashiro et al. |
| 9,163,552 B2 | 10/2015 | Iida et al. |
| 9,194,278 B2 | 11/2015 | Fronk et al. |
| 9,211,924 B2 | 12/2015 | Safranski et al. |
| 9,228,481 B2 | 1/2016 | Itakura |
| 9,261,045 B2 | 2/2016 | Kisaichi et al. |
| 9,266,421 B2 | 2/2016 | Sugiura |
| 9,279,360 B2 | 3/2016 | Miura et al. |
| 9,540,089 B2 | 1/2017 | Oguma et al. |
| 9,546,632 B2 | 1/2017 | Yamada et al. |
| 9,581,187 B2 | 2/2017 | Kessler et al. |
| 9,718,351 B2 | 8/2017 | Ripley et al. |
| 9,719,463 B2 | 8/2017 | Oltmans et al. |
| 9,771,854 B2 | 9/2017 | Sakurai et al. |
| 9,810,111 B2 | 11/2017 | Sotani et al. |
| 10,161,476 B2 | 12/2018 | Maeda et al. |
| 10,208,647 B2 | 2/2019 | Okita et al. |
| 2005/0016491 A1 | 1/2005 | Leiber et al. |
| 2005/0109554 A1 | 5/2005 | Ishikawa et al. |
| 2005/0126842 A1 | 6/2005 | Rasidescu et al. |
| 2005/0199431 A1 | 9/2005 | Hoi |
| 2006/0058138 A1 | 3/2006 | Morita et al. |
| 2007/0122294 A1* | 5/2007 | Wizgall .......... F01P 5/12 |
| | | 417/362 |
| 2007/0144461 A1 | 6/2007 | Ashida |
| 2007/0221146 A1 | 9/2007 | Ashida |

(56) References Cited

U.S. PATENT DOCUMENTS

| | | | |
|---|---|---|---|
| 2008/0060606 A1* | 3/2008 | Inui | F01M 11/02 |
| | | | 123/196 A |
| 2008/0184956 A1* | 8/2008 | Inui | F02F 1/24 |
| | | | 123/193.5 |
| 2008/0257298 A1* | 10/2008 | Inui | F02B 61/02 |
| | | | 184/6.5 |
| 2009/0028483 A1 | 1/2009 | Kawaguchi et al. | |
| 2009/0084338 A1 | 4/2009 | Tsubakino et al. | |
| 2010/0126459 A1 | 5/2010 | Fukuoka | |
| 2010/0224164 A1 | 9/2010 | Rabhi | |
| 2012/0031688 A1 | 2/2012 | Safranski et al. | |
| 2012/0031693 A1 | 2/2012 | Deckard et al. | |
| 2012/0073527 A1 | 3/2012 | Oltmans et al. | |
| 2013/0087393 A1 | 4/2013 | Vanderstegen-Drake et al. | |
| 2014/0261258 A1 | 9/2014 | Fronk et al. | |
| 2014/0345548 A1 | 11/2014 | Miura et al. | |
| 2015/0377295 A1 | 12/2015 | Baubet | |
| 2016/0084147 A1* | 3/2016 | Sotani | F01M 1/02 |
| | | | 123/196 A |
| 2017/0067378 A1 | 3/2017 | Ishihara et al. | |
| 2017/0114706 A1 | 4/2017 | Okita et al. | |
| 2017/0234205 A1 | 8/2017 | Sugiura et al. | |
| 2018/0003127 A1 | 1/2018 | Sakurai | |
| 2018/0328258 A1 | 11/2018 | Nugteren et al. | |
| 2018/0328272 A1 | 11/2018 | Kaeser et al. | |
| 2019/0010859 A1 | 1/2019 | Okita et al. | |

FOREIGN PATENT DOCUMENTS

| | | |
|---|---|---|
| JP | 2000108689 A | 4/2000 |
| JP | 2002201955 A | 7/2002 |
| JP | 2005306373 A | 11/2005 |
| WO | 2012110675 A1 | 8/2012 |

OTHER PUBLICATIONS

1982 Honda XL500 OEM Parts, Jorgensen's Richfield, Utah, accessed Apr. 10, 2019, URL <https://www.jhsport.com/oem-parts#/Honda_Powersports/XL500RA_(82)_MOTORCYCLE%2c_JPN%2c_JH2PD020-CM000032_TO_JH2PD . . . >.

1982 Honda XR250 OEM Parts, Jorgensen's Richfield, Utah, accessed Apr. 10, 2019, URL <https://www.jhsport.com/oem-parts#/Honda_Powersports/XR250RA_(82)_MOTORCYCLE%2c_VIN%23_JH2ME101-CM3000008/CRANKCA . . . >.

1982 Honda XR500 OEM Parts, Jorgensen's Richfield, Utah, accessed Apr. 10, 2019, URL <https://www.jhsport.com/3em-parts#/Honda_Powersports/XR500RA_(82)_MOTORCYCLE%2c_VIN%23_JH2PE101-CM300008_TO_JH2PE . . . >.

2010 ATV 700 Diesel EFT Green, Arctic Cat, accessed Oct. 4, 2016, URL <http://store.arcticcat.com/parts#/Arctic_Cat/2010_ATV_700_DIESEL_ . . . >.

Pereira, L., Pires, L., Pinto, A., Hanriot, S. et al., "Effects of Intake Valves Phase Shift on Engine Air Charge," SAE Technical Paper 2004-01-2929, Oct. 25, 2004.

Engine Mount/Transmission Mount Location, Just Answer.

Honda Parts Finder Crankcase, Honda Parts, accessed Oct. 4, 2016, URL <http://www.hondaparts-direct.com/OEMpartfinder.htm?aribrand=HOM&arian=fl%20models/Honda/FL400RA_(90)_FL_Models,_JPN,_VIN%23_JH3TE160- . . . >.

Honda Parts Finder Frame, Honda Parts, accessed Oct. 4, 2016, URL <http://www.hondaparts-direct.com/OEMpartfinder.htm?aribrand=HOM&arian=f%20models#/Honda/FL400RA_(90)_FL_MODELS,_JPN,_VIN523_JH3TE160- . . . >.

HondaPartsFinder Reduction Case, Honda Parts, accessed Oct. 4, 2016, URL <http://www.hondaparts-direct.com/OEMpartfinder.htm?aribrand=HOM&arian=fl%models#/Honda/FL400RA_(90)_FL_MODELS,_JPN,_VIN%23_JH3TE160- . . . >.

DEA—Transmission Mount, DEA, accessed Aug. 21, 2014, URL <http://www.carid.com/dea/transmission-mount.html>.

Mercedes Benz Balance Shaft Engine Issues. How to Check by VIN. M272/273, MB Medic, accessed Jun. 25, 2020, URL <www.mercedesmedic.com/check-my-mercedes-benz-for-balance-shaft-issue-by-vin-m272273/>.

Engines with Balance Shafts (India-specific), Team-BHP.com, Posted Mar. 16, 2017-Apr. 4, 2017, accessed Jun. 25, 2020, URL <https://www.team-bhp.com/forum/technical-stuff/185106-engines-balance-shafts-india-specific-2.html>.

* cited by examiner

ENGINE

FIELD OF THE INVENTION

The invention relates generally to engines for vehicles including off-road vehicles, such as all-terrain vehicles and side-by-side utility and sport vehicles.

BACKGROUND OF THE INVENTION

Some measures of performance of off-road vehicles (for example, off-highway vehicles such as all-terrain vehicles (ATVs), side-by-side utility vehicles (UTVs), snowmobiles, or others) improve as the weight of the vehicle decreases and as engine power increases. Additionally, off-road vehicles can operate in harsh conditions and terrain. Therefore, there remains a need for improved engines having proper lubrication and cooling, while providing smooth power delivery, as well as ample power and torque.

SUMMARY OF THE INVENTION

It is therefore an object of the present invention to provide engines for off-road vehicles having the requisite horsepower and torque.

In some versions, the engine has a water pump and a balancer shaft. In some embodiments, the water pump has a plain bearing that is supplied with pressurized oil. In some embodiments, the balancer shaft drives the water pump.

In some versions, the engine has an engine housing. In some embodiments, the engine housing has an exterior surface and a spacer that defines a support surface that is spaced apart from the exterior surface of the engine housing. In some embodiments, the water pump is coupled to the support surface and spaced apart from the exterior surface of the engine housing.

In some versions, the water pump has a coolant return port. In some embodiments, the coolant return port is coaxial with the spacer.

In some versions, the balancer shaft is housed in the engine housing. In some embodiments, the water pump has an impeller. In some embodiments, the balancer shaft drives the impeller of the water pump.

In some versions, the engine includes a water pump drive shaft. In some embodiments, the water pump drive shaft extends through the spacer. In some embodiments, the water pump drive shaft drives the impeller. In some versions, the engine includes a balancer driven gear. In some embodiments, the balancer driven gear is housed in the engine housing. In some embodiments, the balancer driven gear drives the water pump drive shaft. In some embodiments, the balancer shaft drives the balancer driven gear.

In some versions, the water pump has a plain bearing that is supplied with pressurized oil. In some embodiments, the water pump drive shaft has the plain bearing that is supplied with pressurized oil. In some embodiments, the spacer has a tubular structure. In some embodiments, the tubular structure defines the plain bearing. In some embodiments, the water pump drive shaft has a proximal end portion and an opposite distal end portion coupled to the impeller. In some embodiments, the water pump drive shaft extends through the plain bearing. In some embodiments, the engine includes a radial seal ring. In some embodiments, the radial seal ring is disposed opposite the plain bearing from the proximal end portion of the water pump drive shaft. In some versions, the engine includes a water pump seal. In some embodiments, the water pump seal is disposed between the impeller and the radial seal ring.

In some versions, the spacer includes a male spacer portion and a female spacer portion that is configured to receive the male spacer portion. In some versions, one of the male spacer portion or the female spacer portion is integral to the engine housing. In some embodiments, another of the male spacer portion or the female spacer portion is separable from the engine housing. In some versions, the separable spacer portion (for example, the male spacer portion) defines the support surface. In some embodiments, the support surface includes a flange. In some embodiments, at least a portion of the support surface (for example, the flange) defines a portion of a water pump housing that houses the impeller of the water pump.

In some versions, the engine housing includes a crankcase. In some embodiments, the crankcase defines the exterior surface. In some embodiments, the spacer extends from the exterior surface of the crankcase. In some versions, the engine housing includes a gear housing (for example, a portion of the crankcase may include the gear housing) that houses one or more gears. In some embodiments, the gear housing defines the exterior surface. In some embodiments, the spacer extends from the exterior surface of the gear housing.

In some versions, the engine housing has a first side portion and a second side portion that is opposite the first side portion. In some embodiments, the gear housing is disposed on the first side portion of the engine housing. In some embodiments, the gear housing defines the exterior surface. In some embodiments, the exterior surface faces the second side portion of the engine housing.

In some versions, the engine includes a timing chain. In some embodiments, the balancer shaft drives the timing chain and, in some embodiments, drives both the timing chain and the impeller of the water pump.

In some versions, the engine includes one or more camshafts, a first intake valve, and a second intake valve. In some embodiments, the timing chain drives the one or more camshafts. In some embodiments, each of the first intake valve and the second intake valve is transitionable between a respective closed configuration and a respective open configuration. In some embodiments, each of the first intake valve and the second intake valve has a respective lift amplitude corresponding to the respective open configuration. In some embodiments, the one or more camshafts define the respective lift amplitudes of the first intake valve and the second intake valve. In some embodiments, the respective lift amplitude of the first intake valve is greater than the respective lift amplitude of the second intake valve.

In some versions, the engine preferably includes a cylinder bore and a crankshaft. The cylinder bore preferably defines a central axis. In some embodiments, the crankshaft defines a rotational axis. In some embodiments, the rotational axis of the crankshaft extends along a plane that is parallel to the central axis of the cylinder bore. In some embodiments, the central axis of the cylinder bore is offset from the plane.

In some versions, the crankcase has a split that extends along a plane. In some embodiments, the balancer shaft defines a rotational axis. In some embodiments, the rotational axis of the balancer shaft and the rotational axis of the crankshaft extend along the plane along which the split of the crankcase extends.

In some versions, the crankshaft is monolithic. In some embodiments, the engine is a single-cylinder engine (i.e., the engine has no more than one cylinder).

In some versions, the crankshaft defines an oil bore. In some embodiments, the oil bore extends along the rotational axis of the crankshaft. In some versions, the crankshaft has a bearing (for example, a main bearing or a support bearing). In some embodiments, the oil bore has an outlet. In some embodiments, the outlet is spaced apart from the bearing. In some embodiments, the oil bore provides pressurized oil from the bearing to the outlet.

In some embodiments, the engine includes a rotor, a nozzle, and an oil flow path. In some embodiments, the nozzle is configured to spray pressurized oil onto the rotor. In some embodiments, the oil flow path provides pressurized oil to a bearing of the crankshaft (for example, a main bearing or a support bearing). In some embodiments, the oil flow path provides pressurized oil from a bearing of the crankshaft (for example, a main bearing or a support bearing) to the nozzle.

In some versions, the engine includes an oil pan assembly. In some embodiments, the oil pan assembly includes an upper oil pan portion and a lower oil pan portion. In some embodiments, the upper oil pan portion has an open top portion and an open bottom portion. In some embodiments, the open top portion has a closed bottom. In some embodiments, the open bottom portion has a closed top. In some embodiments, the lower oil pan portion is coupled to and separable from the open bottom portion of the upper oil pan portion.

In some versions, the closed bottom of the open top portion of the upper oil pan portion has a drive shaft recess. In some embodiments, the drive shaft recess is configured to at least partially receive a drive shaft of the vehicle. In some versions, the lower oil pan portion is laterally offset from the drive shaft recess. In some embodiments, the lower oil pan portion extends below the drive shaft recess.

In some versions, the closed top of the open bottom portion of the upper oil pan portion defines a dipstick access port. In some versions, the open top portion of the upper oil pan portion defines a first oil drain. In some embodiments, the lower oil pan portion defines a second oil drain. In some versions, the lower oil pan portion has a bottom that extends along a plane. In some embodiments, at least a portion of the closed bottom of the open top portion of the upper oil pan portion has a slope relative to the plane. In some embodiments, the slope facilitates providing oil from the open top portion of the upper oil pan portion to the lower oil pan portion. In some embodiments, the slope angles toward the lower oil pan portion along a path through the upper oil pan portion that extends from a lateral side of the engine toward the lower oil pan portion. In some versions, the slope facilitates providing oil from the open top portion of the upper oil pan portion over the drive shaft recess to the lower oil pan portion. In some embodiments, the sloped bottom of the open top pan portion of the upper oil pan portion extends over the drive shaft recess and angles toward the oil pan portion.

In some versions, the engine has an intake valve and an exhaust valve. In some embodiments, the balancer shaft drives the intake valve and the exhaust valve.

In some versions, the engine has only a single balancer shaft.

In some versions, a cam shaft is driven by the balancer shaft and drives the exhaust valve. In some versions, a decompression system is coupled to the cam shaft and is configured to prevent closure of the exhaust valve until the cam shaft meets or exceeds a predetermined number rotations per minute. In some versions, a hydraulic valve lash adjuster configured to adjust valve lash of the exhaust valve.

BRIEF DESCRIPTION OF THE DRAWINGS

Examples of the present invention are described in detail below with reference to the following drawings.

DETAILED DESCRIPTION OF THE PREFERRED EMBODIMENTS

Figure 1:
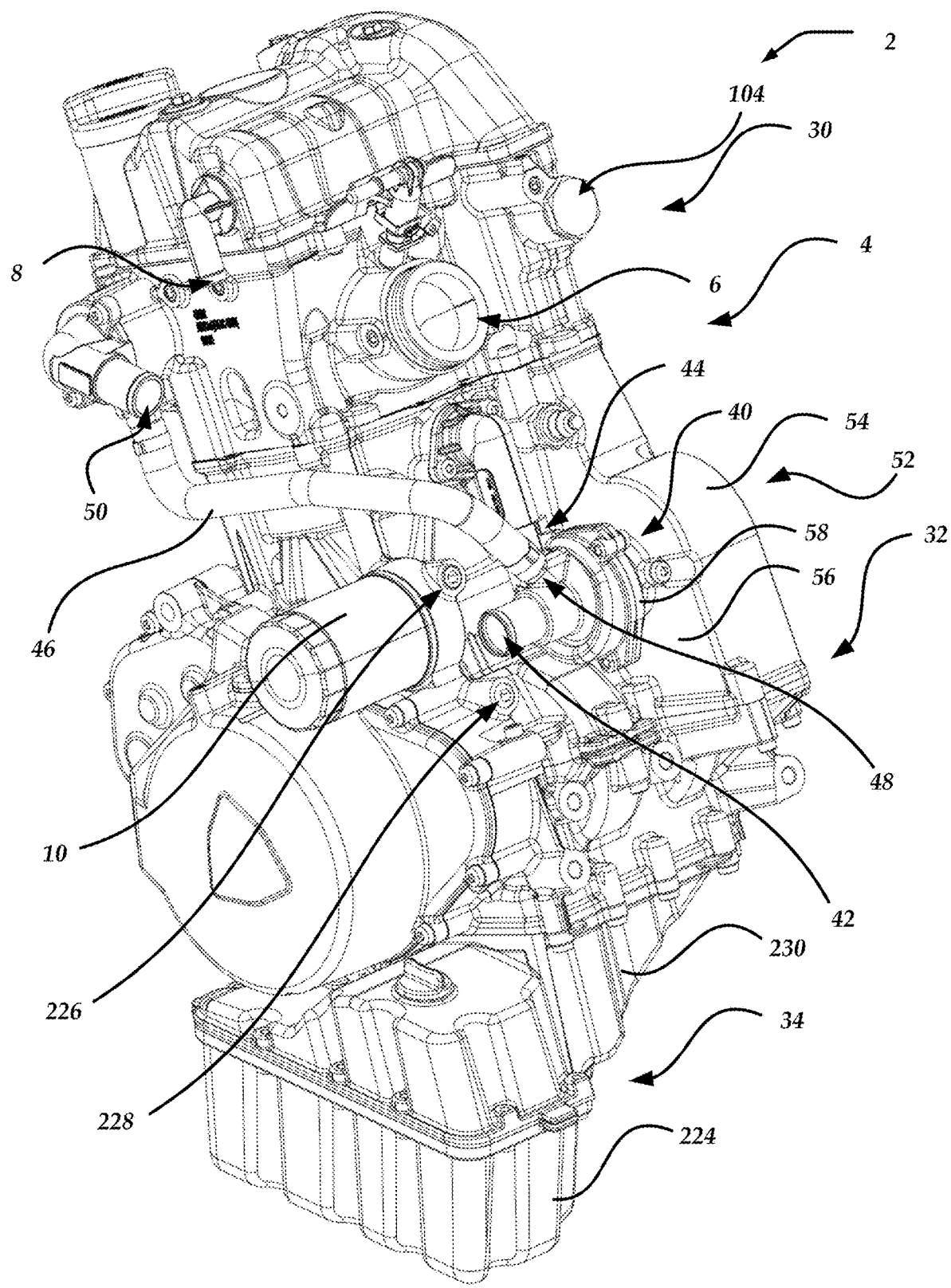
FIG. 1 is a front isometric view of an exemplary engine.
Figure 2:
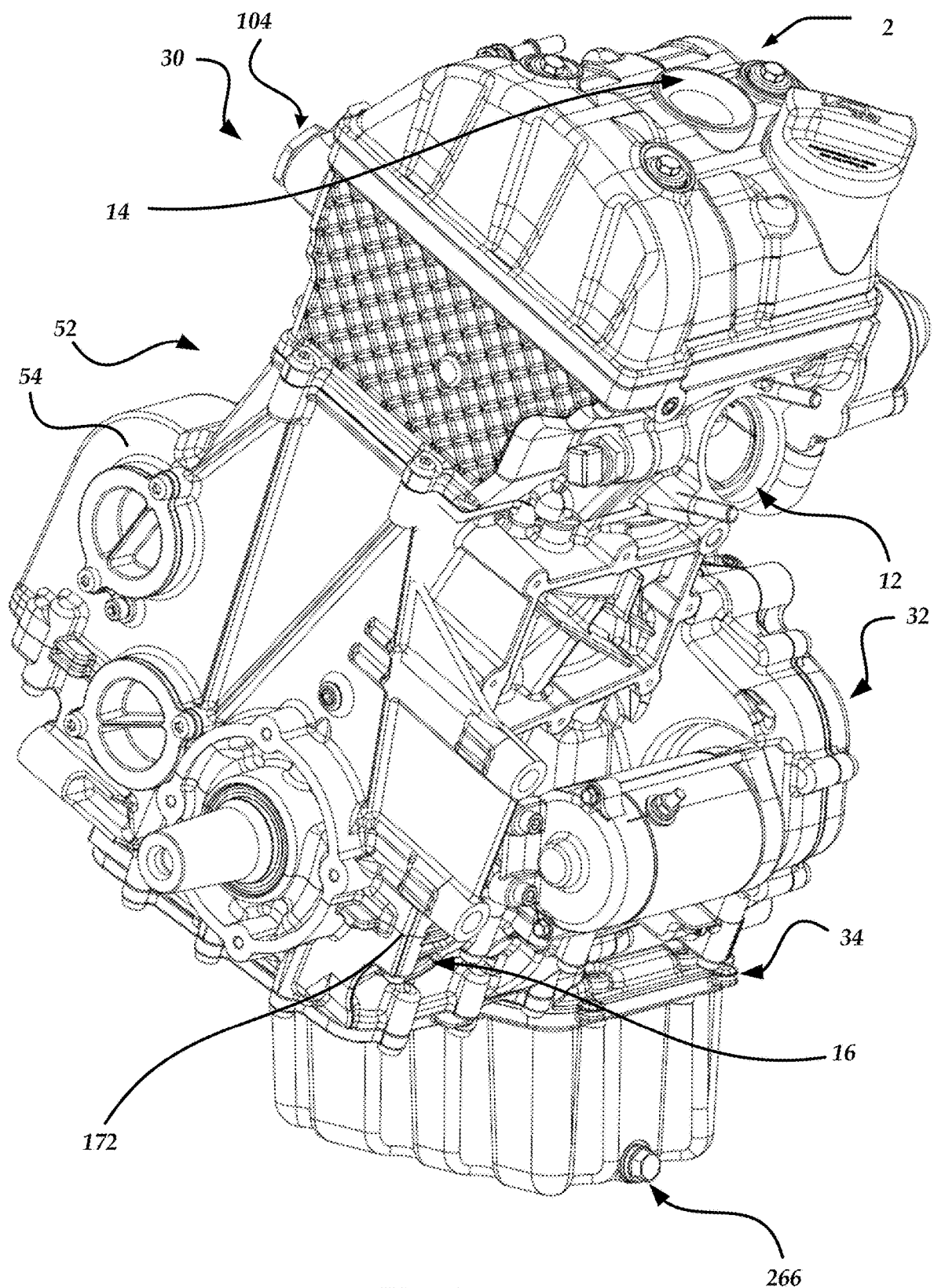
FIG. 2 is a rear isometric view of the engine of FIG. 1.

As shown in FIGS. 1 and 2, an engine 2 has an engine housing 4 that houses moving components that facilitate translation of combustion energy to rotational energy. In some embodiments, components visible from the exterior of the engine 2 include an intake port 6 (for example, an air intake connector or throttle body connector), a blowby port 8, an oil filter 10, an exhaust port 12 (for example, an exhaust manifold connector) (see FIG. 2), a sparkplug access hole 14, and a crank sensor port 16 (see FIGS. 1, 2 and 7). In some embodiments, the housing 4 has an upper engine portion 30 and a lower engine portion 32 disposed below and, in some versions, coupled (for example, bolted) to the upper engine portion 30. In some embodiments, an oil pan assembly 34 is disposed below and, in some versions, coupled to the lower engine portion 32. In some embodiments, the engine 2 has a water pump 40 that is external to and, in some versions, coupled to the engine housing 4.

Figure 3:
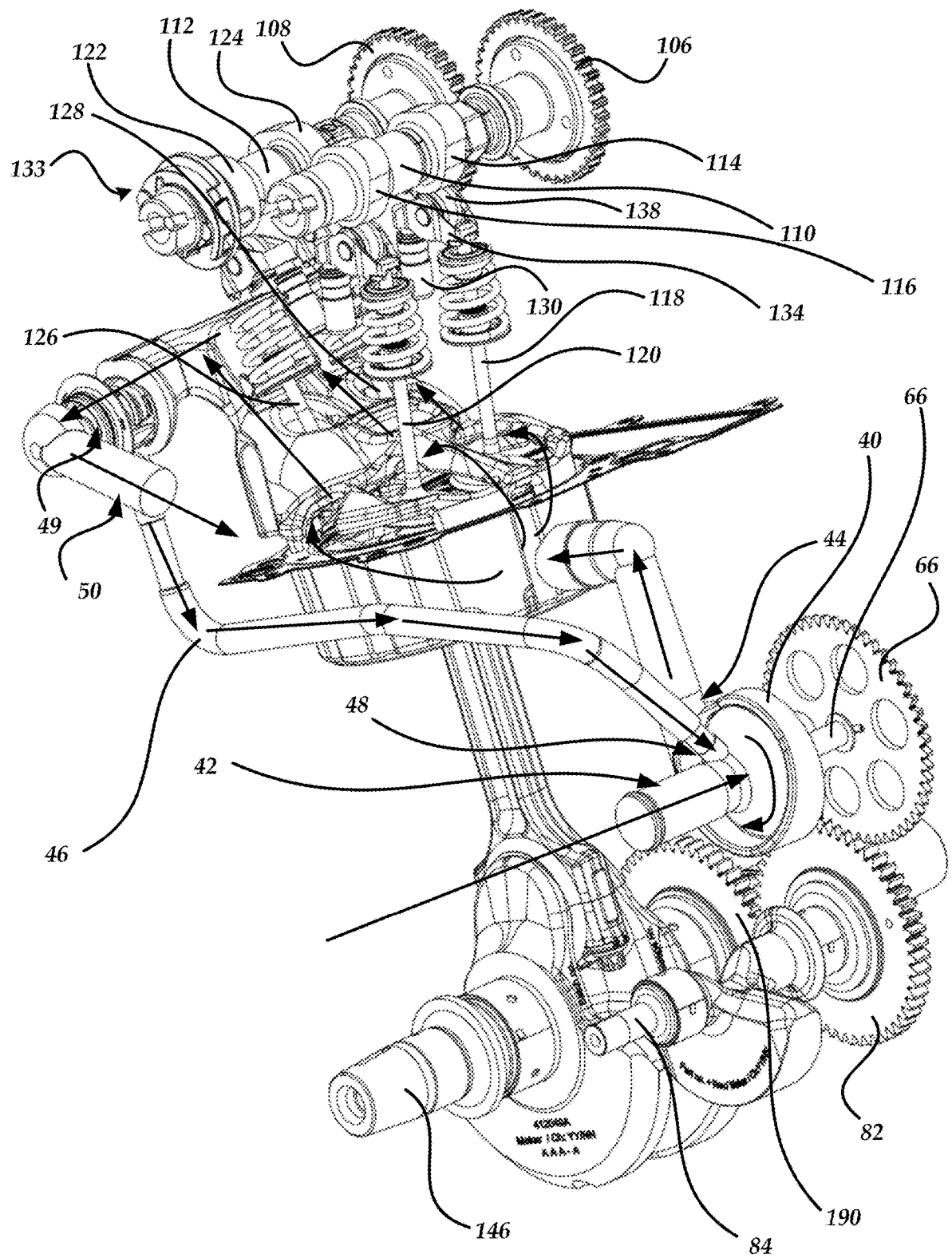
FIG. 3 is an isometric front view of internal components of the engine of FIG. 1, showing coolant flow paths of the engine.
Figure 4:
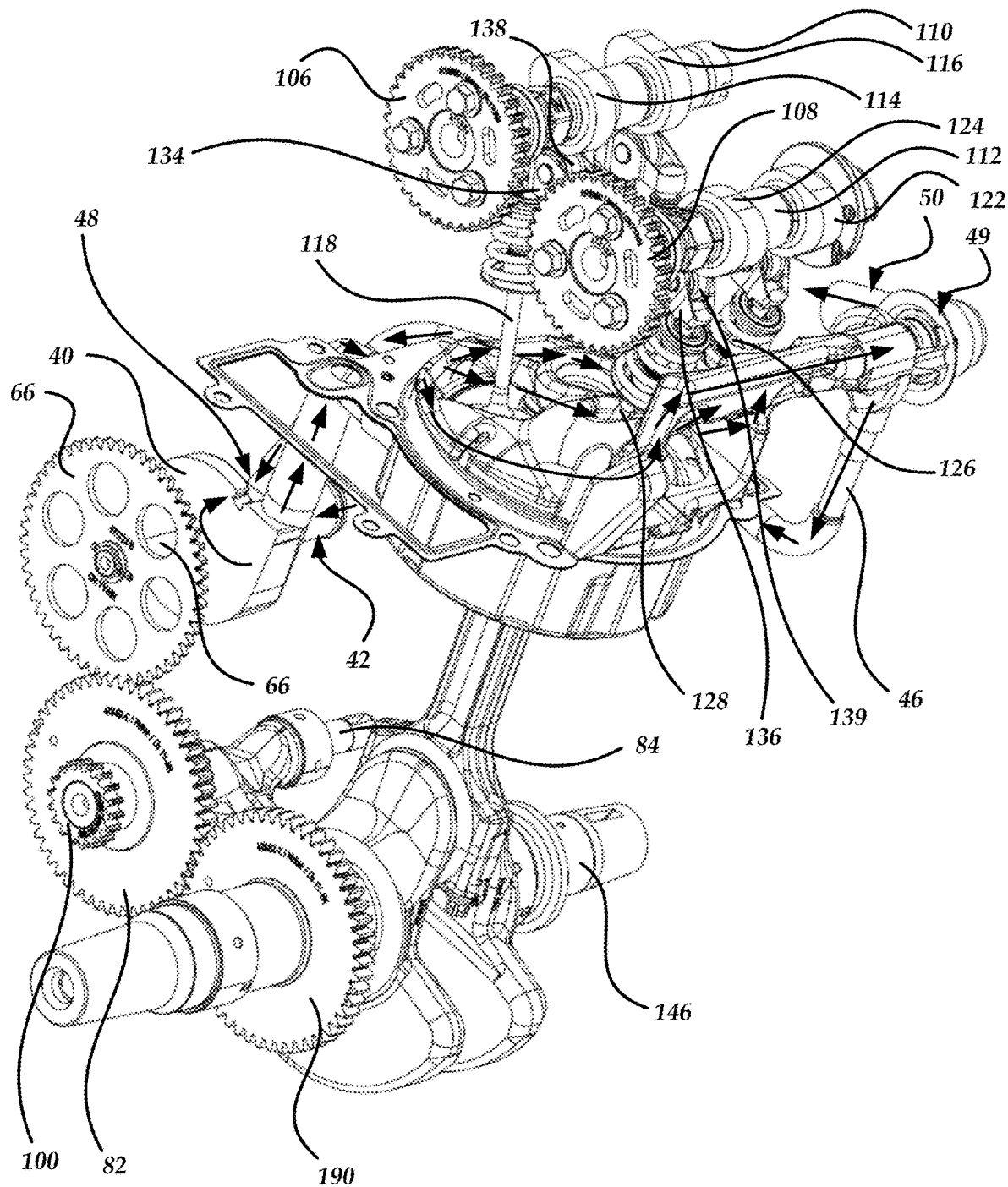
FIG. 4 is an isometric rear view of internal components of the engine of FIG. 1, showing coolant flow paths of the engine.

FIGS. 3 and 4 show arrows that provide logical representations of coolant flow paths through the engine 2 according to some embodiments. In some embodiments, the water pump 40 draws the coolant from a radiator (not shown) through a first coolant return port 42 and pushes the coolant through the coolant paths in the upper engine portion 30 through a first coolant out port 44. In some embodiments, the coolant is returned directly to the water pump 40 through a bypass coolant return hose 46 that returns the coolant through a second coolant return port 48 without going through the radiator until a thermostat 49 opens. In some embodiments, the thermostat 49 opens responsive to the coolant reaching or exceeding a predetermined threshold temperature. In some embodiments, when the thermostat 49 opens, the coolant is redirected to return to the radiator through a second coolant out port 50 (see FIGS. 1, 3, and 4). In some embodiments, the central axis of the first coolant out port 44 is transverse (for example, perpendicular) to the central axis of the first coolant return port 42. In some embodiments, the central axis of the second coolant return port 48 is transverse to both the central axis of the first coolant return port 42 and the central axis of the first coolant out port 44.

Figure 31:
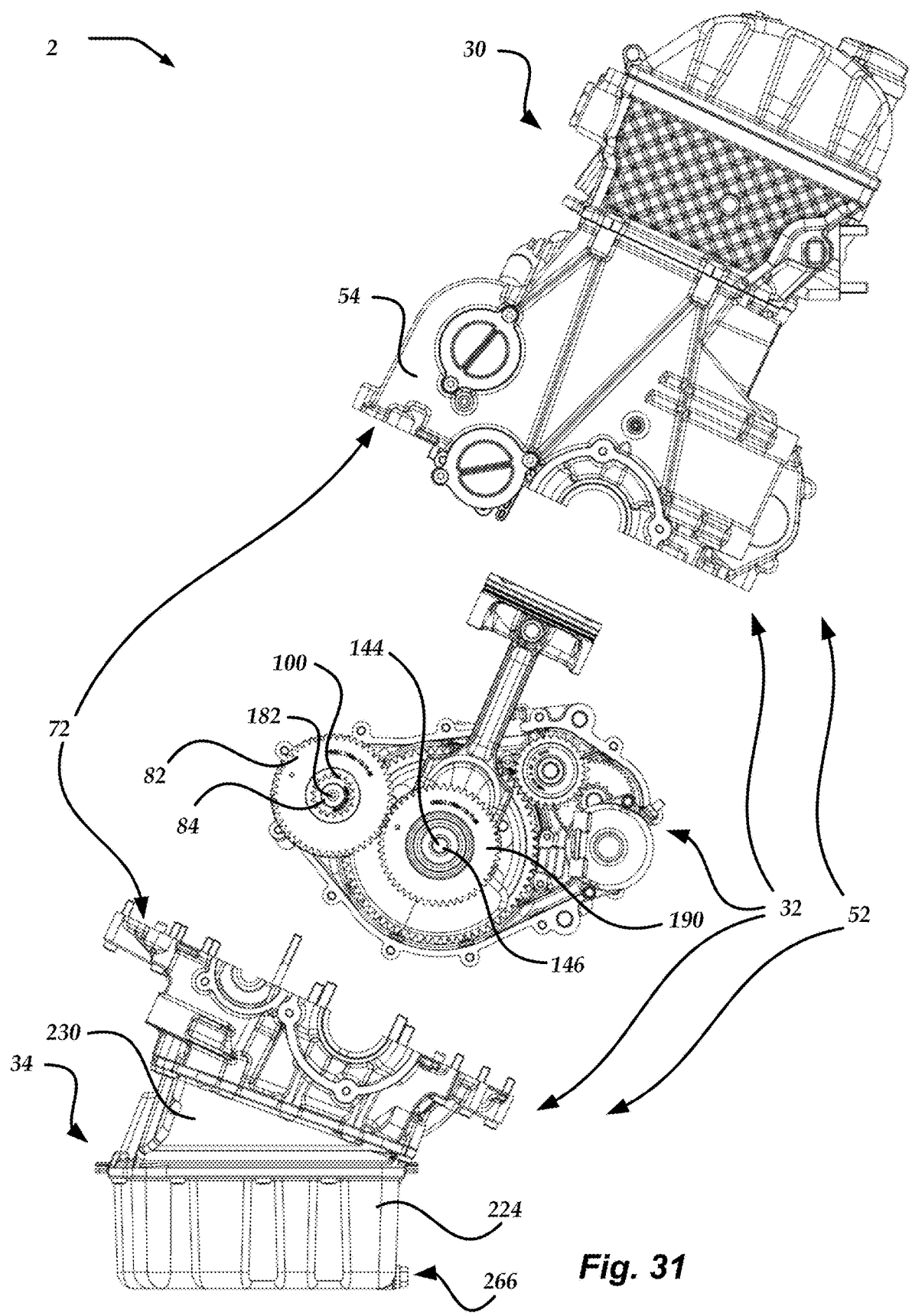
FIG. 31 is a left-side elevational, partially exploded view of the engine of FIG. 1.
Figure 32:
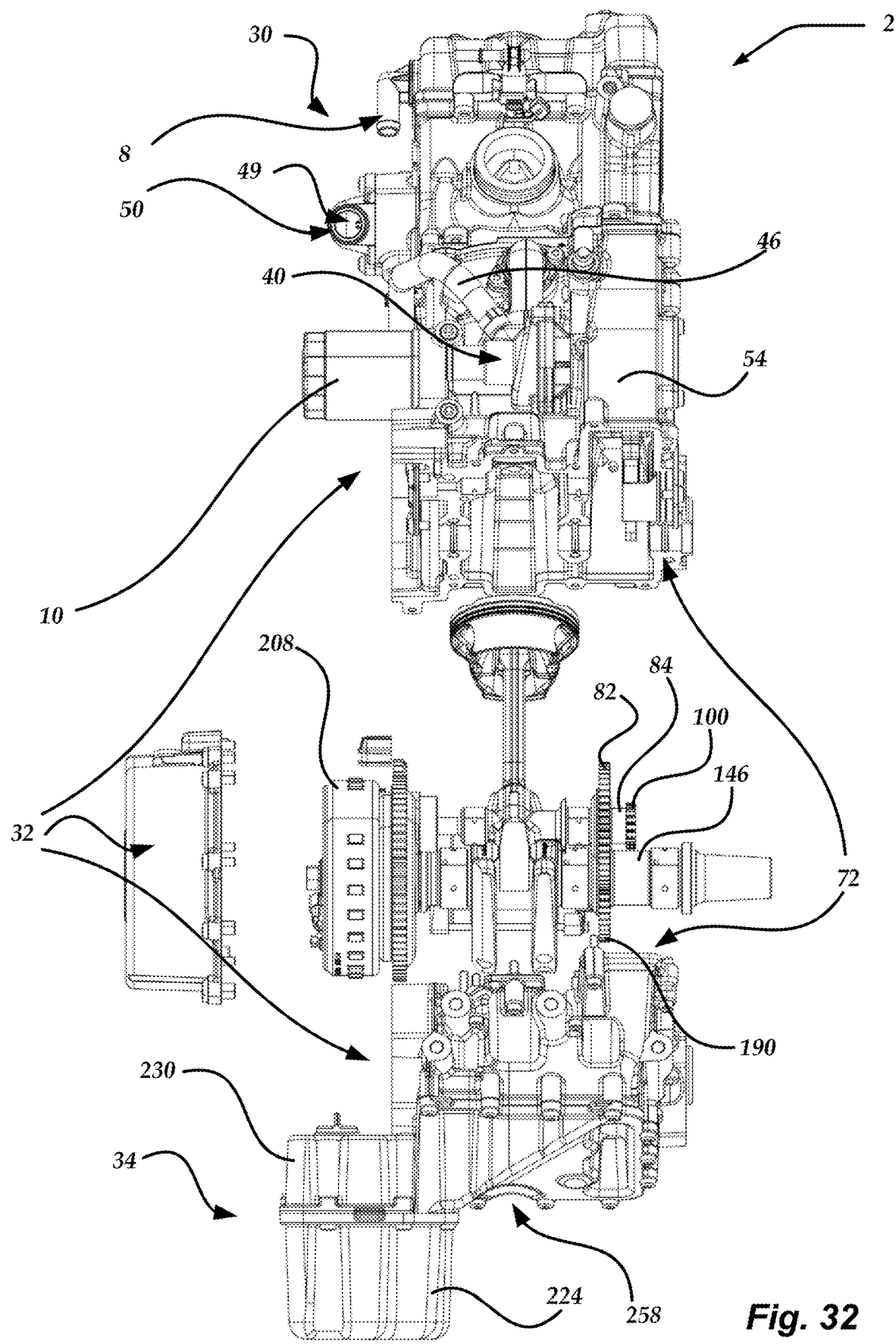
FIG. 32 is a front-side elevational, partially exploded view of the engine of FIG. 1.

In some embodiments, the water pump 40 is coupled to a surface of the engine housing 4 that faces a lateral side of the engine 2, such as a left or right facing surface. In some embodiments, the water pump 40 is disposed on a front portion of the engine housing 4. In some embodiments, the water pump 40 is coupled to the lower engine portion 32. In some embodiments, the housing 4 has a crankcase 52, and, in some embodiments, the crankcase 52 is included in the lower engine portion 32. In some embodiments, the water pump 40 is coupled to the crankcase 52. In some embodiments, the crankcase 52 has a gear housing portion 54 that houses one or more gears (see FIG. 6, which is a cross-sectional view of taken along line 6-6 in FIG. 5; see also FIGS. 31 and 32), and, in some embodiments, the water pump 40 is coupled to the gear housing portion 54. In some embodiments, the gear housing portion 54 is disposed on a side portion of the engine 2, such as a lateral side portion of the engine 2. In some embodiments, the water pump 40 is coupled to a surface of the gear housing portion 54 that faces the side portion of the engine 2 that is opposite the side portion of the engine 2 on which the gear housing portion 54 is disposed. For example, as shown in FIG. 1, the gear housing portion 54 is disposed on the left side portion of the engine 2, and the water pump 40 is disposed on a right-facing surface 56 of the gear housing portion 54.

In some embodiments, the water pump 40 is coupled to a support surface, such as water-pump support flange 58. In some embodiments, the engine housing 4 has a spacer 60 that spaces the support surface away from the exterior surface of the lower engine portion 32 (see FIGS. 6 and 7). In some embodiments, the spacer 60 is parallel to and, most preferably, coaxial with the first coolant return port 42 (see FIG. 6). In some embodiments, the spacer 60 includes a male spacer portion 62 and a female spacer portion 64 that is configured to receive the male spacer portion 62. In some embodiments, one of the male spacer portion 62 or the female spacer portion 64 is integral to the crankcase 52, and, in some versions, the other is separable from the crankcase 52. In some embodiments, the spacer 60 defined by the male spacer portion 62 and the female spacer portion 64 is tubular. In some embodiments, the male spacer portion 62 comprises a portion of the water pump assembly. In some embodiments, the male spacer portion 62 is inserted into the female spacer portion 64 upon assembly.

Figure 6:
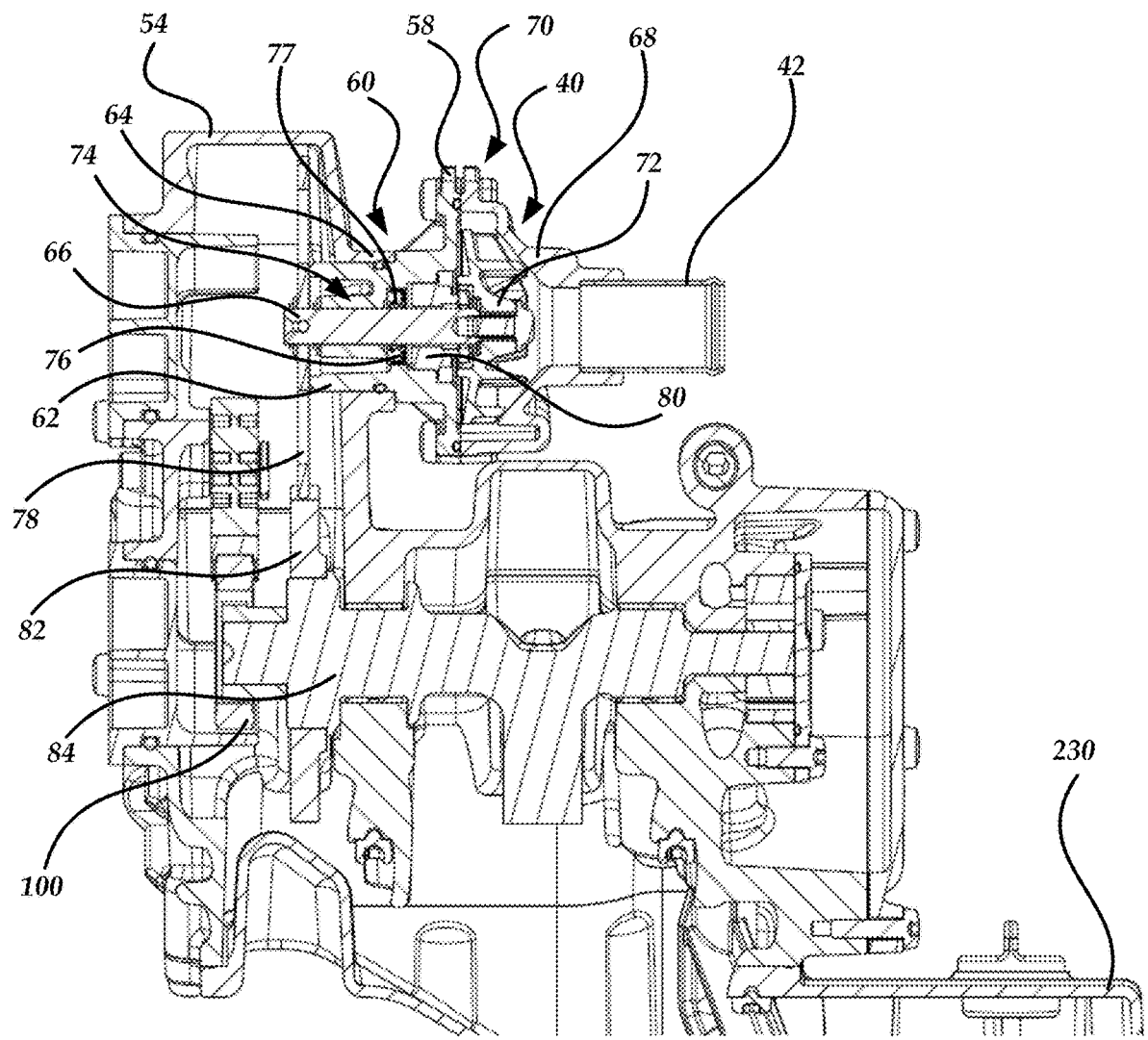
FIG. 6 is a cross-sectional view taken along line 6-6 in FIG. 5.

In some embodiments, a water pump drive shaft 66 extends through the spacer 60. In some embodiments, the water pump drive shaft 66 is parallel to and, in some versions, coaxial with the first coolant return port 42 (see FIG. 6). In some embodiments, an outward housing portion 68 and the flange 58 or the male spacer portion 62 defines a water pump housing 70 that houses an impeller 72. In some embodiments, the water pump drive shaft 66 drives the impeller 72. In some embodiments, the water pump drive shaft 66 has a plain bearing 74 that, in some versions, is supplied with pressurized oil (see FIG. 6). As shown in FIG. 6, the plain bearing 74 is defined by a tubular structure that is part of the male spacer portion 62 and spaced apart from the outer walls of the male spacer portion 62. In some embodiments, the plain bearing 74 supports the water pump drive shaft 66 and is integrally formed as part of the male spacer portion 62. In some embodiments, a radial seal ring 76 pressed into place by a compression spring such as a coil spring 77 is disposed between the plain bearing 74 and the impeller 72 along the length of the water pump drive shaft 66 and prevents the oil from entering the coolant side of the water pump 40. In some embodiments, a water pump seal 80 is disposed between the impeller 72 and the radial seal ring 76 to prevent coolant from escaping the water pump 40 toward the balancer driven gear 78. In some embodiments, the water pump drive shaft 66 couples to the balancer driven gear 78 that is driven by a balancer gear 82 (see FIGS. 6 and 8-16). In some embodiments, the balancer driven gear 78 has a reduced thickness (dimension perpendicular to the radius) relative to the thickness of the balancer gear 82, such as 80, 70, 60, 50, 40, 30, 20, or less percent of the thickness of the balancer gear 82. In some embodiments, the balancer driven gear 78 has a 1:1 ratio with the balancer gear 82, both in terms of diameter and number of teeth. In some versions, the balancer driven gear 78 has one more or less tooth than the balancer gear 82 (for example, a 51:50 ratio). In some embodiments, the balancer gear 82 and the balancer driven gear 78 can have an appropriate gear ratio, for example whereby the balancer gear 82 is larger or smaller than the balancer drive gear 78. As shown, the water pump 40 is driven by a balancer shaft 84 that drives the balancer gear 82.

Figure 9:
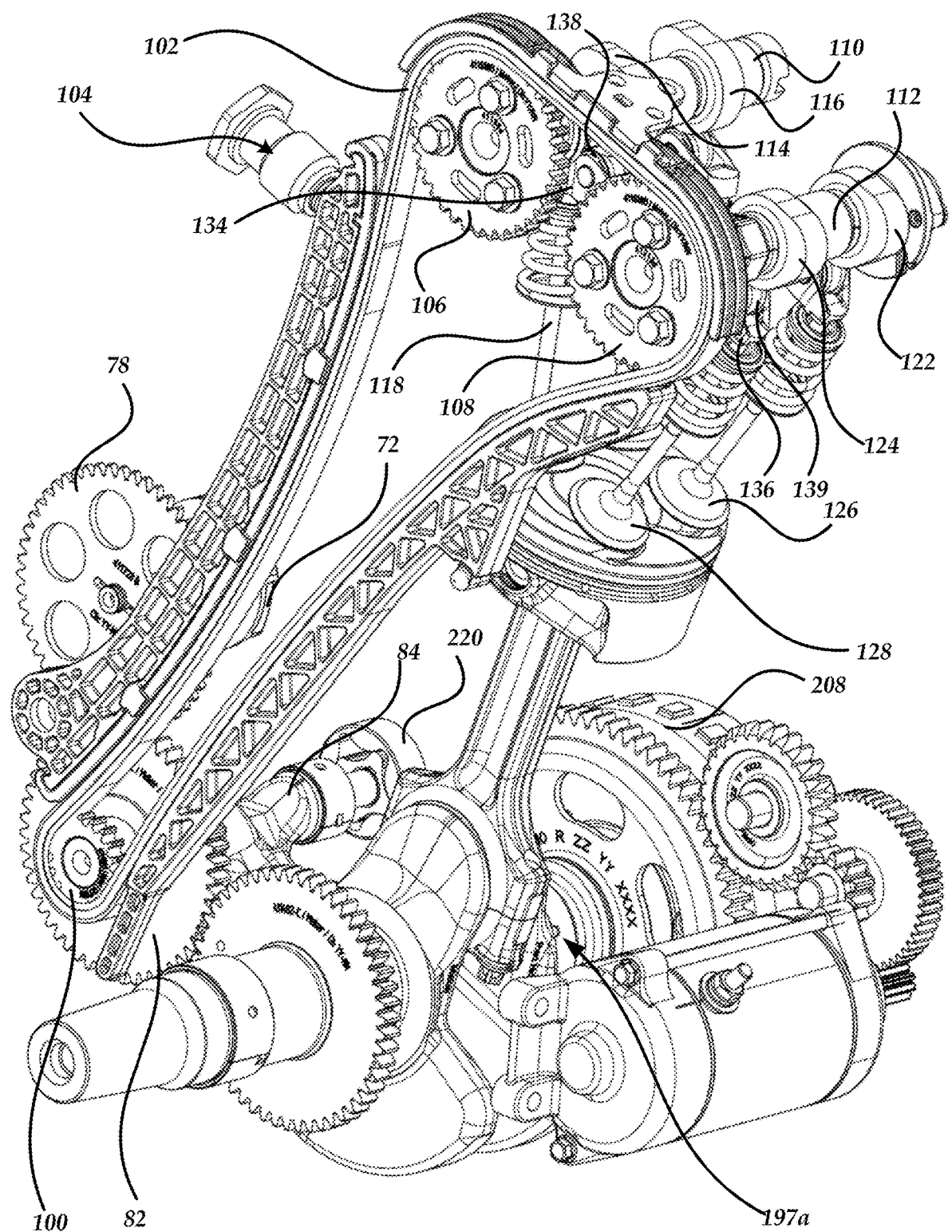
FIG. 9 is a rear isometric view of internal components of the engine of FIG. 1.
Figure 10:
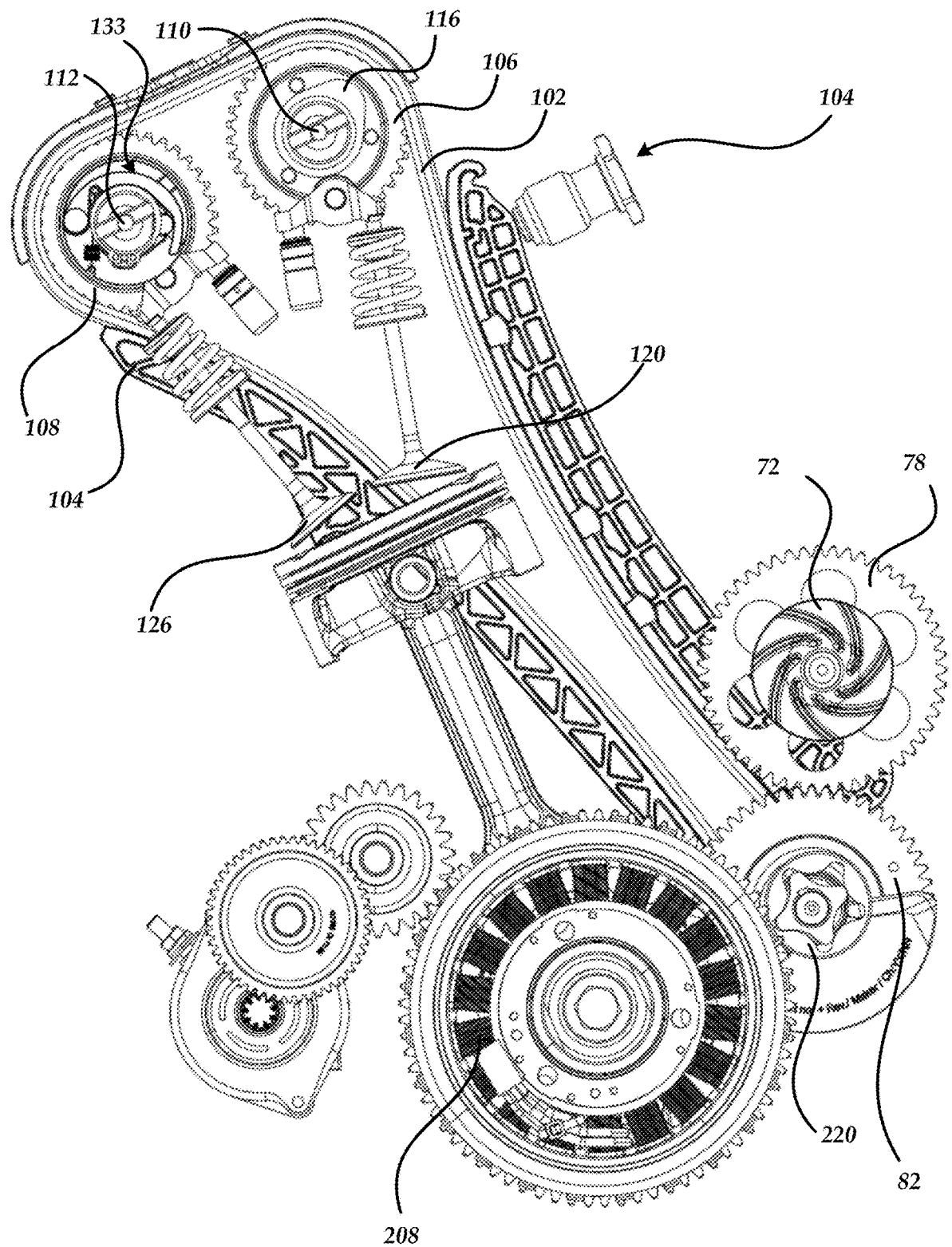
FIG. 10 is a right-side elevational view of internal components of the engine of FIG. 1.
Figure 11:
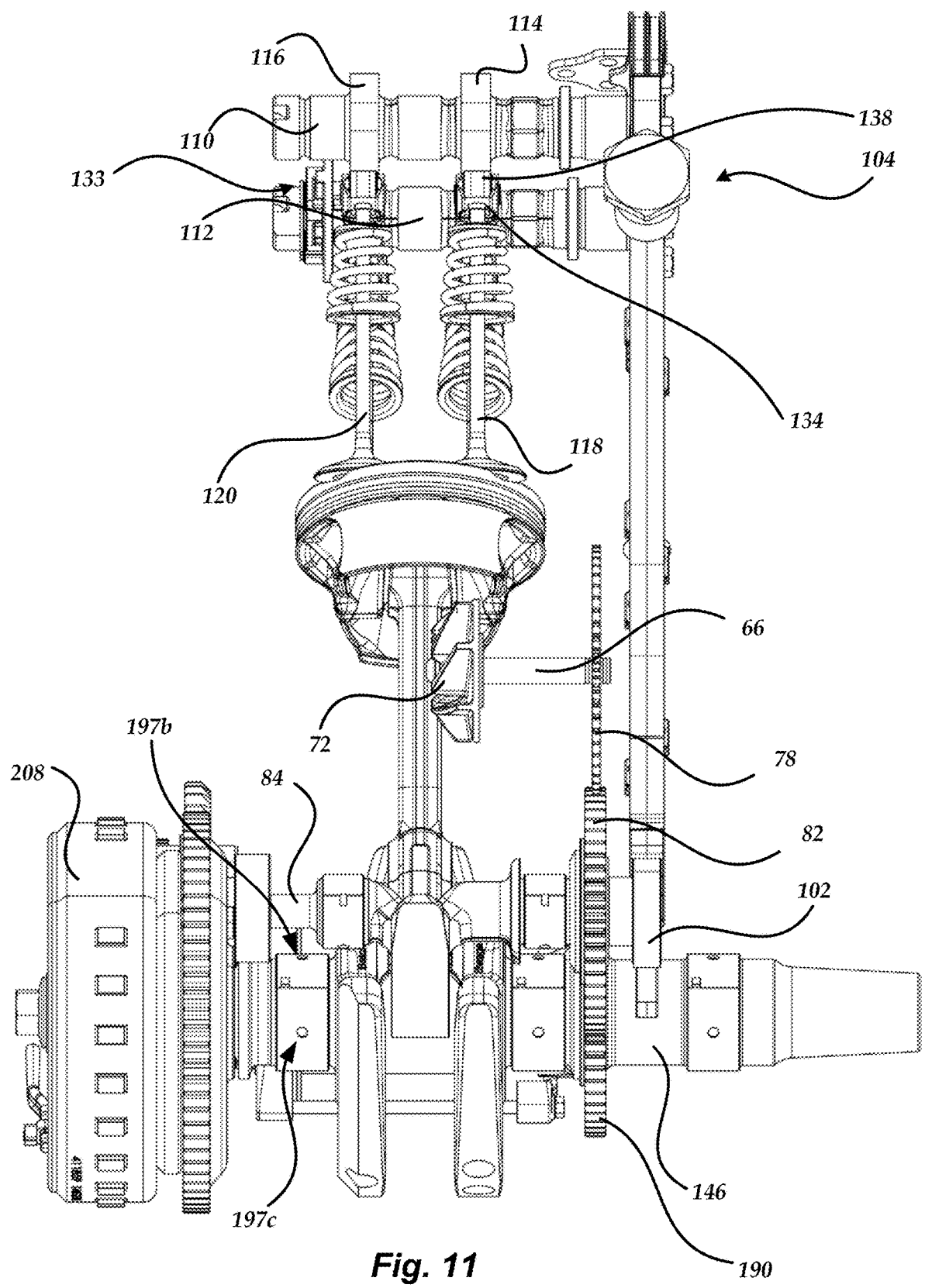
FIG. 11 is a front-side elevational view of internal components of the engine of FIG. 1.
Figure 12:
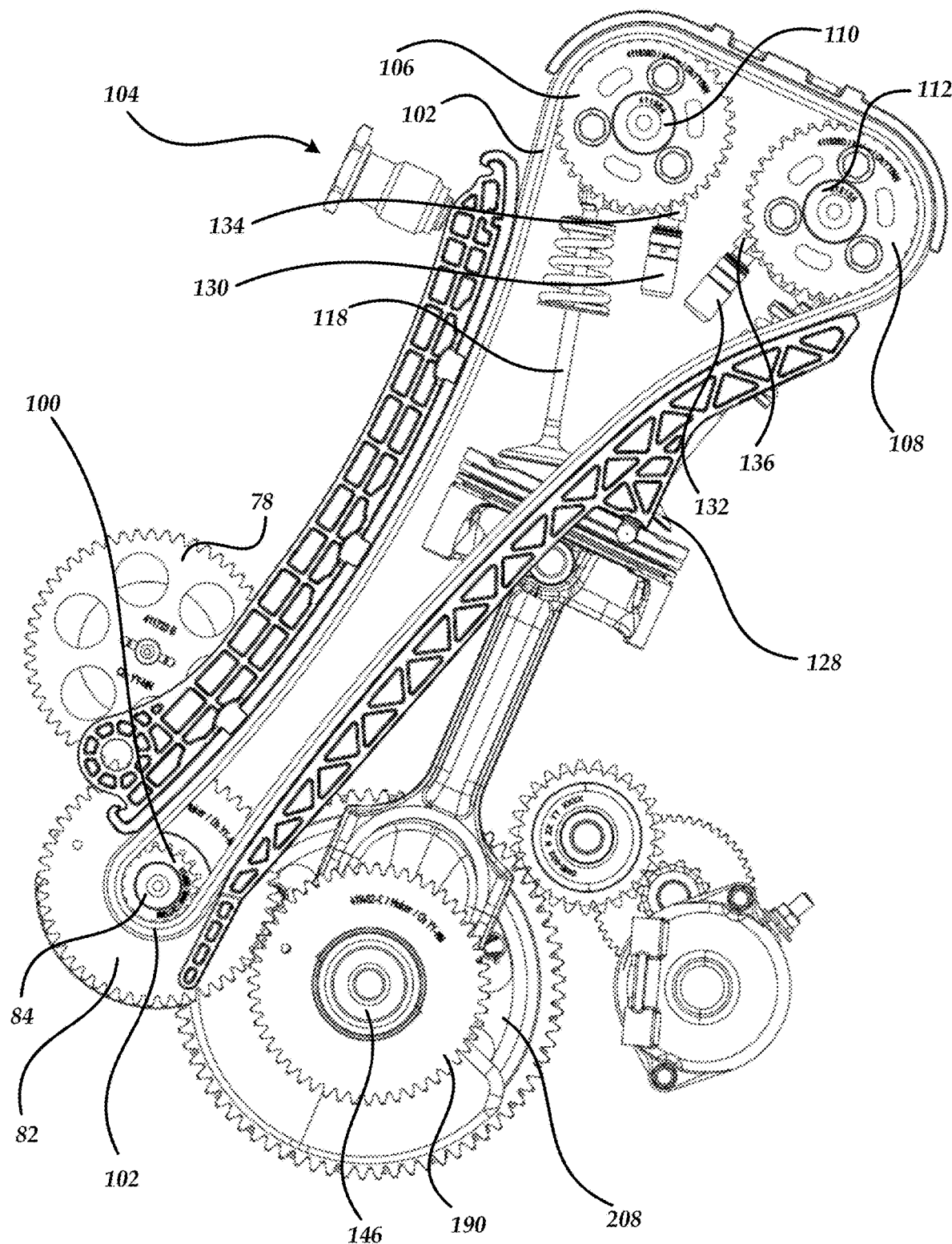
FIG. 12 is a left-side elevational view of internal components of the engine of FIG. 1.
Figure 13:
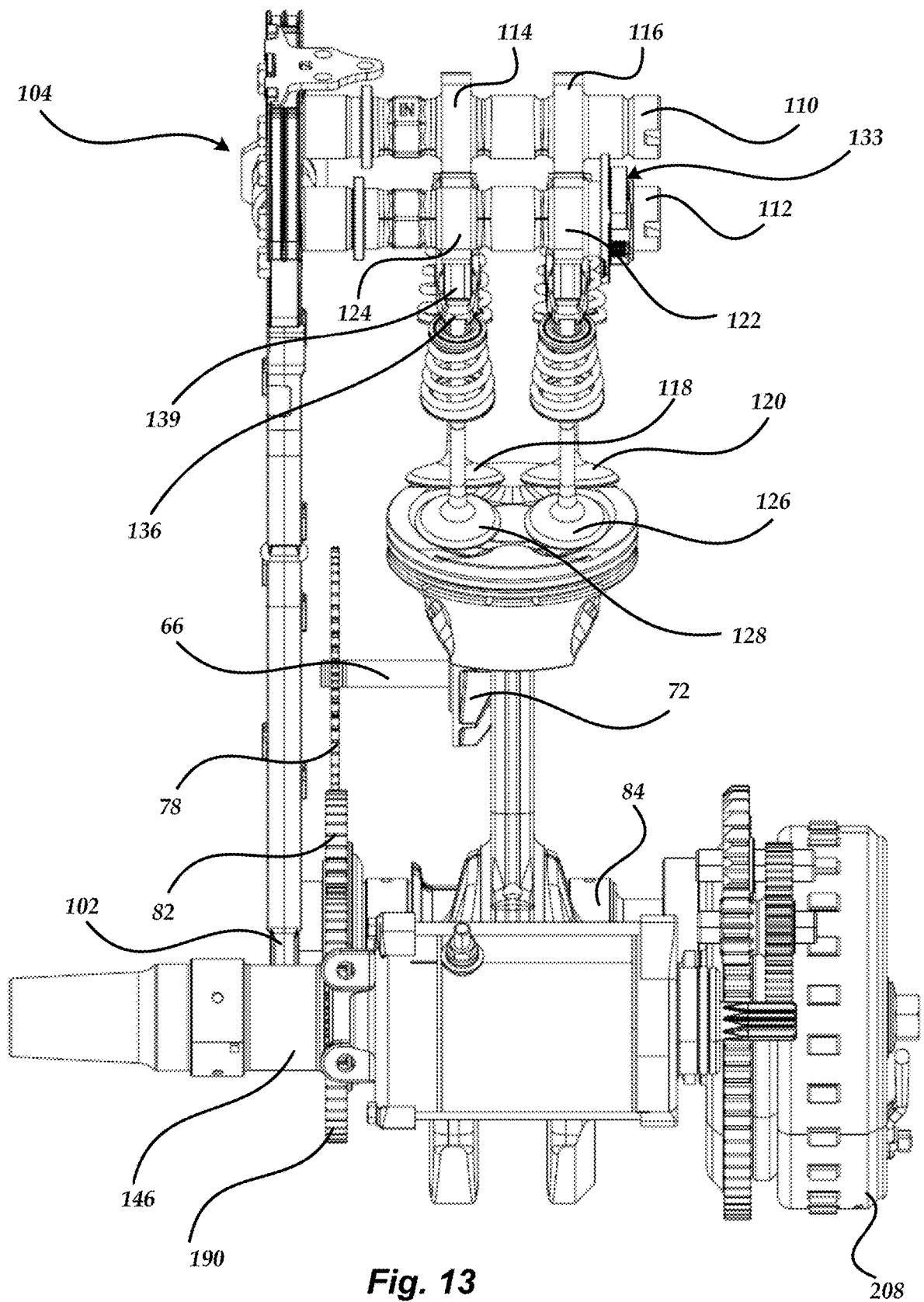
FIG. 13 is a rear-side elevational view of internal components of the engine of FIG. 1.
Figure 14:
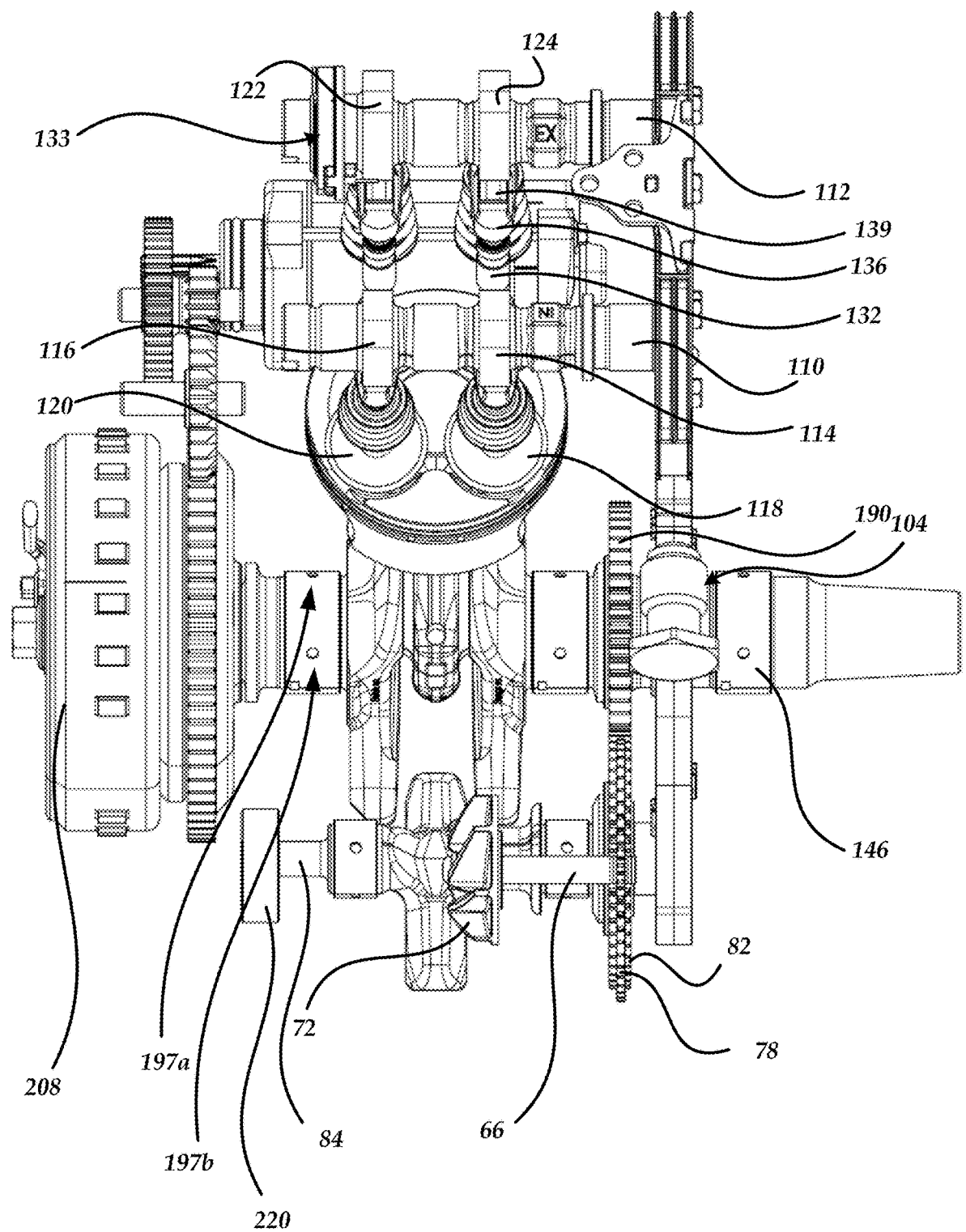
FIG. 14 is a top view of internal components of the engine of FIG. 1.
Figure 15:
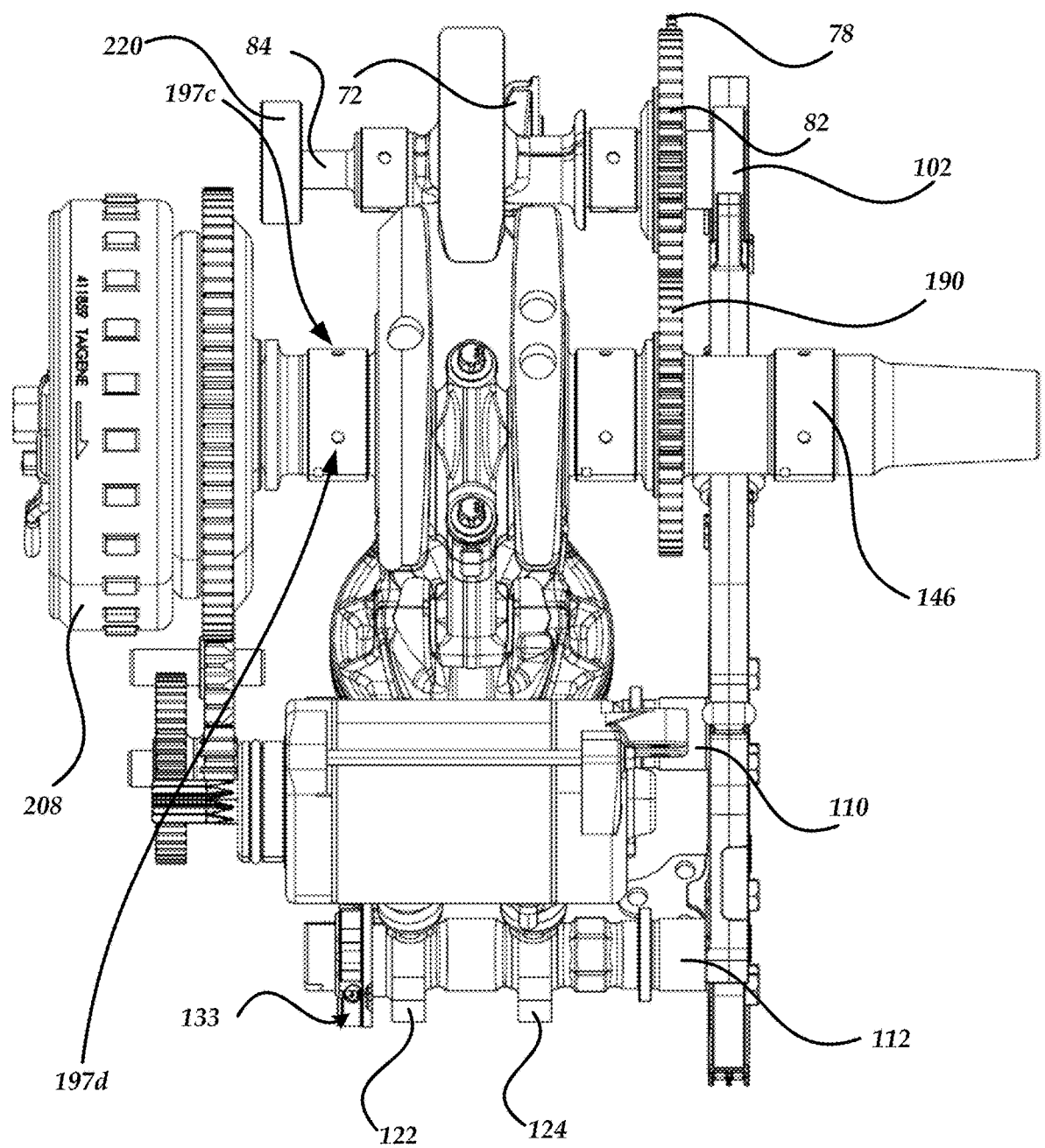
FIG. 15 is a bottom view of internal components of the engine of FIG. 1.
Figure 16:
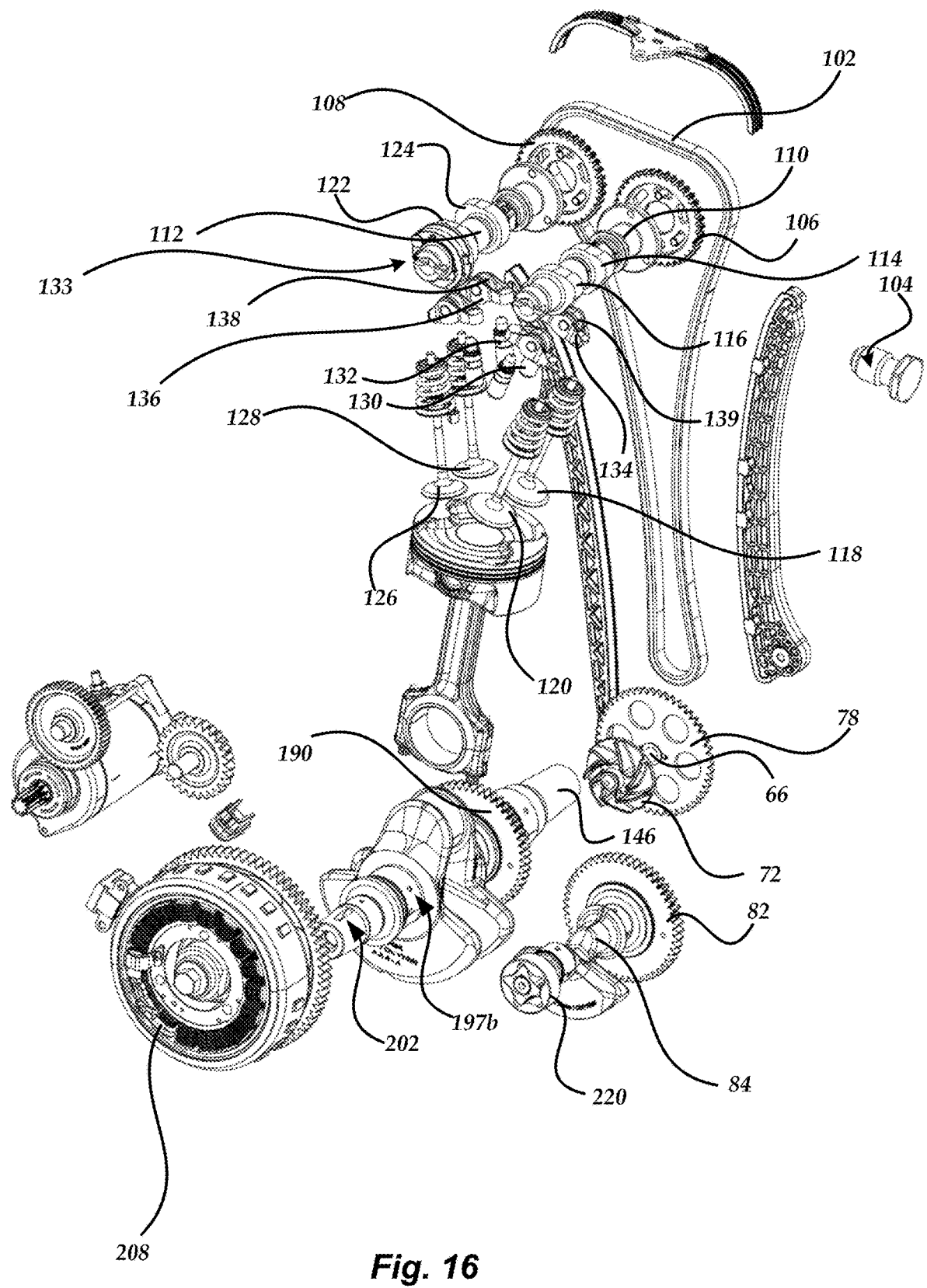
FIG. 16 is a left-side partially exploded isometric view of internal components of the engine of FIG. 1.

In some embodiments, the balancer shaft 84 has a timing sprocket 100 that drives a timing chain 102 (see FIGS. 6 and 9). The arrangement of the balancer shaft 84 driving the timing chain 102 (as opposed to a crankshaft driving the timing chain as is typical) facilitates maintenance, installation, assembly, or disassembly of the timing chain 102 when the crankcase 52 is fully assembled without removing the head or upper engine portion 30 or splitting the crank case 52 to access the timing chain 102. In some embodiments, a hydraulic tensioner 104 tensions the timing chain 102. In some embodiments, the timing chain 102 drives one or more cam sprockets, such as an intake cam sprocket 106 and an exhaust cam sprocket 108 (see FIGS. 8-10, 12, and 16). In some embodiments, the intake cam sprocket 106 drives an intake camshaft 110, and the exhaust cam sprocket 108 preferably drives an exhaust camshaft 112.

In some embodiments, each camshaft has one or more cam lobes that control one or more corresponding valves. For example, the intake camshaft 110 may have two intake cam lobes, such as first and second intake cam lobes 114, 116 that respectively move first and second intake rocker arms (for example, rocker arm 134 in FIG. 18, which is a cross-sectional view taken along line 18-18 in FIG. 17, and FIG. 19, which is a close-up view of a portion of FIG. 18) that transfer a portion of the rotational energy of the intake camshaft 110 into movement of first and second intake valves 118, 120. As another example, the exhaust camshaft 112 may have two exhaust cam lobes, such as first and second exhaust cam lobes 122, 124 that respectively move first and second exhaust rocker arms (for example, rocker arm 136 in FIGS. 18 and 19) that transfer a portion of the rotational energy of the exhaust camshaft 112 into movement of first and second exhaust valves 126, 128. In some embodiments, a respective hydraulic valve lash adjuster (for example, valve lash adjuster 130 or valve lash adjuster 132) couples to each rocker arm to facilitate hydraulically controlling the valve lash of each valve, without manual adjustment (see FIGS. 18 and 19). In some embodiments, the hydraulic valve lash adjusters control the valve lashes for the corresponding valves by limiting an amount of travel of the outside ends of the rocker arms that contact the valve lash adjusters, which in turn limits the amount of travel of the inside ends of the rocker arms that contact the valve stems as the rocker arms rotate on the inner or outer races of corresponding bearings (for example, bearings 138 and 139 in FIGS. 18 and 19) as the cam lobes transfer energy to the rocker arms.

In some embodiments, a decompression system 133 is configured to reduce the compression impedance in the cylinder bore 142 until a predetermined number of rotations per minute (RPMs) is met or exceeded by maintaining one or more exhaust valves, such as exhaust valve 126, in an open configuration until such RPM threshold is met or exceeded (see FIG. 3). In some embodiments, the decompression system includes an effective-radius adjustment system 133a (see FIGS. 56 and 57). In some embodiments, the exhaust camshaft 112 is configured to receive the system 133a. In some embodiments, the camshaft 112 has a guide pin 133b, and the system 133a includes a body 133c that defines a recess 133d that is configured to receive the pin 133b and prevent the body 133c from rotating relative to the camshaft 112. In some embodiments, the camshaft 112 defines a circumferential recess 133e that is configured to receive a ring 133f that is configured to sandwich the system 133a against the exhaust cam lobe 122. In some embodiments, the system 133a has a moveable component that adjusts the effective radius of the exhaust cam lobe 122 when the component moves. In some embodiments, the component includes an asymmetrical pin 133g that defines a large portion 133h and a small portion 133i that are circumferentially offset from each other, such as offset from each other by approximately 90°. In some embodiments, the exhaust cam lobe 122 defines a recess 133j that is configured to receive the asymmetrical pin 133g such that, when the small portion 133i faces away from the bottom surface of the recess 133j (not shown), the effective radius of the cam lobe 122 is less than when the large portion 133h faces away from the bottom surface of the recess 133j as found in the orientation shown in FIGS. 56 and 57. In some embodiments, the large portion 133h is configured to extend beyond the outer working surface of the cam lobe 122 when the large portion 133h faces away from the bottom surface of the recess 133j. In some embodiments, when the small portion 133i faces away from the bottom surface of the recess 133j, the small portion 133i and the large portion 133h are configured to be flush with or below the outer working surface of the cam lobe 122.

In some embodiments, the system 133a includes a lever 133k that pivots about a pin 133l when the centrifugal force on the lever 133k is sufficient to overcome a bias force applied to the lever 133k by a spring mechanism 133m. In some embodiments, the lever 133k defines a recess 133n that is configured to receive an arm 133o that radially extends from the pin 133g so as to rotate the pin 133g when the lever 133k pivots. Accordingly, in some embodiments, the spring mechanism 133m is configured to apply a bias force that defines the threshold RPMs at which the effective radius of the cam lobe 122 is changed. In some embodiments, the effective radius of the cam lobe 122 is configured to reduce when the threshold RPMs are met or exceeded. In some embodiments, reducing the effective radius of the cam lobe 122 decreases the distance that the rocker arm of the exhaust valve 126 is moved by the cam lobe 122, thereby allowing the exhaust valve 126 to enter the closed configuration. In some embodiments, increasing the effective radius of the cam lobe increases the distance that the rocker arm of the exhaust valve 126 is moved by the cam lobe 122, thereby preventing the exhaust valve 126 from entering the closed configuration and maintaining the exhaust valve 126 in the open configuration to reduce the compression impedance in the cylinder bore 142.

Figure 19:
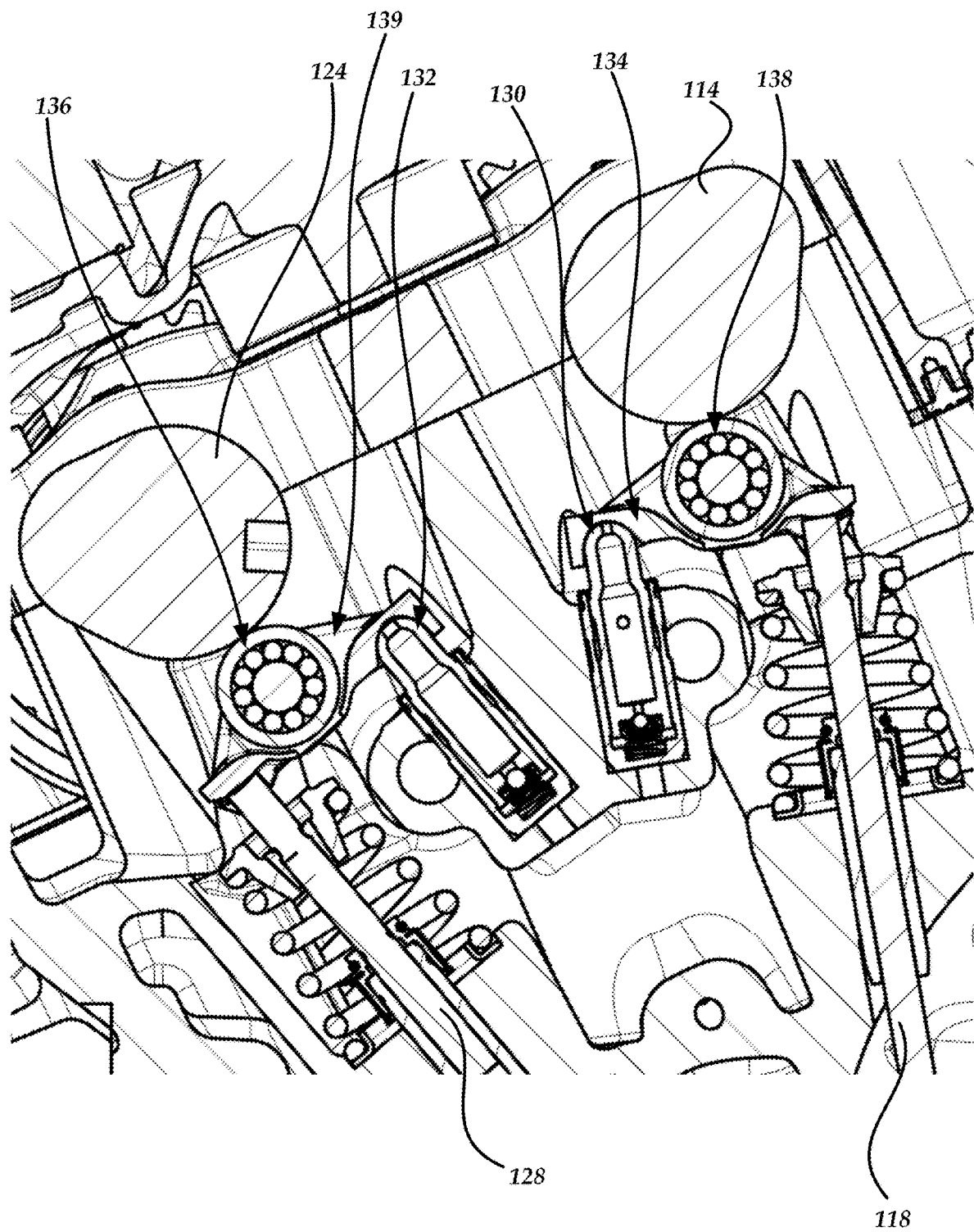
FIG. 19 is a close-up view of a portion of the cross-sectional view of FIG. 18.
Figure 56:
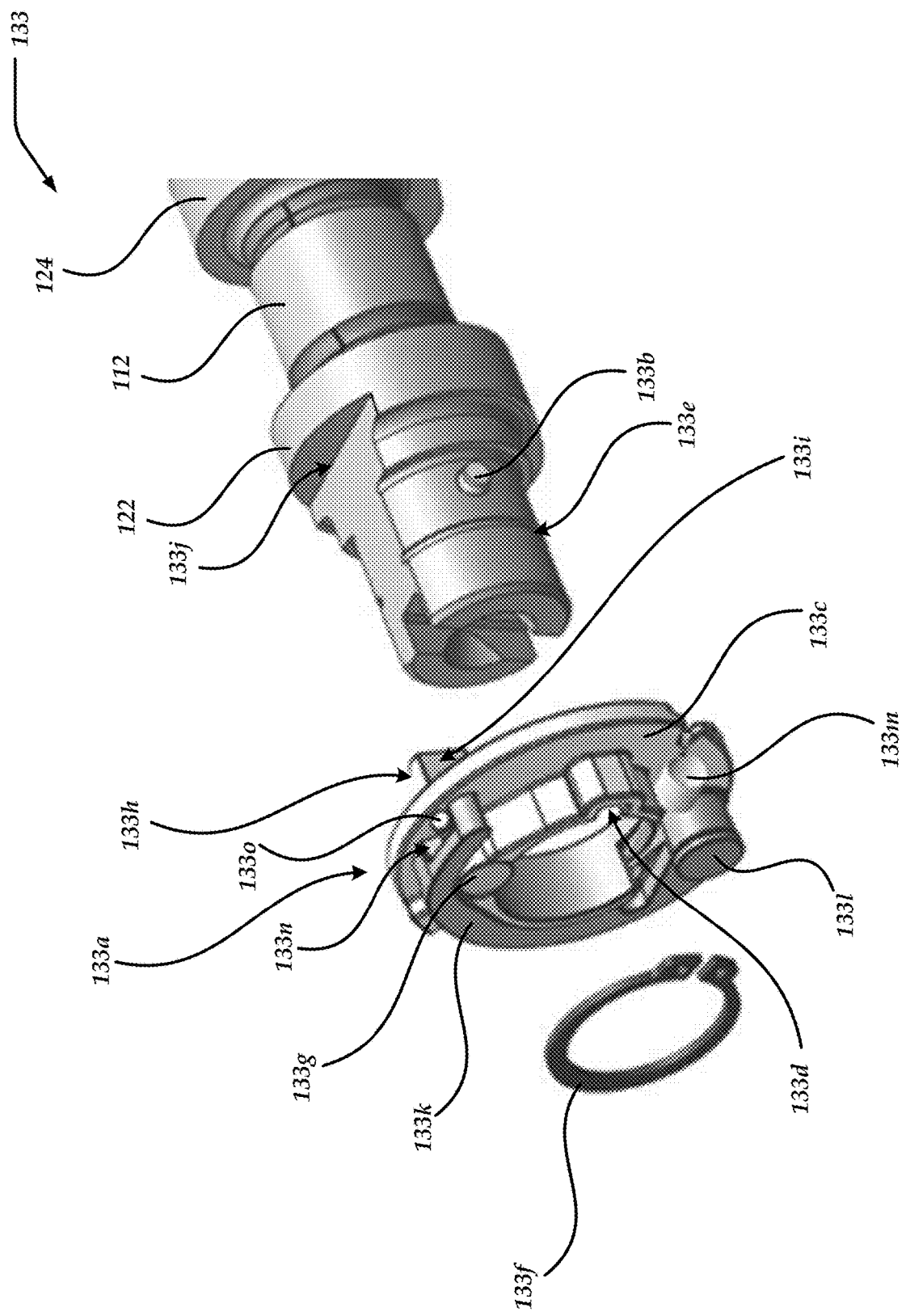
FIG. 56 is an isometric, partially exploded view of an end portion of an exhaust cam shaft of the engine of FIG. 1 with a decompression system.
Figure 57:
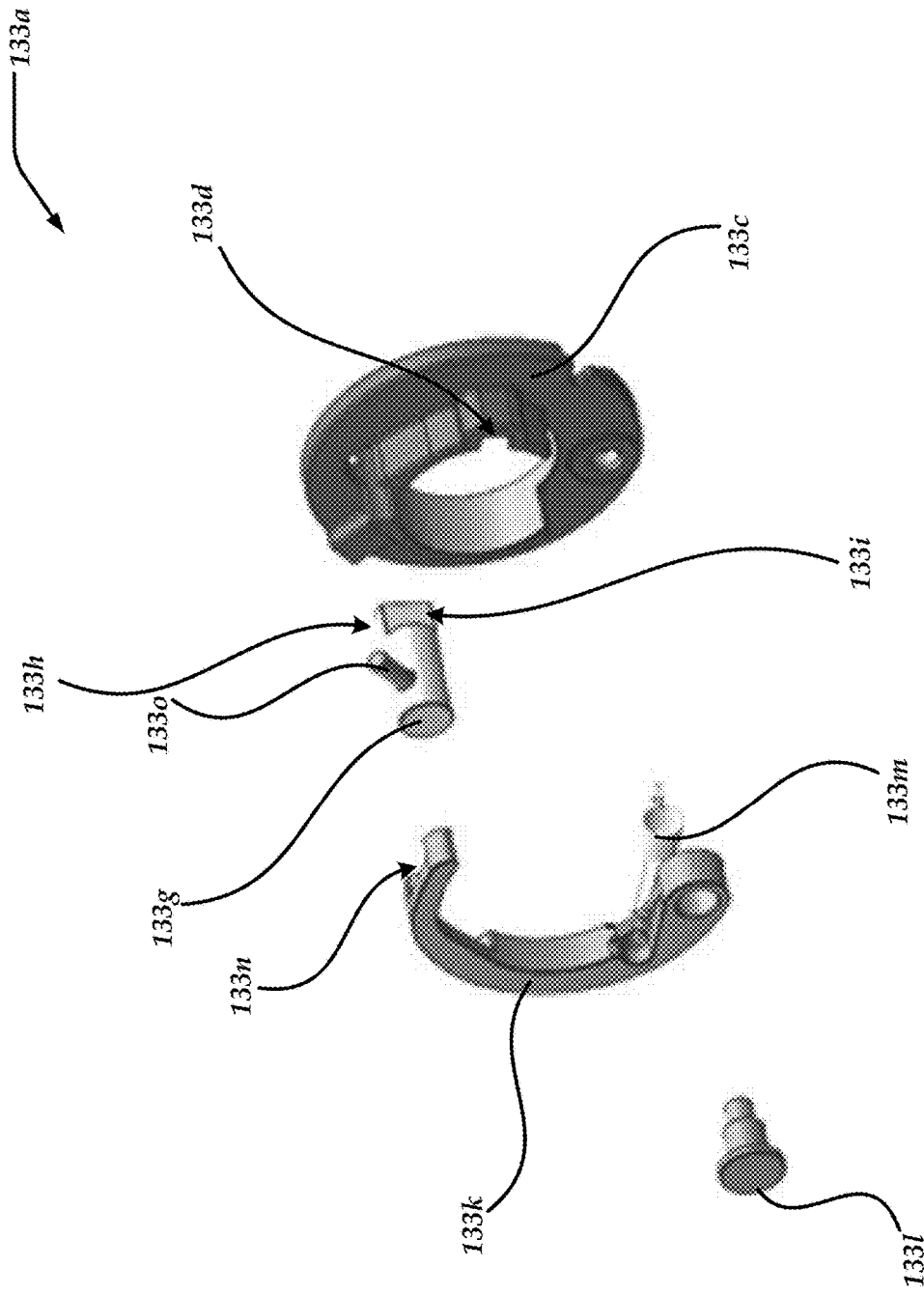
FIG. 57 is an isometric exploded view of a portion of the decompression system of FIG. 56.

In some embodiments, the rocker arm for the exhaust valve 126 rides on a ball surface (see FIG. 19), thereby enabling the rocker arm to pivot into and out of the page in FIG. 19. In some embodiments, the system 133a is configured to prevent such pivoting of the rocker arm for the exhaust valve 126. For example, in some embodiments, the pin 133g is configures to extend at least halfway across the exhaust cam lobe 122 (for example, 50, 70, 80, 90, or 100 percent across the exhaust cam lobe 122. As shown in FIG. 56, the pin 133g is configured to extend approximately one third of the way across the cam lobe 122.

Figure 20:
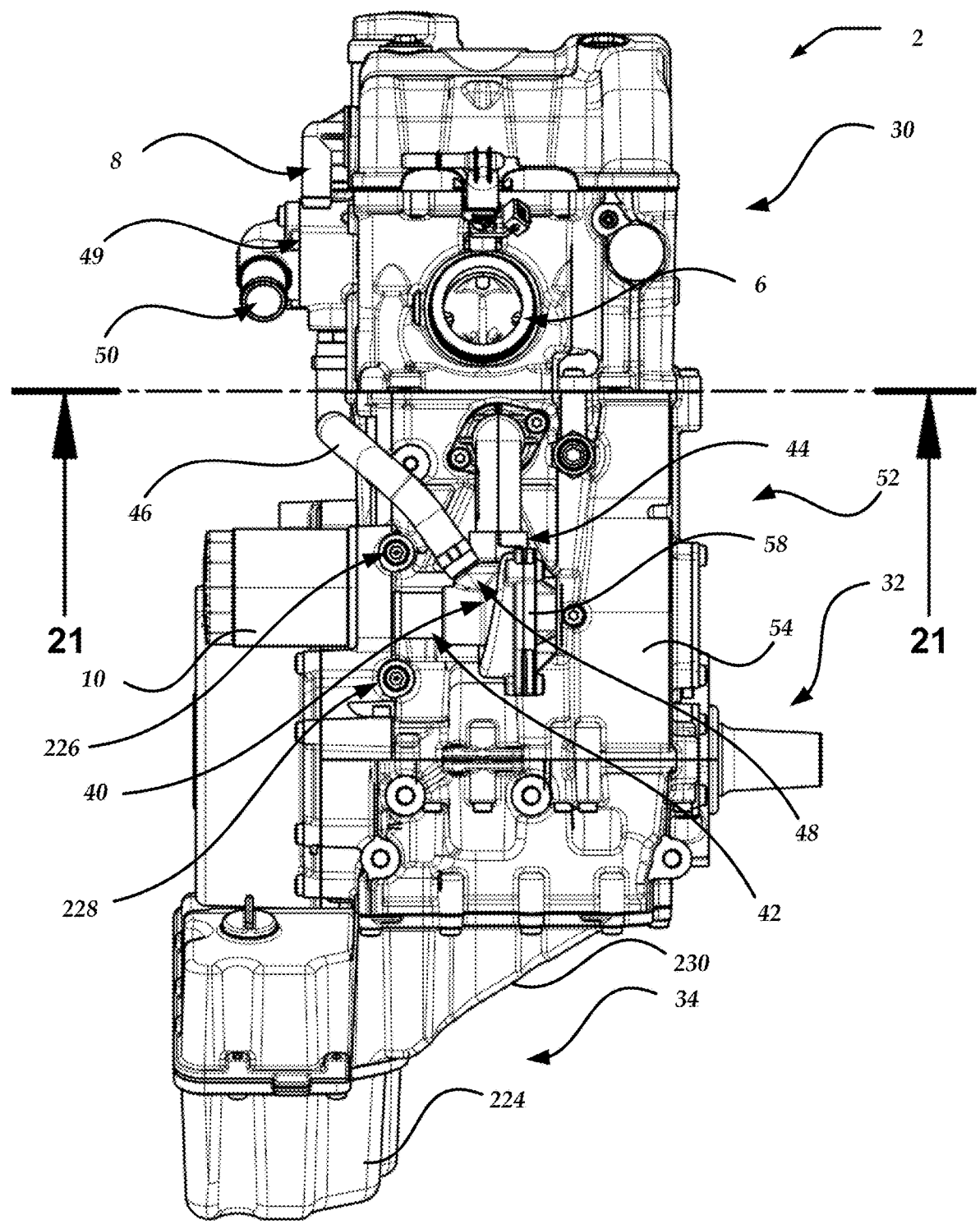
FIG. 20 is a front view of the engine of FIG. 1.
Figure 21:
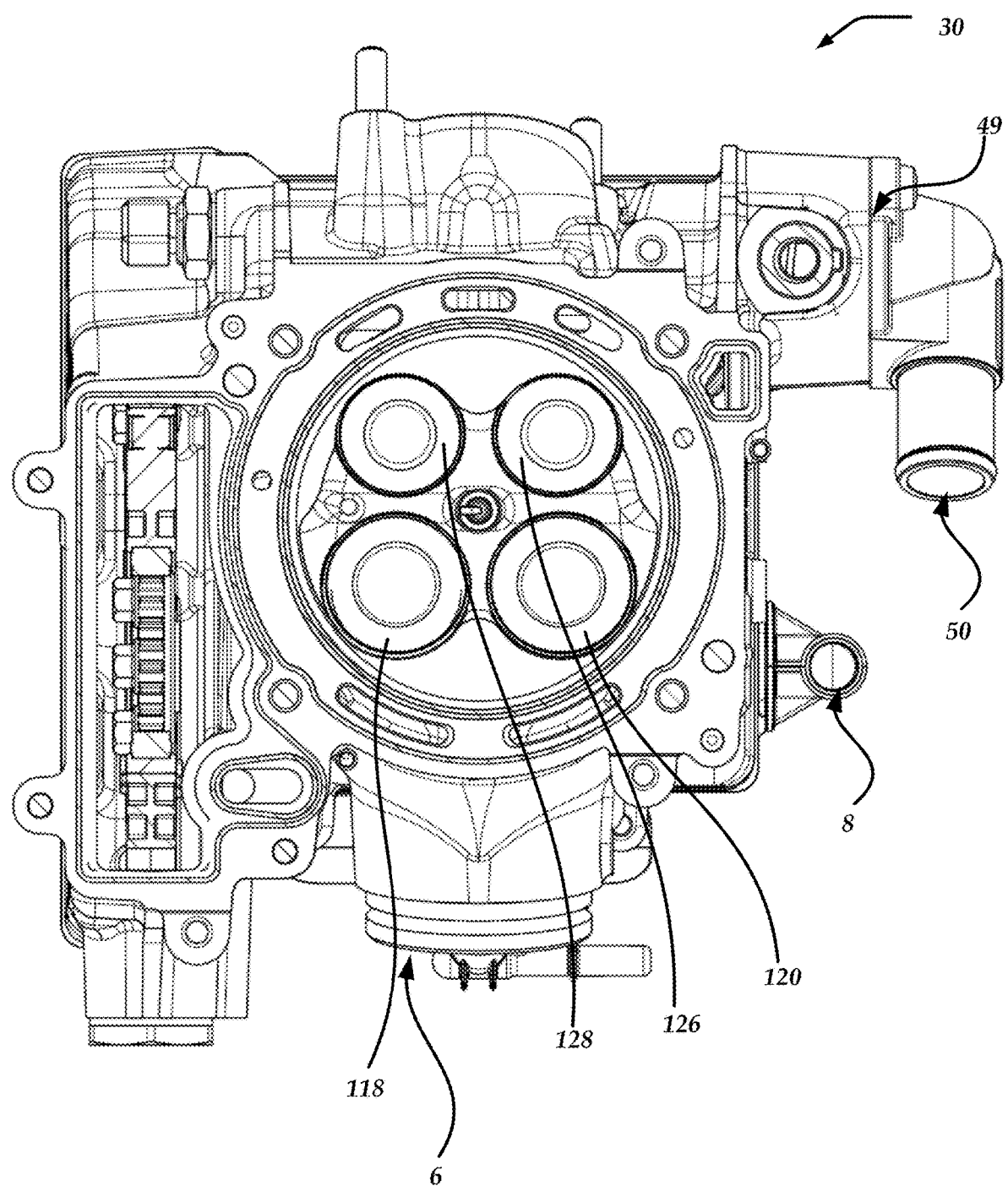
FIG. 21 is a cross-sectional view taken along line 21-21 in FIG. 20.
Figure 22:
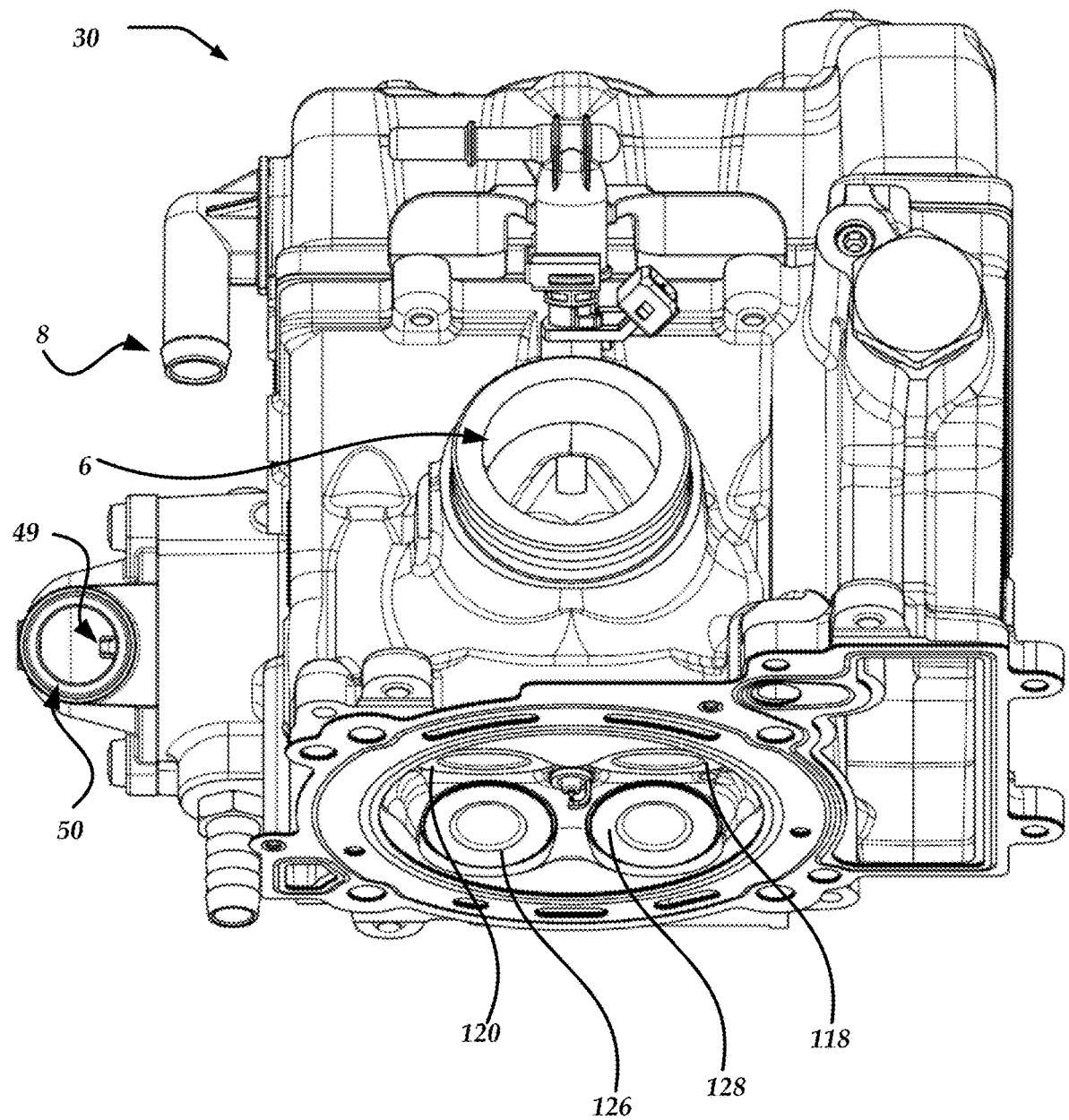
FIGS. 22-24 are front isometric views of an upper engine portion of the engine of FIG. 1.
Figure 23:
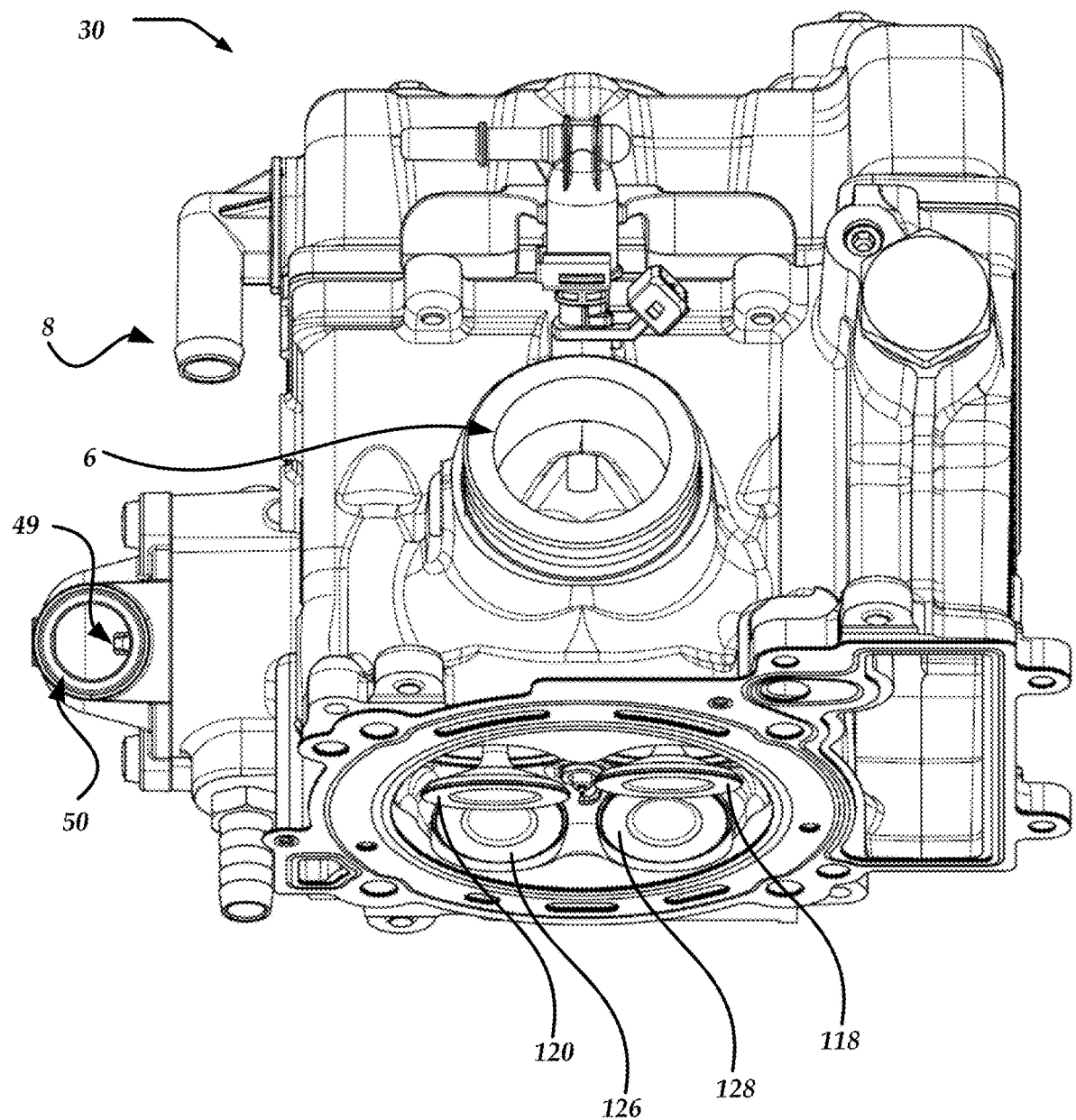
Figure 24:
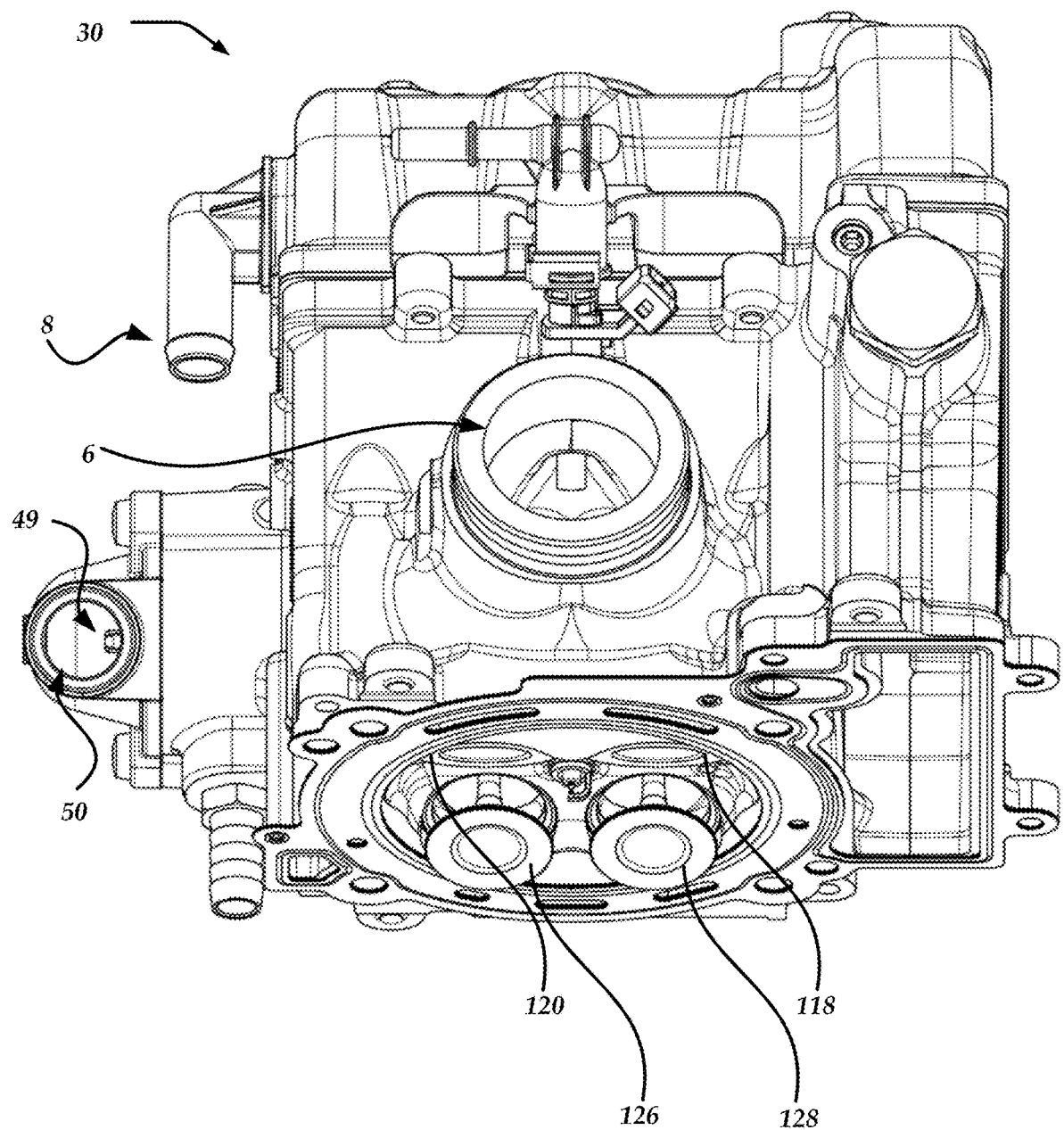
Figure 25:
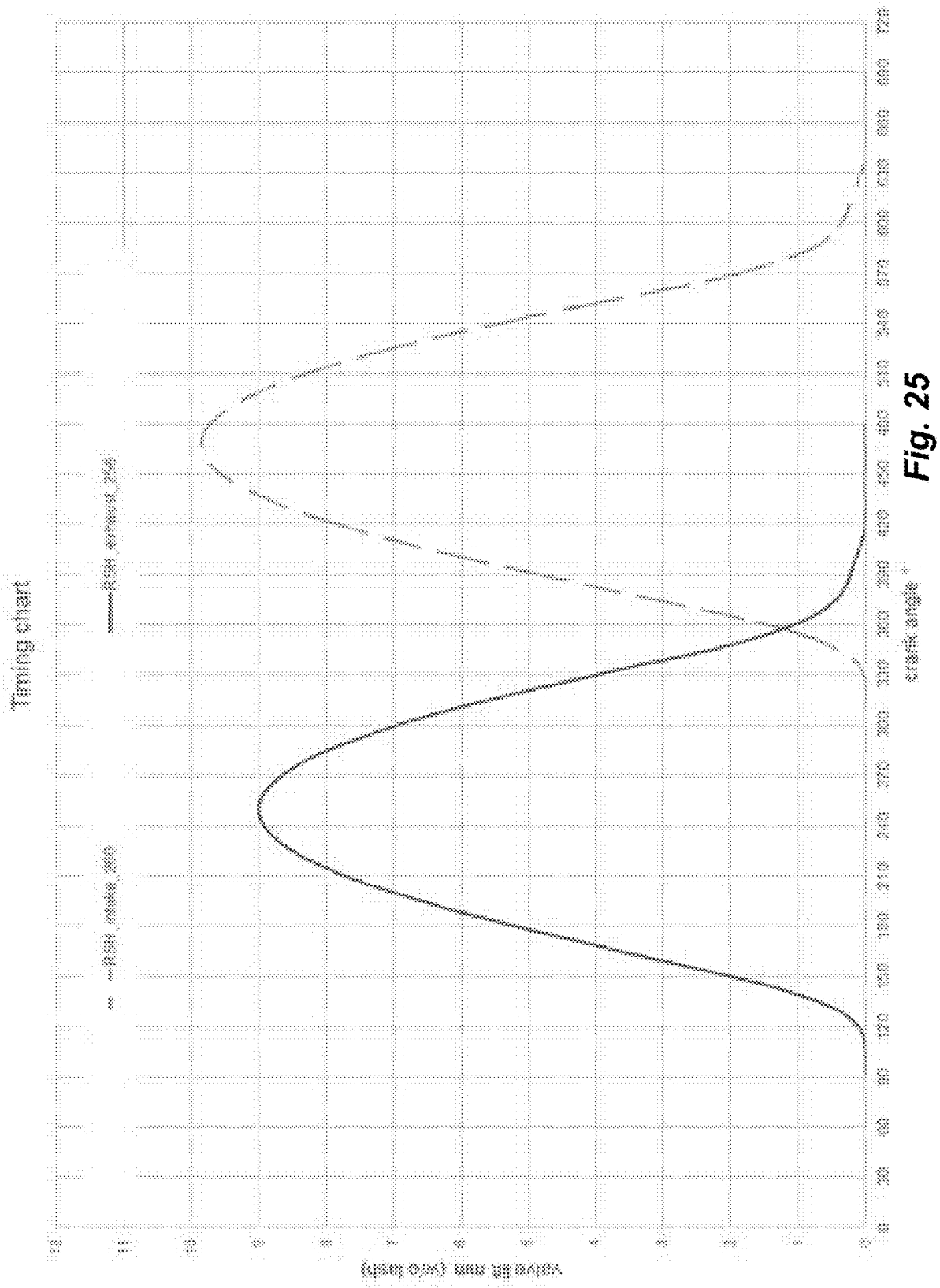
FIG. 25 is a timing chart regarding valves of the engine of FIG. 1.
Figure 26:
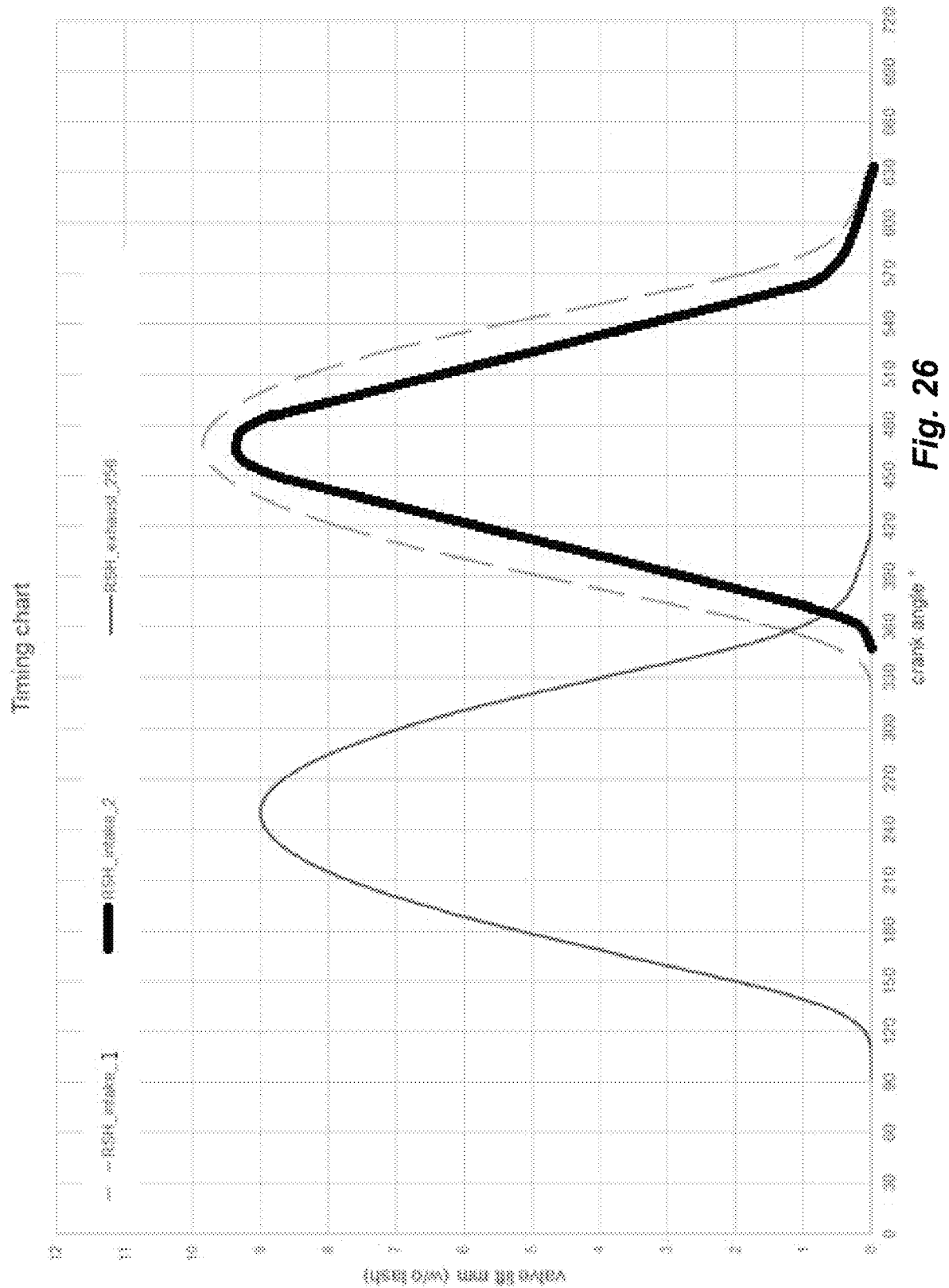
FIG. 26 is an alternative timing chart regarding valves of the engine of FIG. 1.

FIG. 21 (which is a cross-sectional view taken along line 21-21 in FIG. 20) and FIGS. 22-24 show the intake valves 118, 120 and exhaust valves 126, 128 in various states, including (a) all valves 118, 120, 126, 128 in a closed configurations (see FIGS. 21 and 22), (b) the intake valves 118, 120 in an open configuration and the exhaust valves 126, 128 in a closed configuration (see FIG. 23), and (c) the intake valves 118, 120 in the closed configuration and the exhaust valves 126, 128 in an open configuration (see FIG. 24). In some versions, the intake valves 118, 120 have the same lift and timing curves as each other, and the exhaust valves 126, 128 have the same lift and timing curves as each other (see FIG. 25). In other versions, the intake valves 118, 120 may have different lift and timing curves than each other to facilitate increasing swirl and mixing of the fuel and air within the cylinder and promote complete combustion (see FIG. 26).

Figure 17:
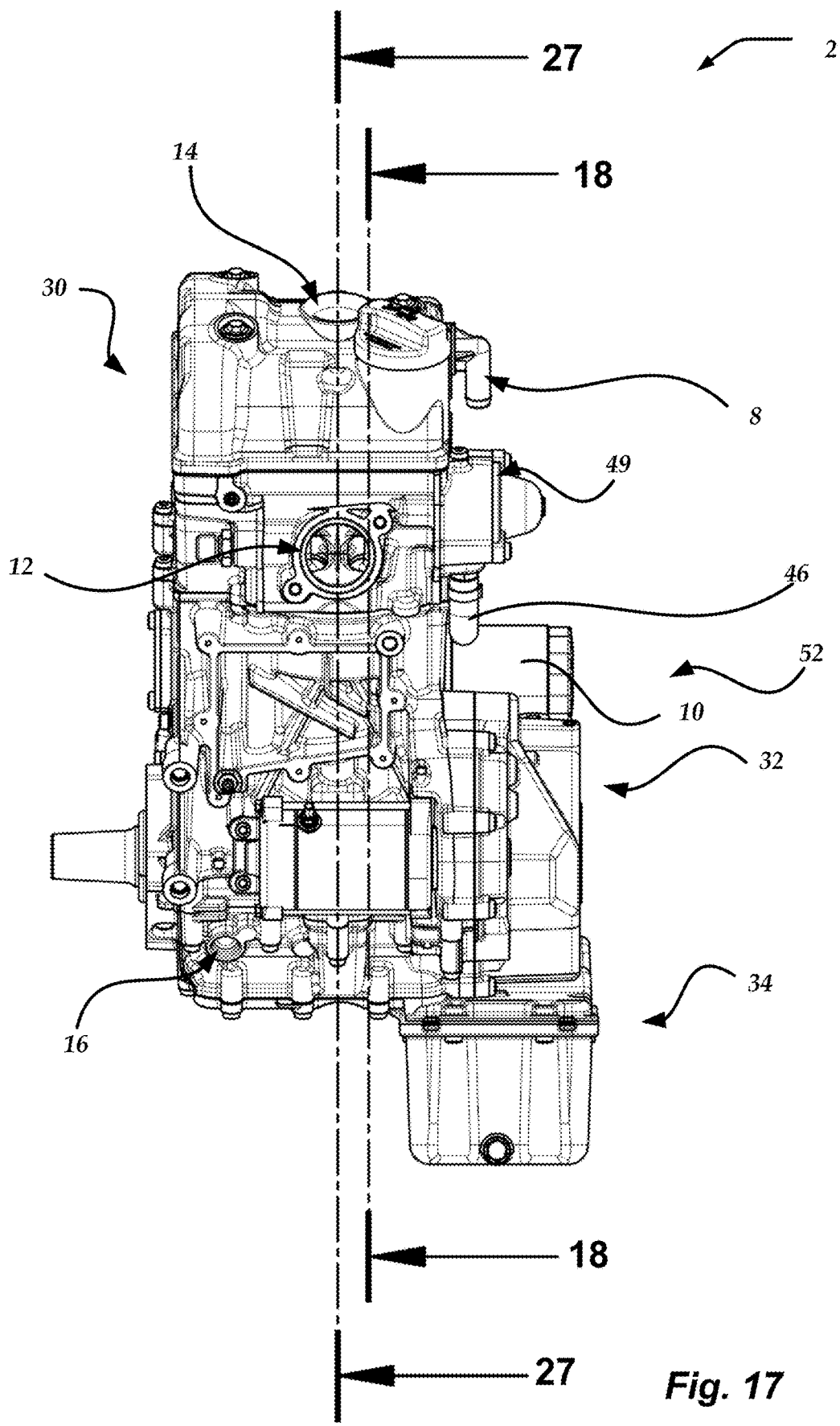
FIG. 17 is a rear-side elevational view of the engine of FIG. 1.
Figure 18:
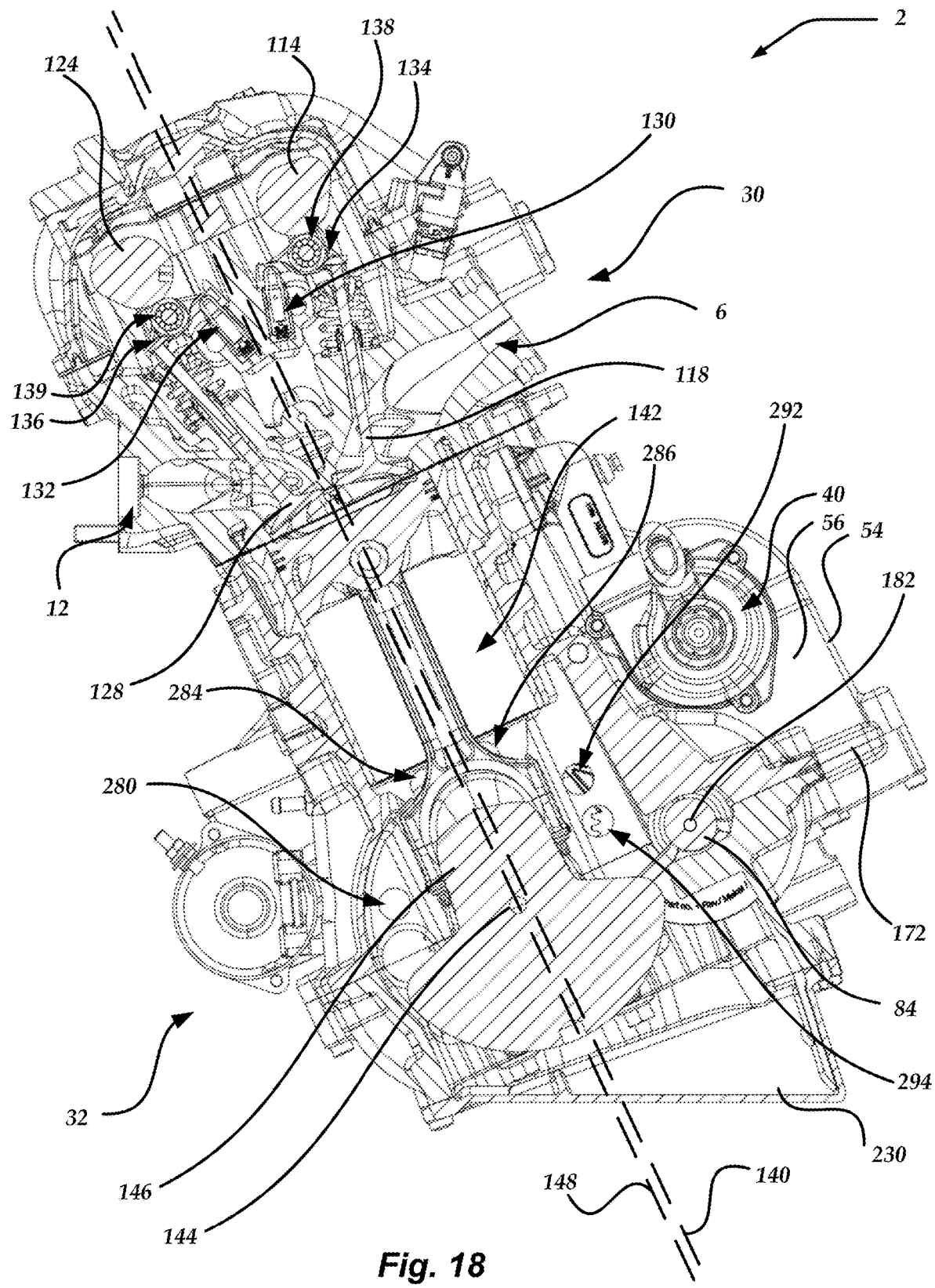
FIG. 18 is a cross-sectional view taken along line 18-18 in FIG. 17.
Figure 27:
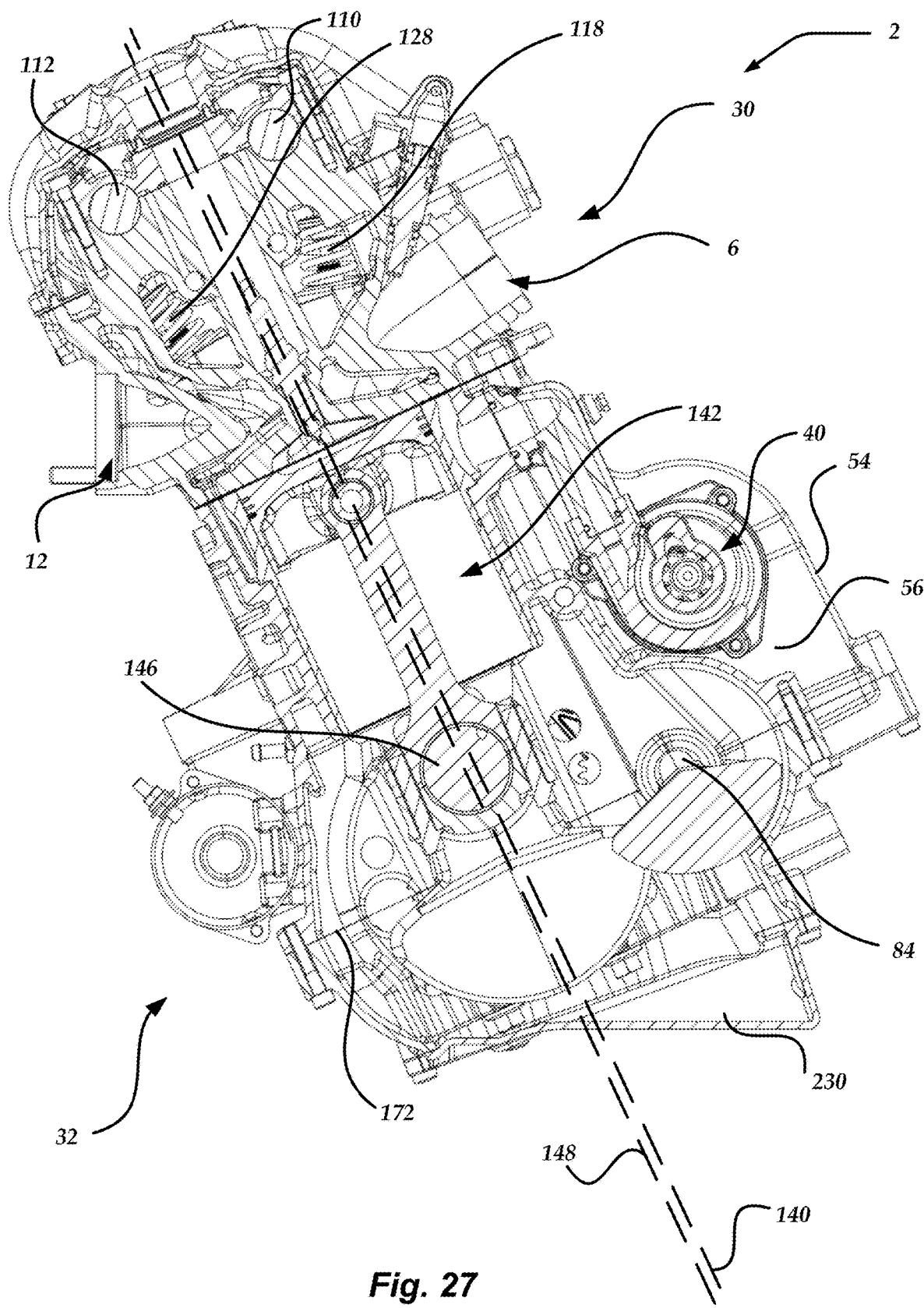
FIG. 27 is a cross-sectional view taken along line 27-27 in FIG. 17.

In some embodiments, the valve stems of the intake valves 118, 120 are oriented transverse to the valve stems of the exhaust valves 126, 128, and all of the valve stems are in some versions oriented transverse to the center axis 140 of the cylinder bore 142 (see FIGS. 18 and 27, which are cross-sectional views taken along lines 18-18 and 27-27 in FIG. 17). FIGS. 18 and 27 show the positions and orientations of the internal components of the upper engine portion 30 relative to the internal components of the lower engine portion 32. In some embodiments, the center axis 140 of the cylinder bore 142 is offset from the rotational axis 144 of the crankshaft 146 (see FIG. 18), which extends along plane 148 that is parallel to the center axis 140 of the cylinder bore 142 (see FIGS. 18 and 27), to reduce friction during an expansion phase of the combustion cycle. In some embodiments, the offset is 2, 3, 4, 5, 6, 7 or more millimeters. In some versions, the center axis 140 is disposed forward of the rotational axis 144. In some versions where the center axis 140 is disposed transverse to the vertical direction 150 when the engine 2 is in the default orientation (see FIG. 28), the center axis 140 is disposed above the plane 148 and, in some versions, forward of the plane 148 (see FIGS. 18 and 27).

Figure 28:
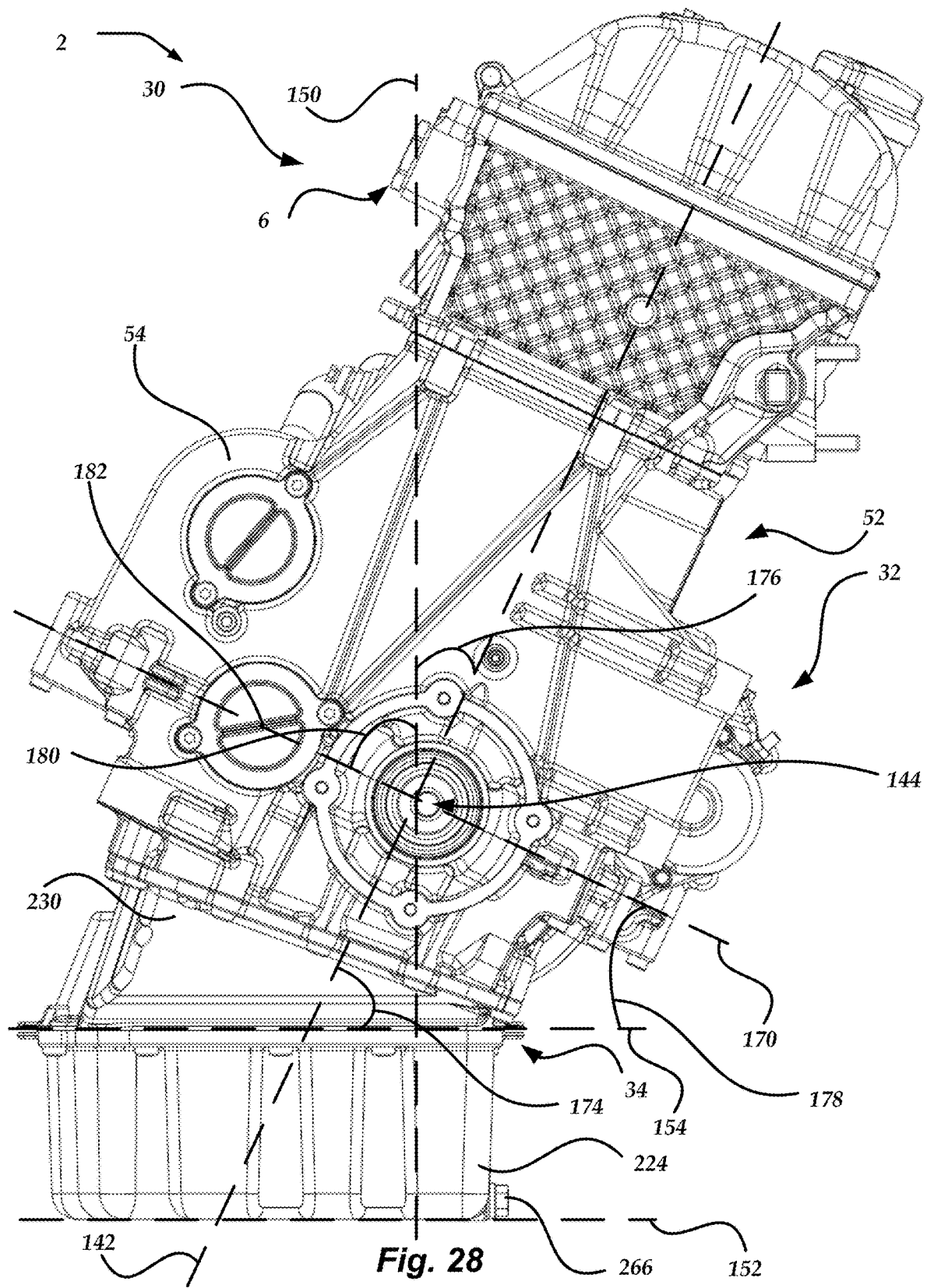
FIG. 28 is a left-side elevational view of the engine of FIG. 1.

In some embodiments, the center axis 140 of the cylinder bore 142 is transverse (for example, perpendicular) to a plane 170 in which the split 172 in the crankcase 52 lies (see FIGS. 18, 27, and 28). In some embodiments, the split 172 is transverse to the plane 152 in which the major bottom surface of the oil pan assembly 34 lies and, in some versions, to the plane 154 in which the split in the oil pan assembly 34 lies. In some versions, one or more of the center axis 140 or the split 172 may be oriented at an angle (for example, angle 174, angle 176, angle 178, or angle 180) of 5, 10, 15, 20, 25, 30, or more degrees relative to the vertical direction 150 or the horizontal direction when the engine 2 is in the default orientation. In some embodiments, the split 172 is horizontal when the bottom of the crankcase 52 rests on a horizontal surface (see FIG. 29).

Figure 29:
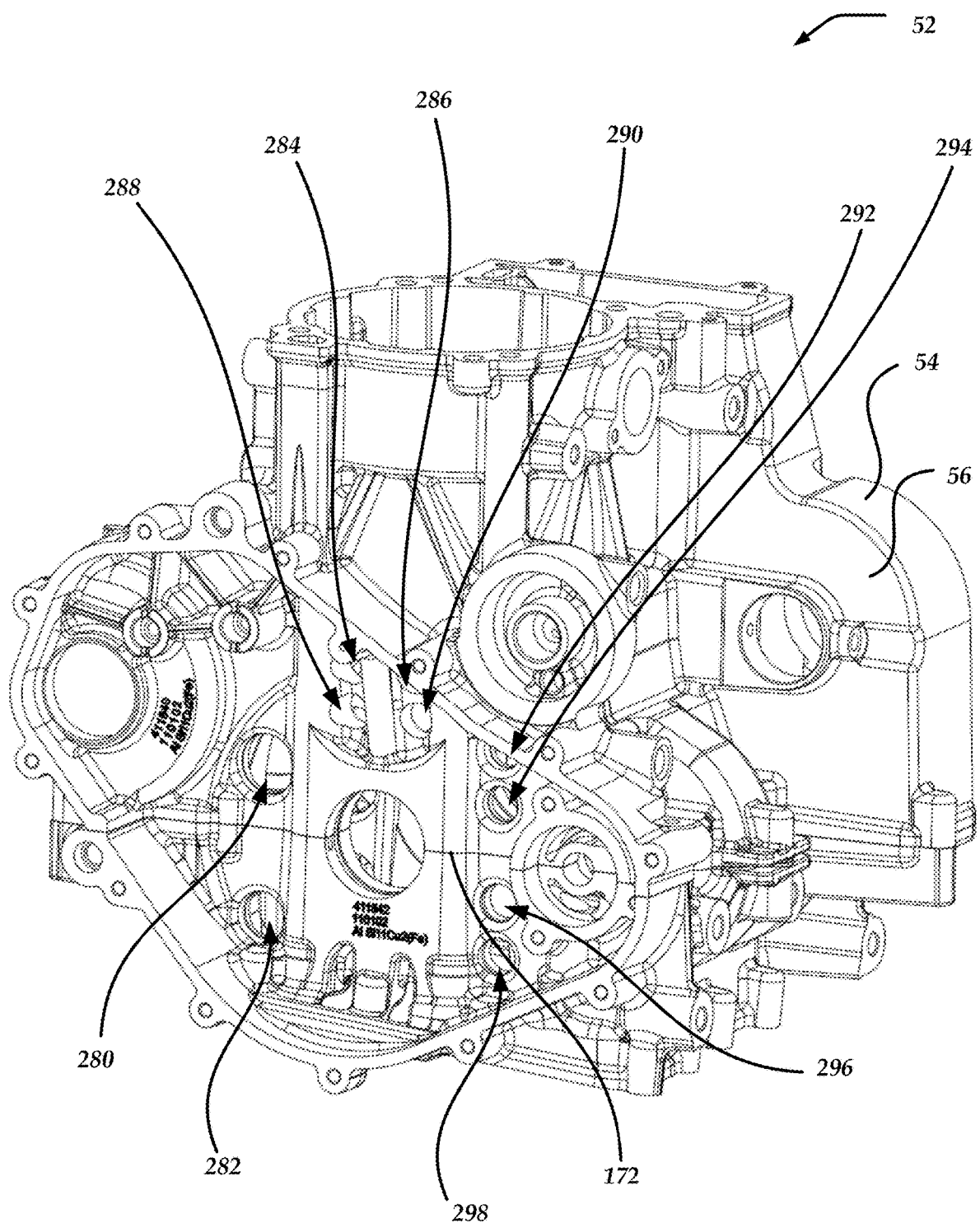
FIG. 29 is an isometric front view of a crankcase of the engine of FIG. 1.
Figure 30:
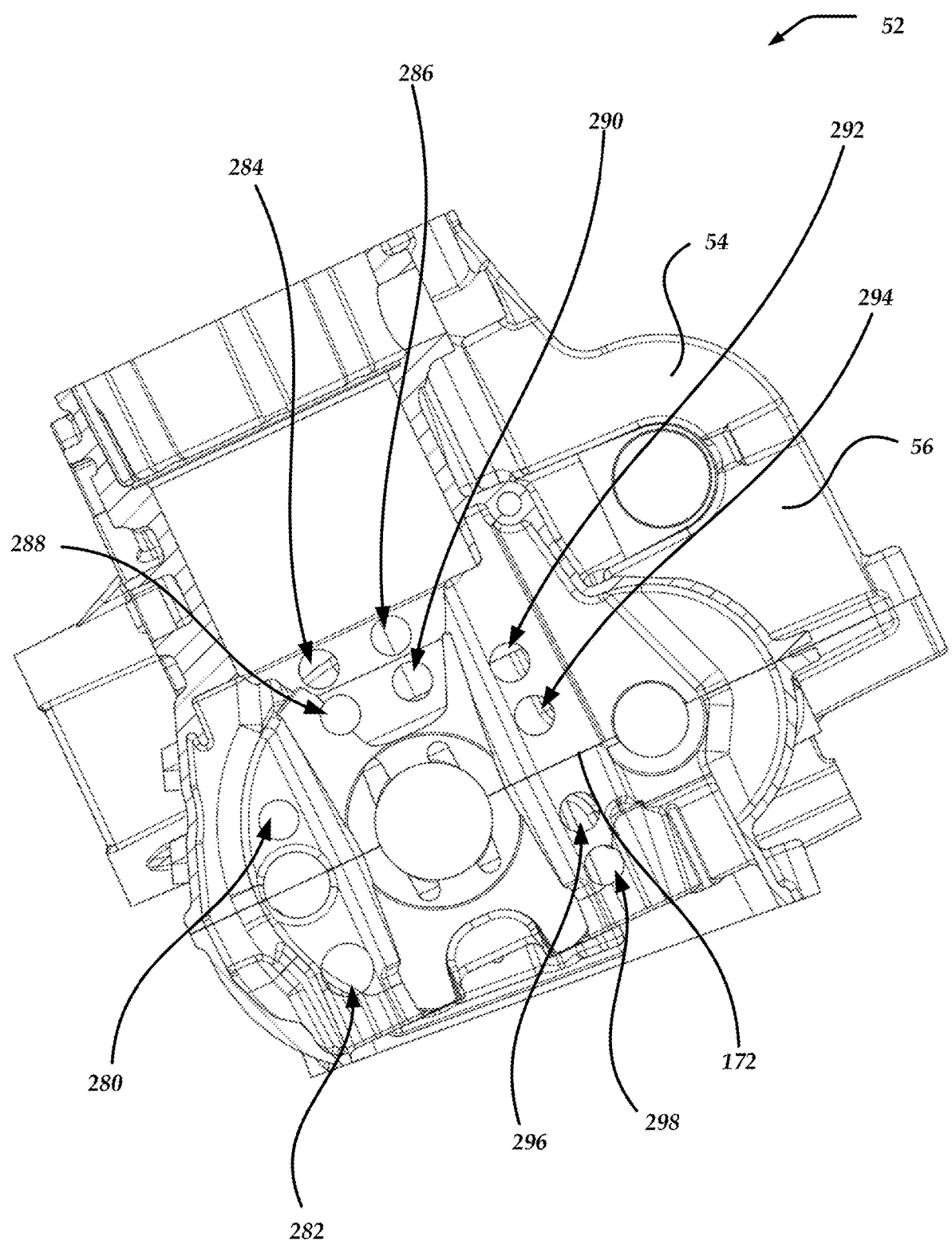
FIG. 30 is a right-side elevational view of the crankcase of the engine of FIG. 1.

In some embodiments, one or more of the crankshaft 146 or the balancer shaft 84 at least partially extend along the plane 170 in which the split 172 in the crankcase 52 lies (see FIGS. 18, 28, and 29). In some embodiments, one or more of the rotational axis 144 of the crankshaft 146 or the rotational axis 182 of the balancer shaft 84 extend along the plane 170 in which the split 172 in the crankcase 52 lies (see FIGS. 18 and 28). In some embodiments, the rotational axes 144 and 182 are oriented parallel to the plane 170 (see FIG. 28). In some embodiments, the rotational axis 182 of the balancer shaft 84 is disposed forward of the rotational axis 144 of the crankshaft 146. In some versions where the center axis 140 is disposed transverse to the vertical direction 150 when the engine 2 is oriented in the default orientation, the rotational axis 182 of the balancer shaft 84 is disposed above the rotational axis 144 of the crankshaft 146.

Figure 33:
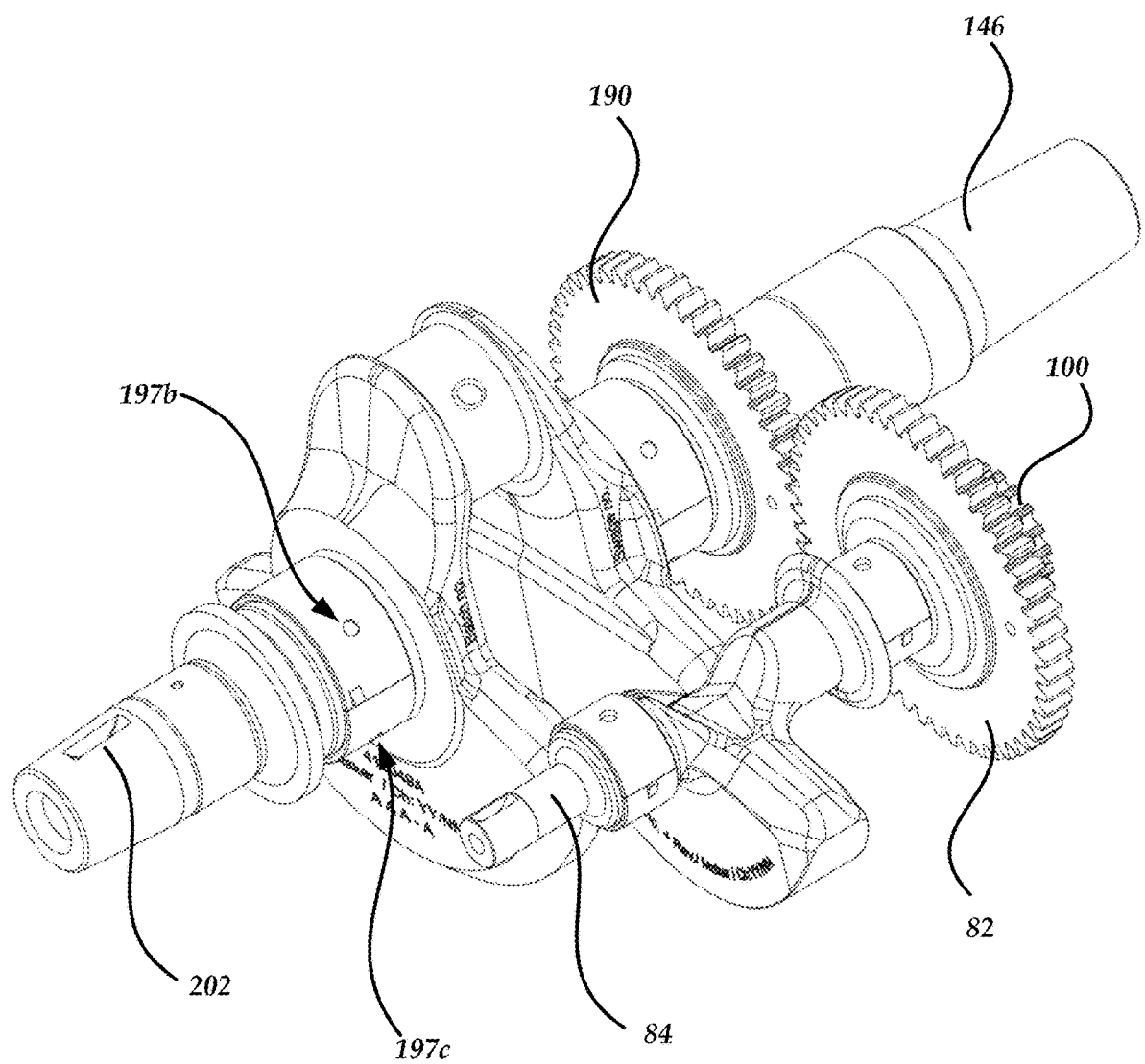
FIG. 33 is an isometric front view of a crankshaft and balancer shaft of the engine of FIG. 1.
Figure 54:
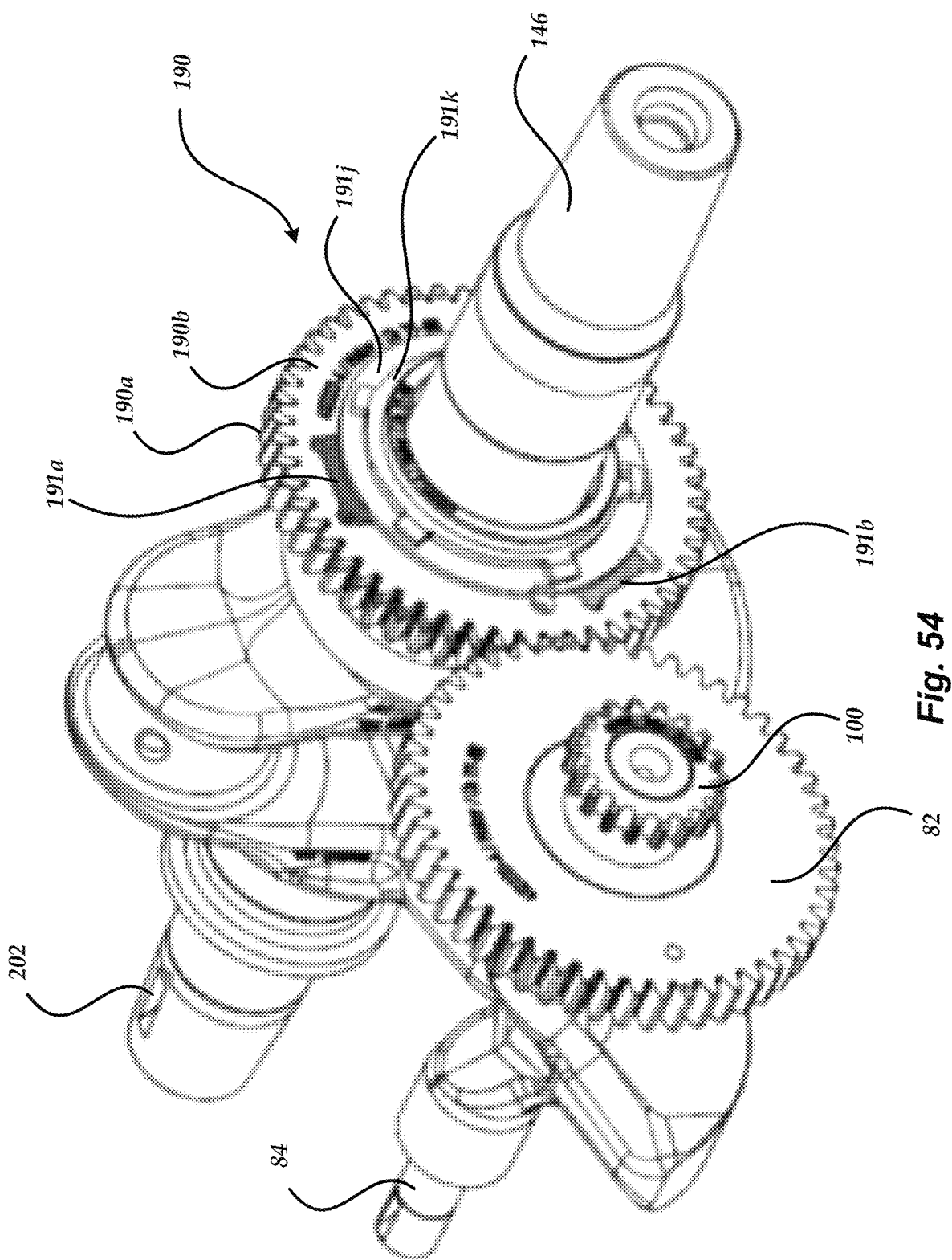
FIG. 54 is an isometric view of the crankshaft and balancer shaft of the engine of FIG. 1, with the crankshaft having dual crankshaft gears that are spring loaded.
Figure 55:
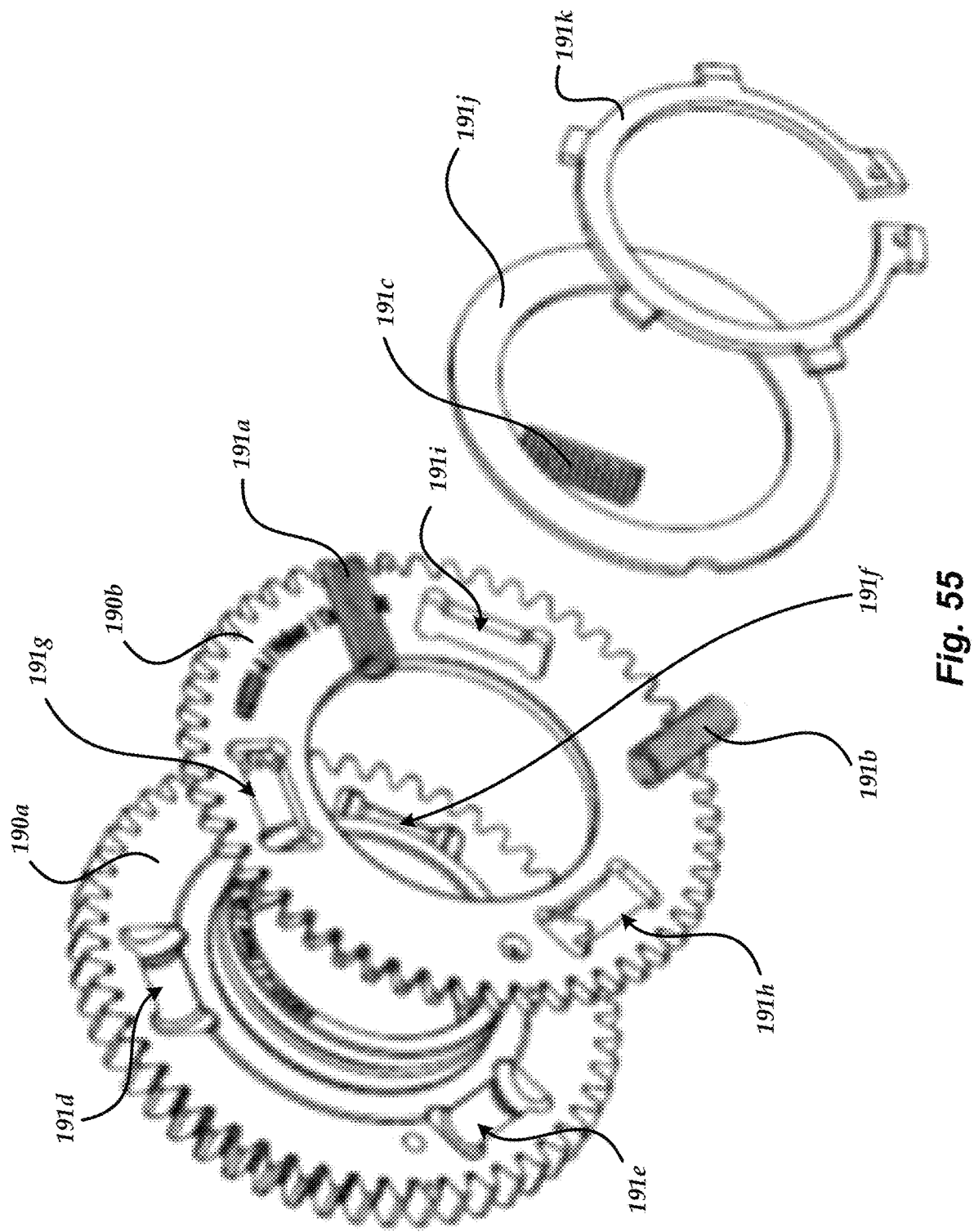
FIG. 55 is an isometric exploded view of the dual crankshaft gears of FIG. 54.

In some embodiments, the crankshaft 146 is monolithic, as opposed to a three-piece crankshaft as typically found in single-cylinder engines (see FIGS. 18, 27, 33, 35, and 36). In some embodiments, the crankshaft 146 has a crank gear 190 that engages and drives the balancer gear 82 (FIG. 33). In some embodiments, the crank gear 190 has a 1:1 ratio with the balancer gear 82, both in terms of diameter and number of teeth. In some versions, the crank gear 190 has one more or less tooth than the balancer gear 82 (for example, a 51:50 ratio) to facilitate improving wear behavior compared to a 1:1 ratio for number of teeth in which the same tooth of one gear always hits the same countertooth in the other gear. In some versions, one or both of the crank gear 190 and the balancer gear 82 may include two gears, such as gears 190a, 190b (see FIGS. 54 and 55) that are spring loaded relative to each other to facilitate absorbing gear backlash (i.e., gearlash) and reducing gear noise. For example, the crank gear 190 may be formed of two adjacent, concentric gears 190a, 190b, wherein a first one of the gears 190a is fixed relative to the crankshaft 146 while the second gear 190b is rotatable relative to the crankshaft 146 and the first gear 190a, with one or more springs such as springs 191a-c pre-loading the two gears 190a, 190b relative to each other. Such an arrangement preferably facilitates a tooth face of the first gear 190a and an oppositely facing tooth face of the second gear 190b defining a tooth receptacle that receives a corresponding tooth of the balancer gear 82 between those tooth faces such that those tooth faces press the opposite faces of the received tooth of the balancer gear 82 to facilitating absorbing backlash. As shown in FIG. 55, the first gear 190a preferably defines one or more recesses, such as recesses 191d-f, that are configured to receive the springs 191a-c. The second gear 190b preferably defines one or more holes, such as holes 191g-i, that are configured to receive the springs 191a-191c. One or more rings, such as rings 191j, 191k, are configured to secure the position of the second gear 190b along the longitudinal axis of the crankshaft 146 while allowing the second gear 190b to rotate relative to the first gear 190a.

Figure 34:
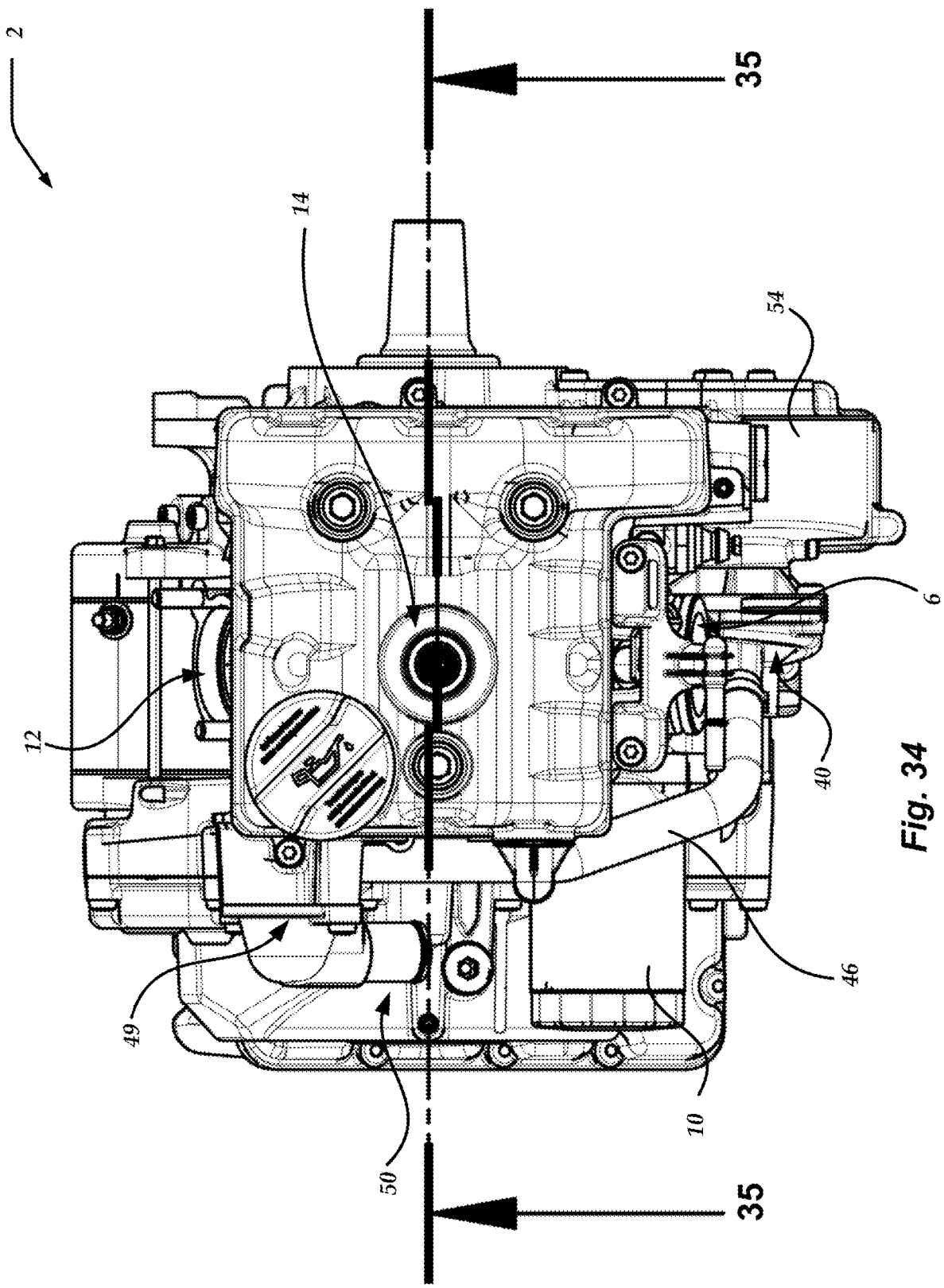
FIG. 34 is a top view of the engine of FIG. 1.
Figure 35:
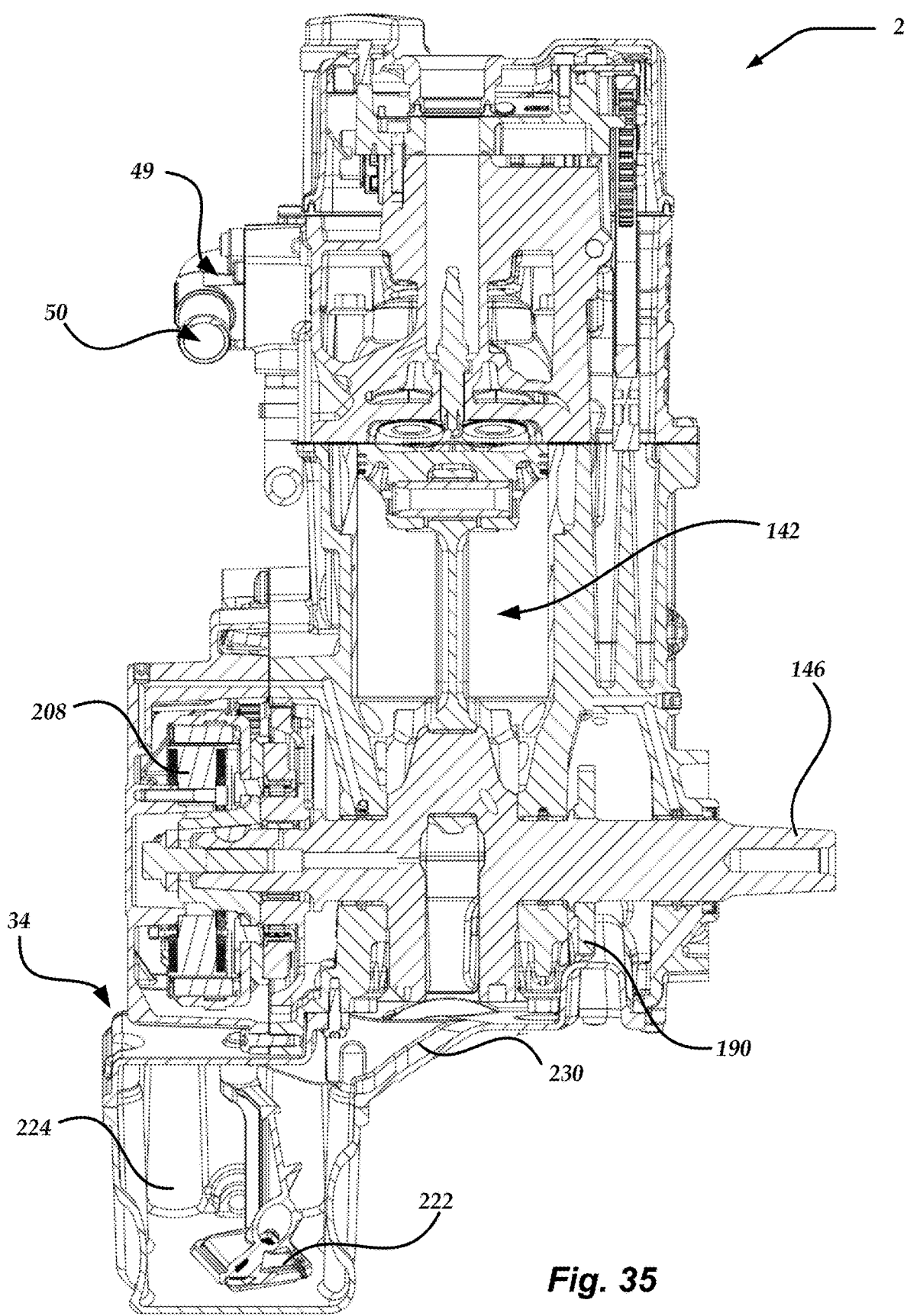
FIG. 35 is a stepped cross-sectional view taken along stepped line 35-35 in FIG. 34.
Figure 36:
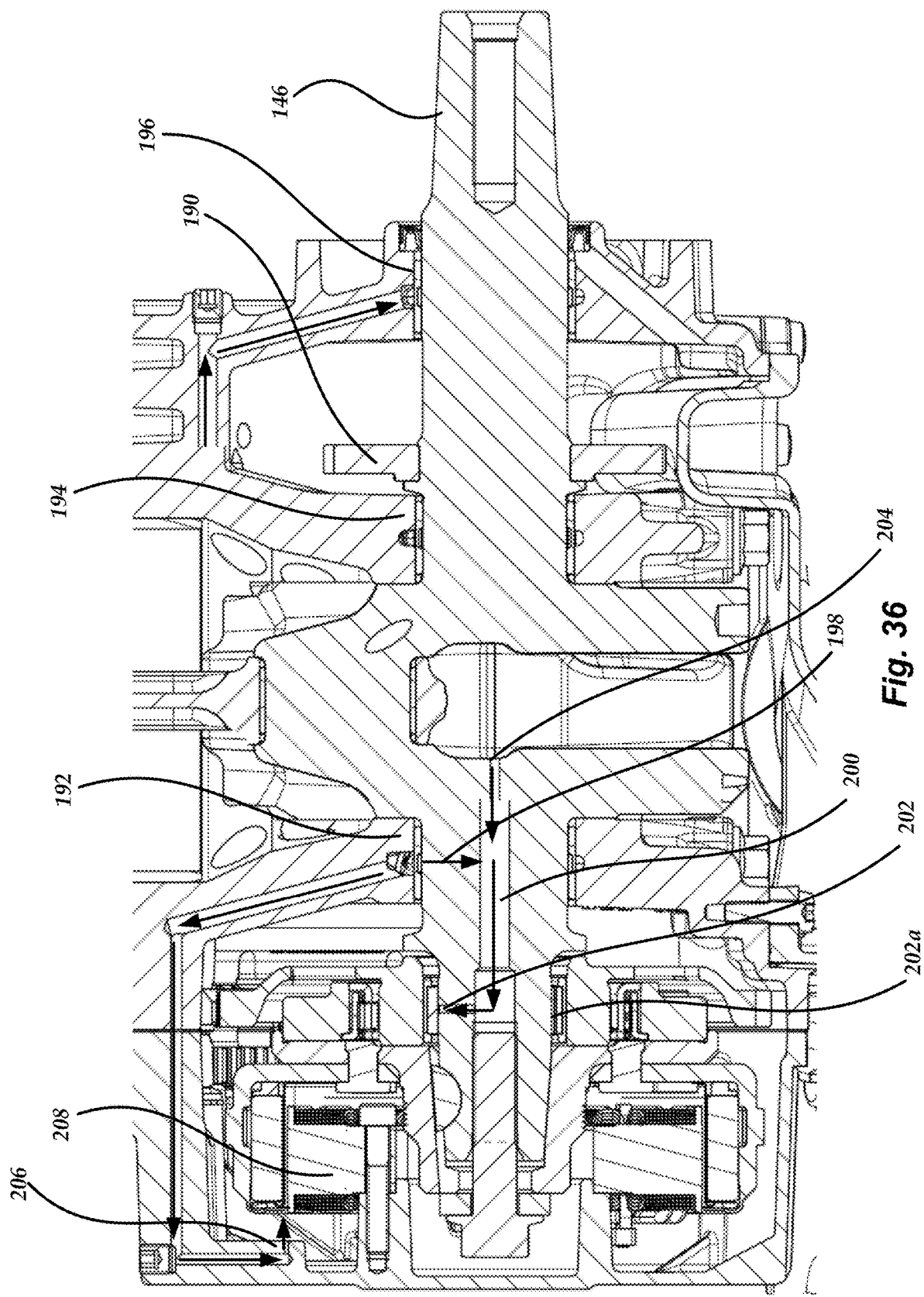
FIG. 36 is a close-up view of a portion of the stepped cross-sectional view of FIG. 35.

In some embodiments, the crank gear 190 has a thickness that is equal to the thickness of the balancer gear 82. In some embodiments, the crankshaft 146 has a drilled oil bore that extends to one or more main bearings or support bearings, such as a main bearing 192, a main bearing 194, or a main bearing 196, which in some versions are each plain bearings (see FIG. 36, which is a close-up view of a portion of FIG. 35, which is a cross-sectional view taken along line 35-35 in FIG. 34). For example, an oil bore such as one or more of oil bores 197a-d (see FIGS. 9, 11, 14-16, and 33; not shown in FIG. 36 because they are in a different plane due to the rotational position of the crankshaft 146 as shown in FIG. 36) represented by arrow 198 in FIG. 36 may extend from the main bearing 192 to an oil bore 200 that in some versions extends along the rotational axis 144 of the crankshaft 146 and, in some versions, transfers the oil to one or more nozzles, such as a nozzle 202 or an oil-mist-supply opening 204 (see FIG. 36). In some embodiments, the nozzle 202 supplies oil to the needle bearing 202a that surrounds it. In some embodiments, the oil-mist-supply opening 204 is configured to receive oil mist as indicated by the corresponding arrow in FIG. 36 (for example, in embodiments devoid of pressure oil supply). In other embodiments, the opening 204 is nonexistent or is plugged (for example, in embodiments employing pressurized oil supply). In some embodiments, oil that is provided to the main bearing 192 of the crankshaft 146 is subsequently transferred to a nozzle 206 that sprays the oil onto the rotor 208 (see FIGS. 36-38).

Figure 37:
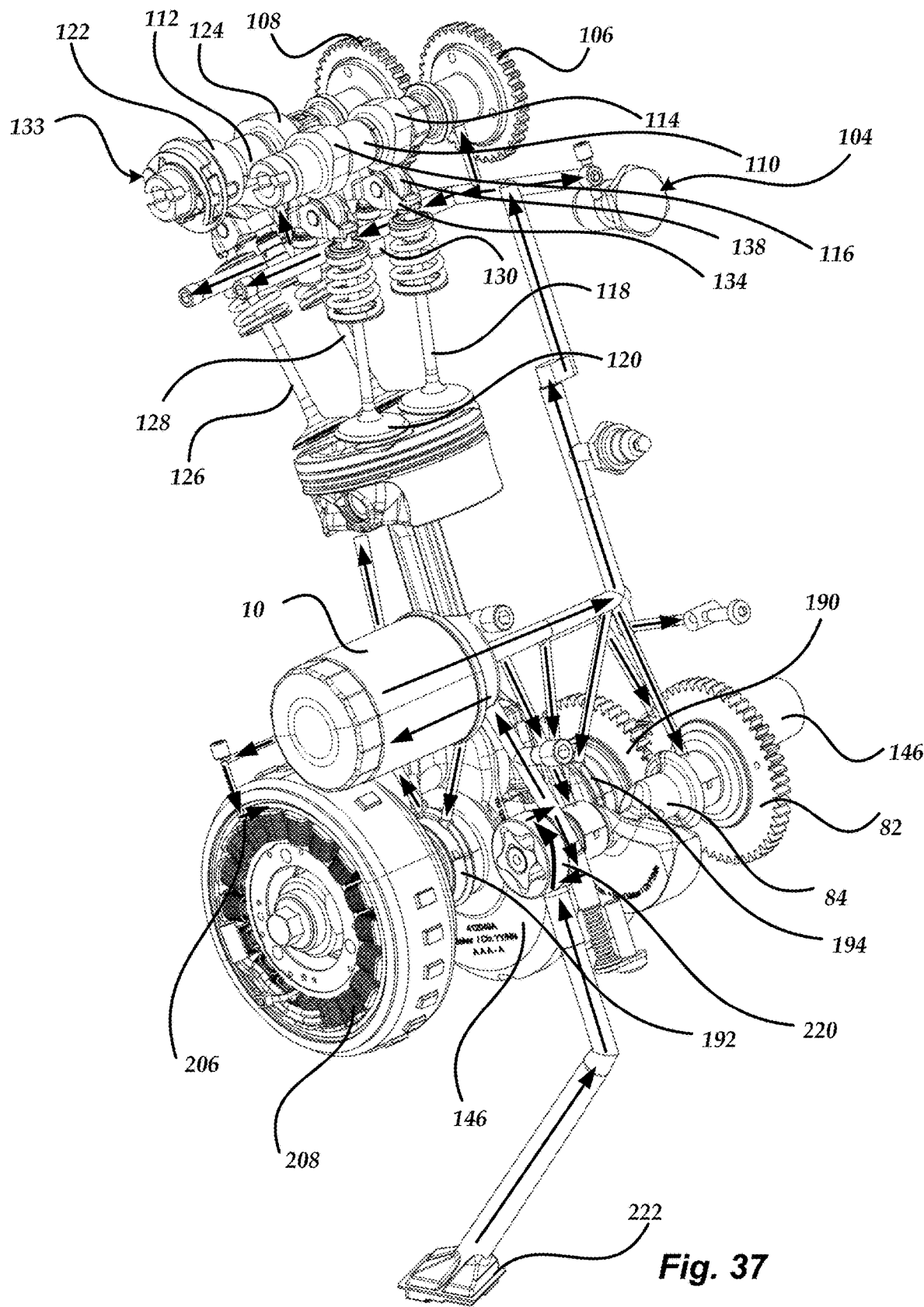
FIG. 37 is an isometric front view of internal components of the engine of FIG. 1, showing oil flow paths of the engine.
Figure 38:
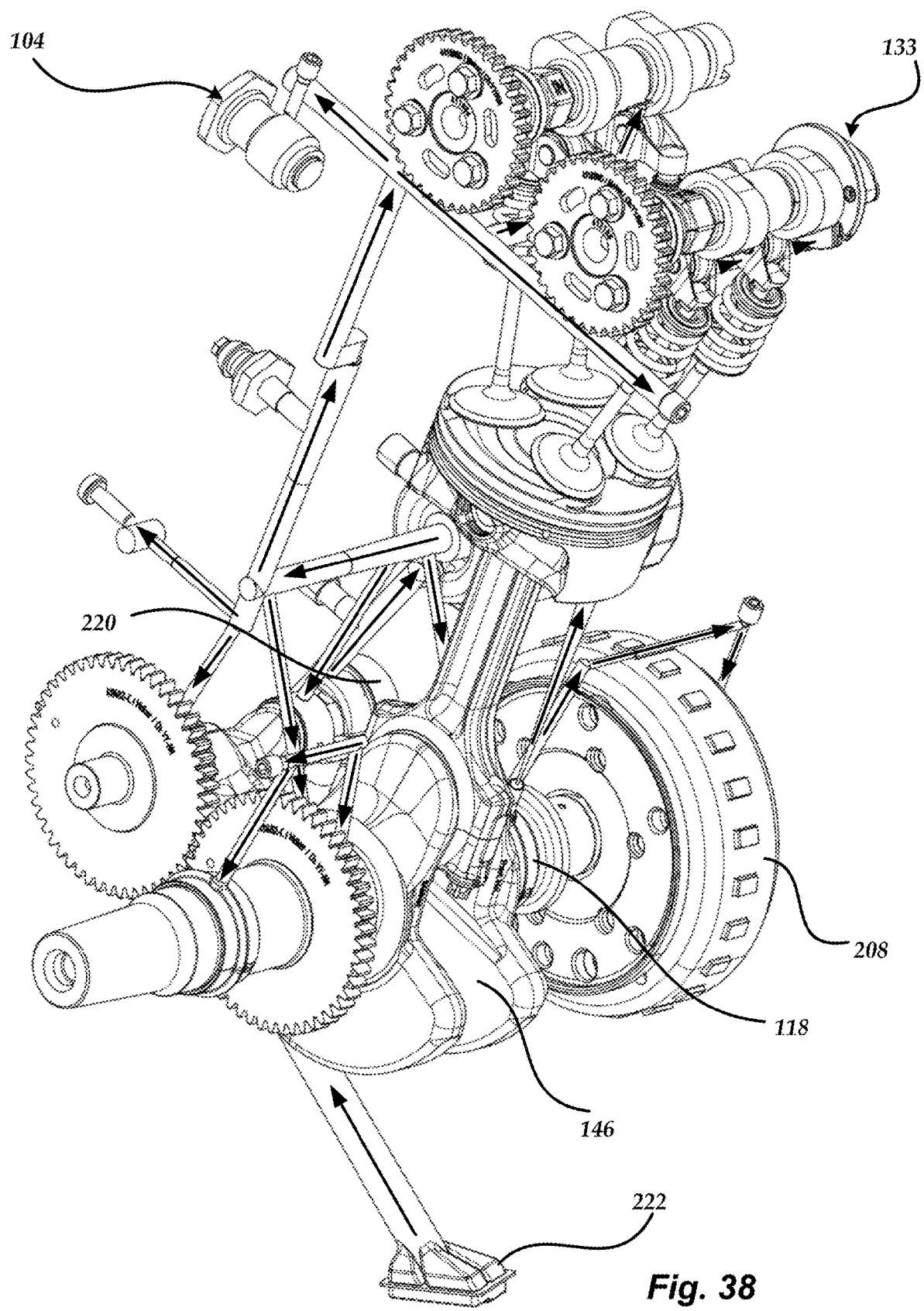
FIG. 38 is an isometric rear view of internal components of the engine of FIG. 1, showing oil flow paths of the engine.

FIGS. 36-38 show arrows that provide logical representations of oil flow paths through the engine 2 according to some embodiments. In some embodiments, an oil pump 220 draws the oil from the oil pan assembly 34 and pressurizes the oil along the oil flow paths throughout the engine 2 (see FIGS. 37 and 38). In some embodiments, the oil pump 220 pulls the oil through a pickup strainer 222 disposed in a lower oil pan portion 224 of the oil pan assembly 34. In some embodiments, the engine 2 has one or more of a first oil-line connection port 226 or a second oil-line connection port 228 that facilitate providing oil to or from an external oil cooler (not shown) (see FIG. 1).

Figure 39:
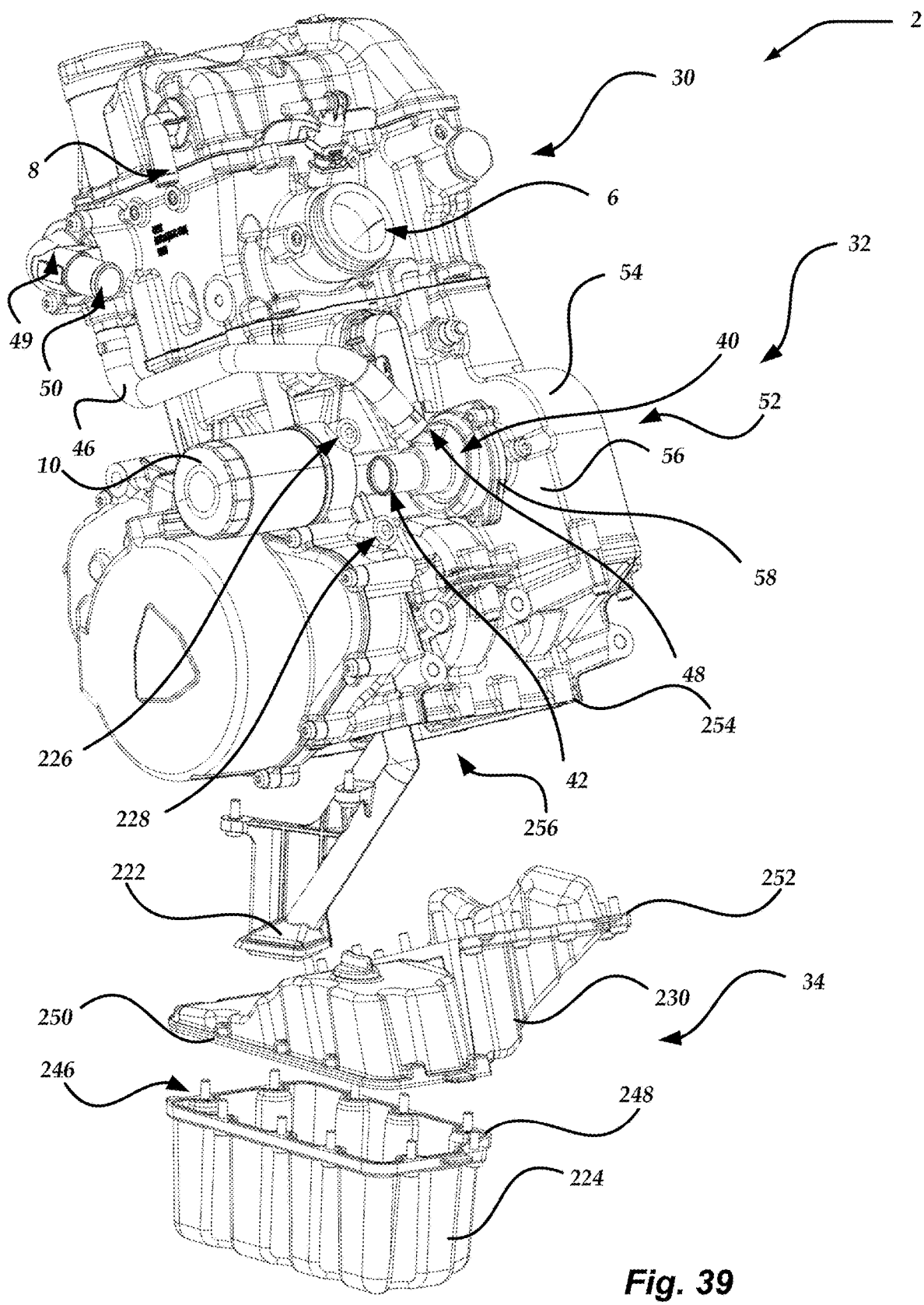
FIG. 39 is an isometric front, partially exploded view of the engine of FIG. 1.
Figure 40:
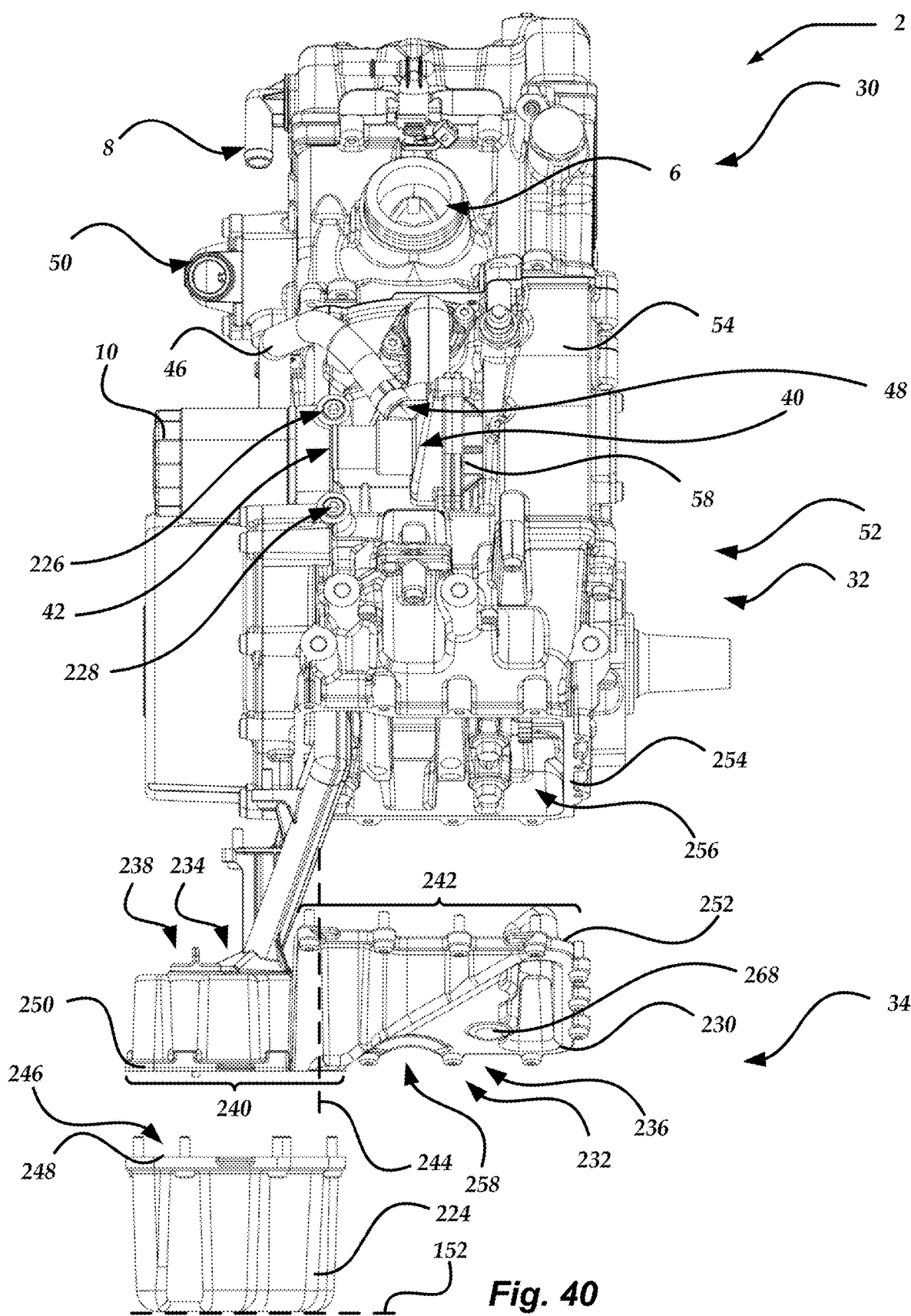
FIG. 40 is a front, partially exploded elevational view of the engine of FIG. 1.
Figure 41:
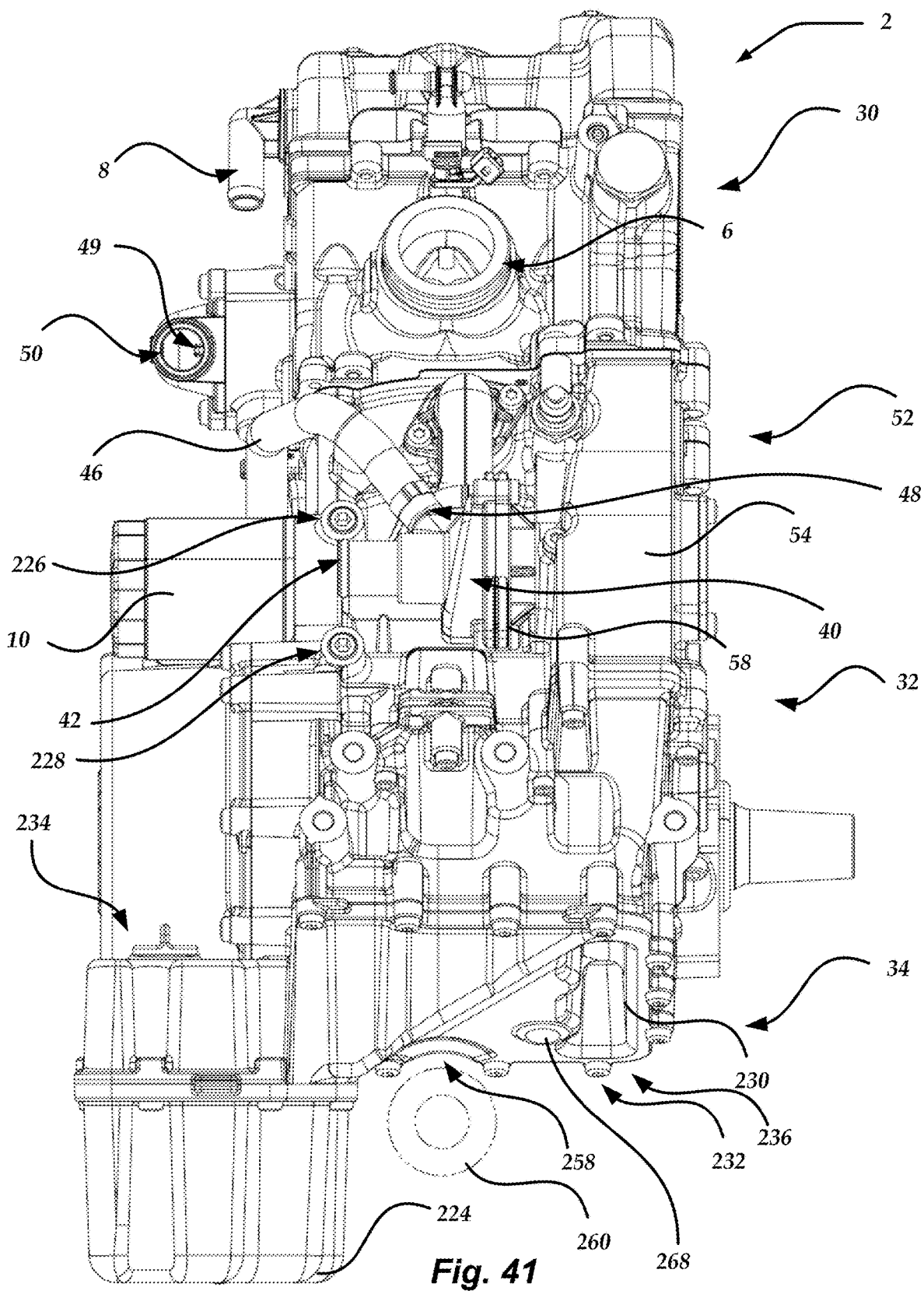
FIG. 41 is a front-side elevational view of the engine of FIG. 1, with a driveshaft of a vehicle in which the engine is installed.

In some embodiments, the top of the lower oil pan portion 224 couples to the bottom of an upper oil pan portion 230 (see FIG. 39). In some embodiments, the upper oil pan portion 230 has an open top portion 232 and an open bottom portion 234 (see FIG. 40). In some embodiments, the bottom 236 of the open top portion 232 is closed (for example, half closed, majority closed, or entirely closed) (see FIG. 40). In some embodiments, the top 238 of the open bottom portion 234 is closed (for example, half closed, majority closed, or entirely closed). In some embodiments, the open bottom 240 of the upper oil pan portion 230 overlaps the open top 242 of the upper oil pan portion 230. For example, as shown in FIG. 41, the open bottom 240 of the upper oil pan portion 230 and the open top 242 of the upper oil pan portion 230 may laterally extend (from left to right or right to left when viewing the engine 2 from the front or the rear, as in FIGS. 41 and 17) such that a vertical line (for example, a vertical line 244) may be drawn that extends through both the open bottom 240 and the open top 242 (see FIG. 40). In some embodiments, less than half, and in some versions less than one third, of the open bottom 240 overlaps the open top 242. In some embodiments, less than half, and most preferably less than one fifth, of the open top 242 overlaps the open bottom 240.

In some embodiments, the top 246 of the lower oil pan portion 224 is open and, in some versions, is configured to correspond to the open bottom portion 234 of the upper oil pan portion 230 (see FIG. 39). In some embodiments, the open top 246 of the lower oil pan portion 224 has a rim 248 along the perimeter of the open top 246, and the open bottom 240 of the upper oil pan portion 230 preferably has a corresponding rim 250 along the perimeter of the open bottom 240 that mates with the rim 248 of the lower oil pan portion 224 to couple the lower oil pan portion 224 to the upper oil pan portion 230. In some embodiments, the open top 242 of the upper oil pan portion 230 has a rim 252 around its perimeter that is configured to correspond to a rim 254 around the perimeter of the open bottom 256 of the crankcase 52 to couple the oil pan assembly 34 to the crankcase 52 (see FIGS. 39 and 40).

Figure 46:
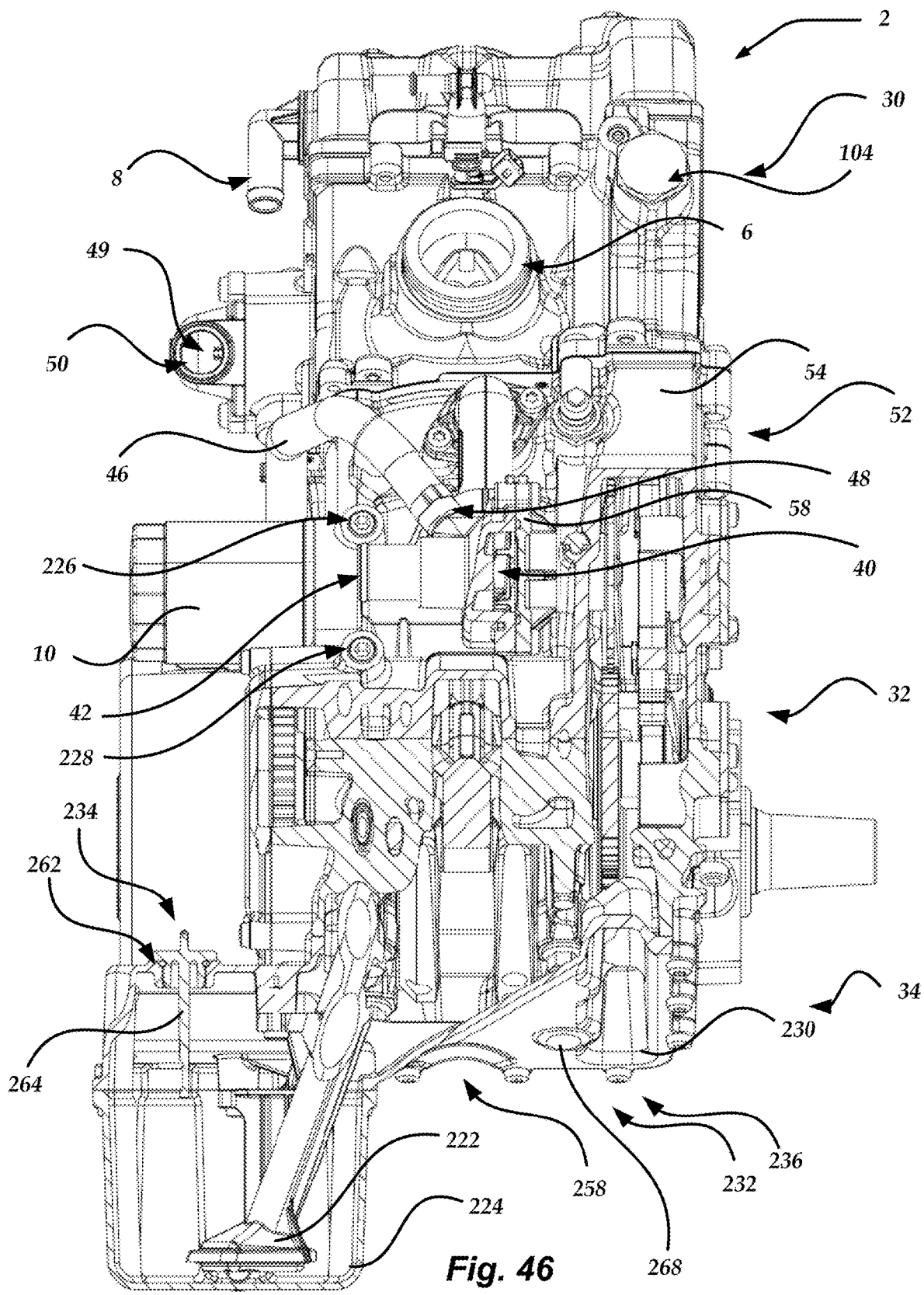
FIG. 46 is a cross-sectional view taken along line 46-46 in FIG. 15, with the engine being devoid of oil.

In some embodiments, the closed bottom 236 of the open top portion 232 of the upper oil pan portion 230 has a drive shaft recess 258 that is configured to at least partially receive a drive shaft 260 of the vehicle (see FIG. 41). For example, the drive shaft recess 258 preferably has a diameter or height that is 5, 10, 15, 20, 25, or more percent of the diameter of the drive shaft. In some embodiments, the drive shaft recess 258 laterally aligns with the center axis of the cylinder bore 142 (see FIG. 32). In some versions, the drive shaft recess 258 extends from the front of the upper oil pan portion 230 to the rear of the upper oil pan portion 230. In other versions, the drive shaft recess 258 extends from the front of the upper oil pan portion 230 only partially toward the rear of the upper oil pan portion 230 and, in some versions, less than one half, one third, one quarter, or one fifth of the distance from the front to the rear of the upper oil pan portion 230 (see FIG. 42). In some embodiments, the lower oil pan portion 224 is laterally offset from the drive shaft recess 258 by a distance sufficient to facilitate the lower oil pan portion 224 extending below the drive shaft 260. In some embodiments, the closed top 238 of the open bottom portion 234 resides in a plane that is parallel to the plane 154 in which the split in the oil pan assembly 34 lies (see FIG. 40) and, in some versions, has a dipstick access port 262 through which a dipstick 264 extends (see FIG. 46, which is a cross-sectional view taken along line 46-46 in FIG. 5). In some embodiments, a first oil drain 266 having an oil drain plug is disposed in the rear face of the lower oil pan portion 224 (see FIG. 2), and, in some versions, a second oil drain 268 having a second oil drain plug is disposed in the closed bottom 236 of the open top portion 232 of the upper oil pan portion 230 (see FIGS. 40-42).

In some embodiments, the closed bottom 236 of the open top portion 232 of the upper oil pan portion 230 has a slope (for example, 25, 30, 35, 40, or more degrees) that facilitates guiding oil returned to the oil pan assembly 34 through the open bottom 256 of the crankcase 52 over the drive shaft recess 258 and into the lower oil pan portion 224 (see FIGS. 1, 20, 35, 41, 42, and 45-50). In some embodiments, the closed bottom 236 slopes downward from front to back and, in some versions, slopes downward from the lateral side opposite the lower oil pan portion 224 (for example, the left side of the engine 2) to the lower oil pan portion 224. Accordingly, in some embodiments, when the engine 2 is oriented at an angle relative to the default orientation of the engine 2 (see FIGS. 48 and 49), the oil pan assembly 34 facilitates providing the oil to the lower oil pan portion 224 and covering the bottom of the oil pickup strainer 222 with oil (see FIG. 46).

The crank case 52 preferably defines one or more airflow holes (for example, cross-drilled holes), such as holes 280-

306 (see FIGS. 18, 29, 30, and 44) that facilitate increasing air flow in and between the various internal volumes, such as the volume in the crank case 52 below the cylinder bore 142, the volume in gear housing portion 54 or chain housing, the volume in the upper engine portion 30 or cylinder head, or the volume in the rotor 208 (for example, the space surrounding the stator). Such an airflow hole arrangement facilitates reducing pumping losses thereby improving efficiency and also facilitates reducing temperatures, such as oil temperature. Moreover, the oil pan configuration disclosed herein may restrict airflow to the lower end of the crank case 52 or the oil pan assembly 34, thereby increasing the benefits of such an airflow hole arrangement.

As used herein, the following terms take the meanings explicitly associated herein, unless the context clearly dictates otherwise. The term "or" is an inclusive grammatical conjunction to indicate that one or more of the connected terms may be employed. For example, the phrase "one or more A, B, or C" or the phrase "one or more As, Bs, or Cs" is employed to discretely disclose each of the following: i) one or more As, ii) one or more Bs, iii) one or more Cs, iv) one or more As and one or more Bs, v) one or more As and one or more Cs, vi) one or more Bs and one or more Cs, and vii) one or more As, one or more Bs, and one or more Cs. The term "based on" as used herein is not exclusive and allows for being based on additional factors not described. The articles "a," "an," and "the" include plural references. Plural references are intended to also disclose the singular.

Figure 5:
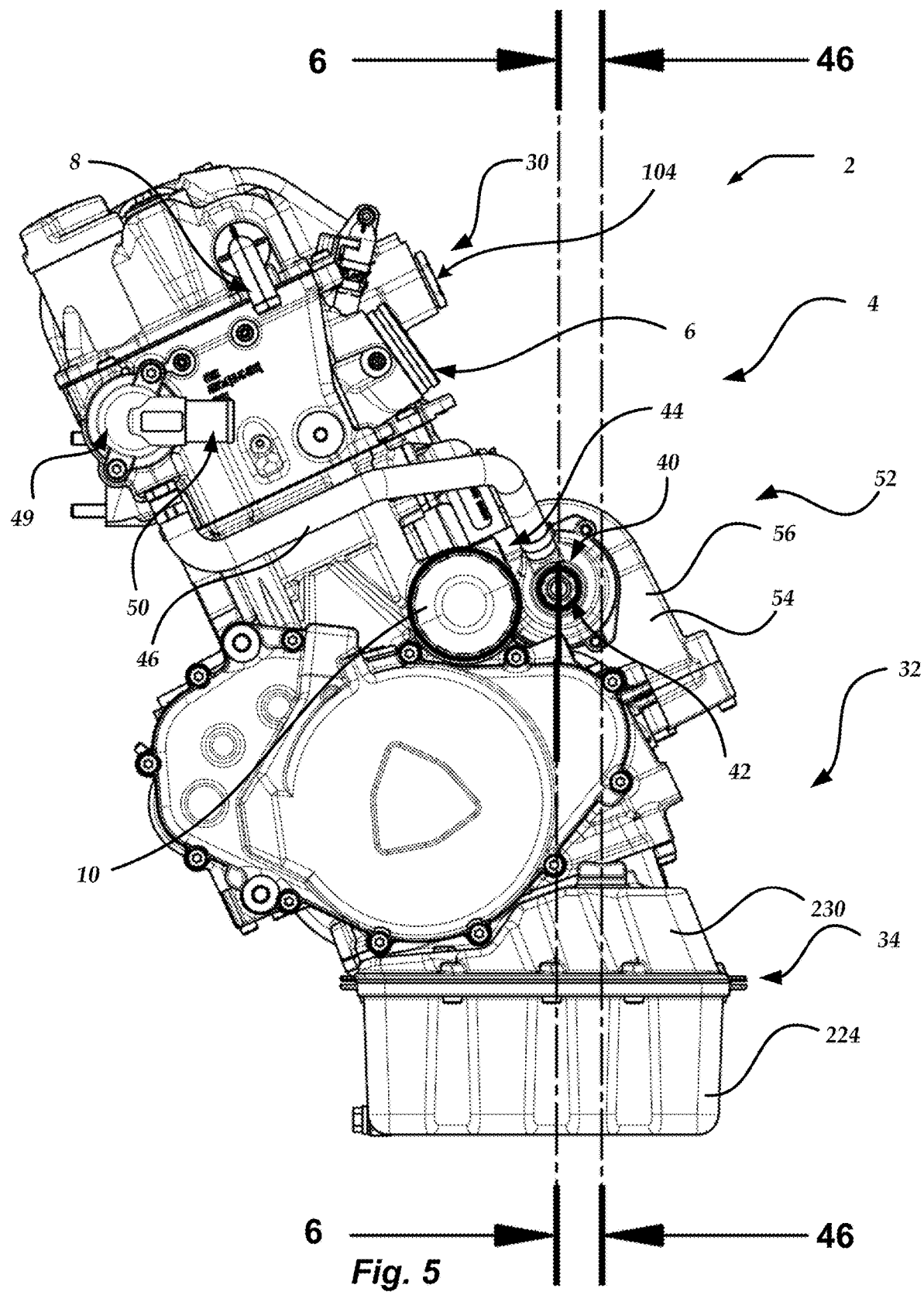
FIG. 5 is a right-side elevational view of the engine of FIG. 1.
Figure 7:
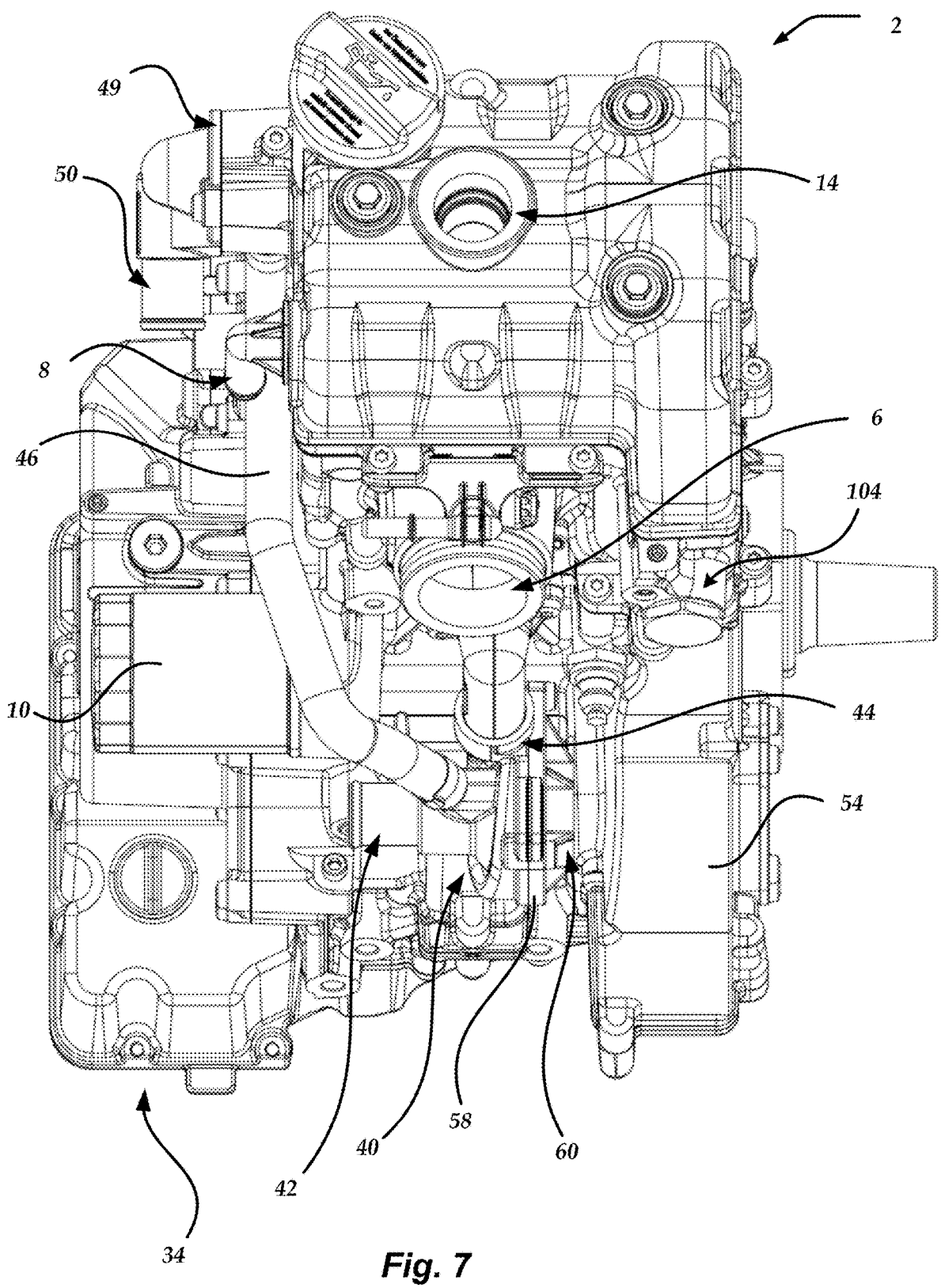
FIG. 7 is a top view of the engine of FIG. 1.
Figure 8:
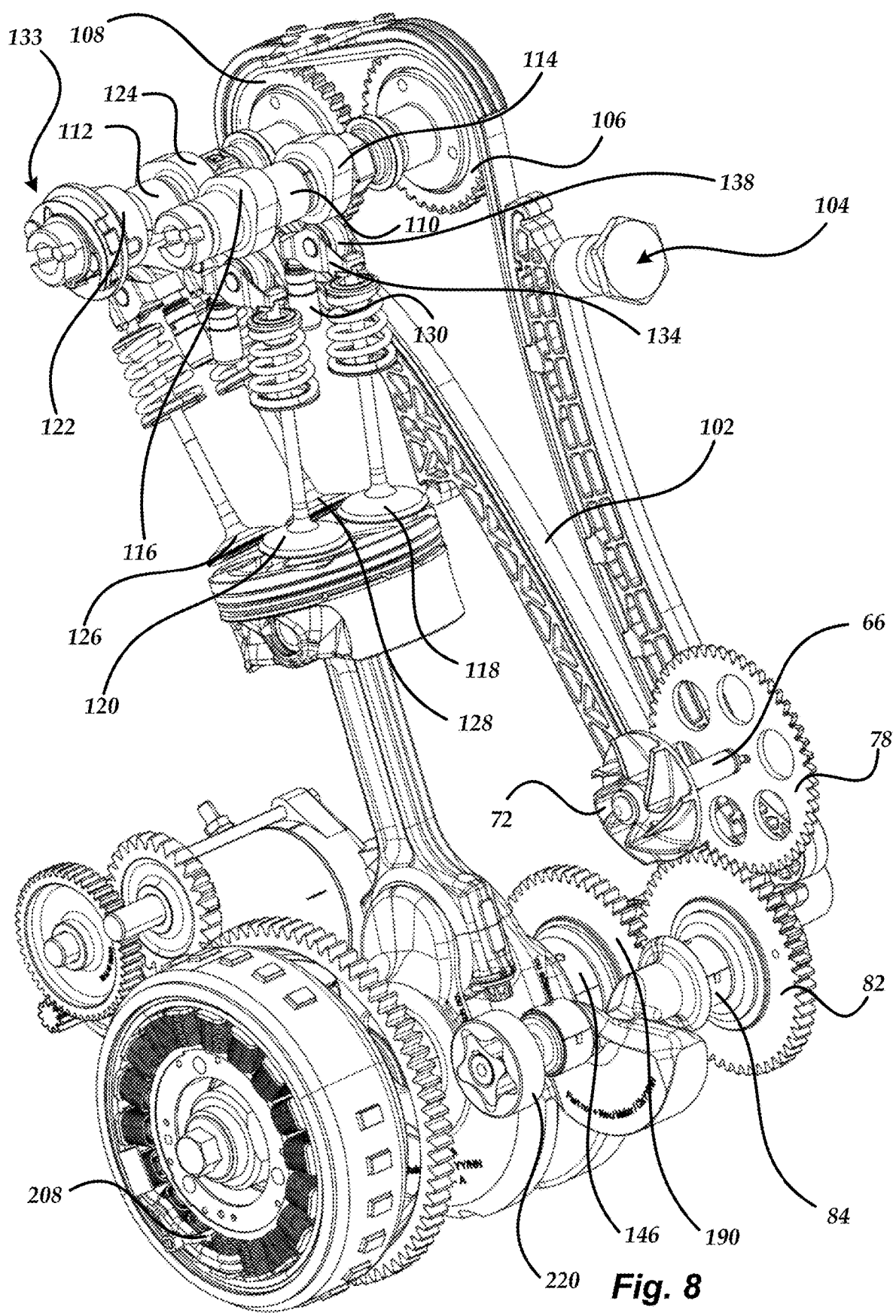
FIG. 8 is a front isometric view of internal components of the engine of FIG. 1.
Figure 42:
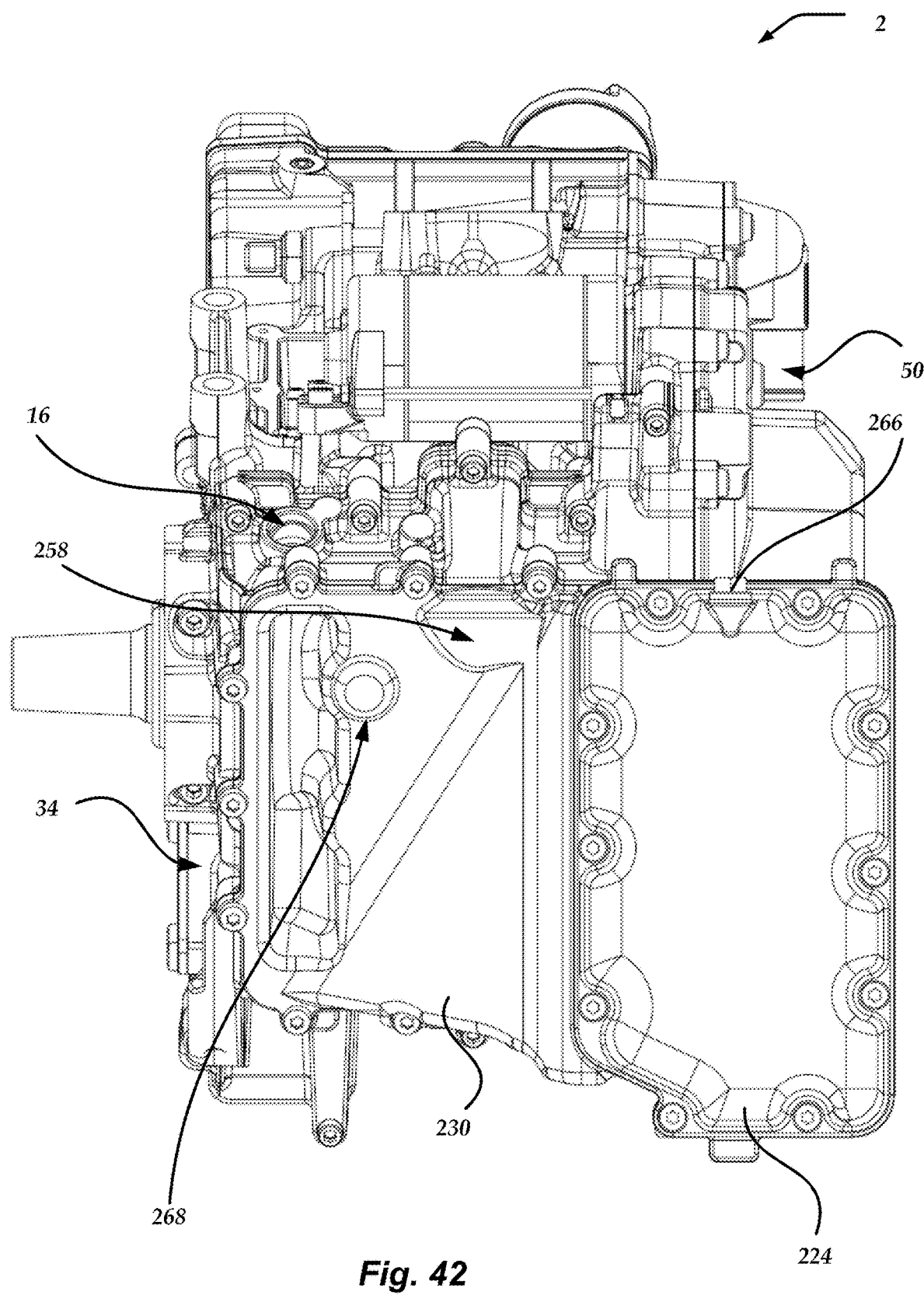
FIG. 42 is a bottom view of the engine of FIG. 1.
Figure 43:
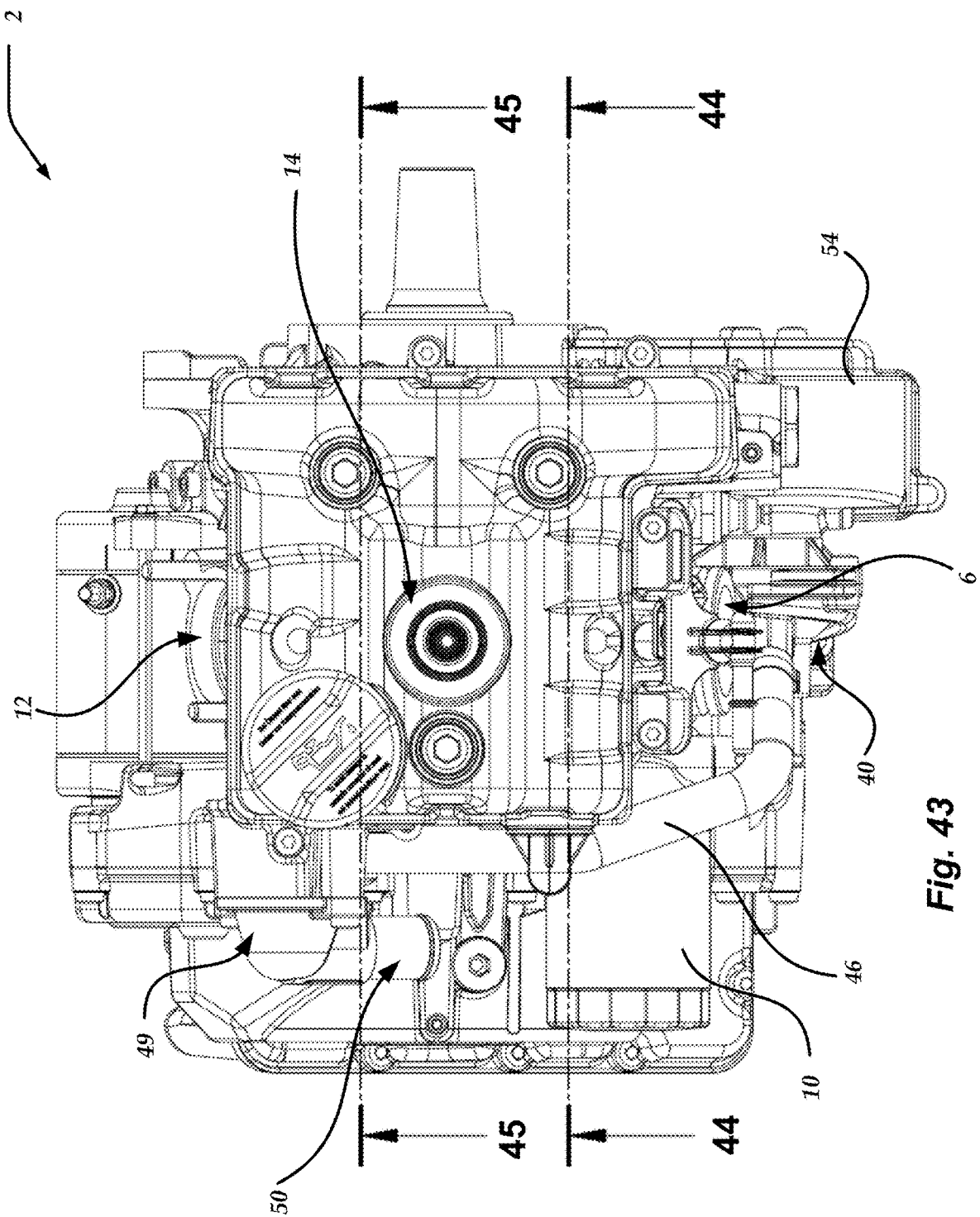
FIG. 43 is a top view of the engine of FIG. 1.
Figure 44:
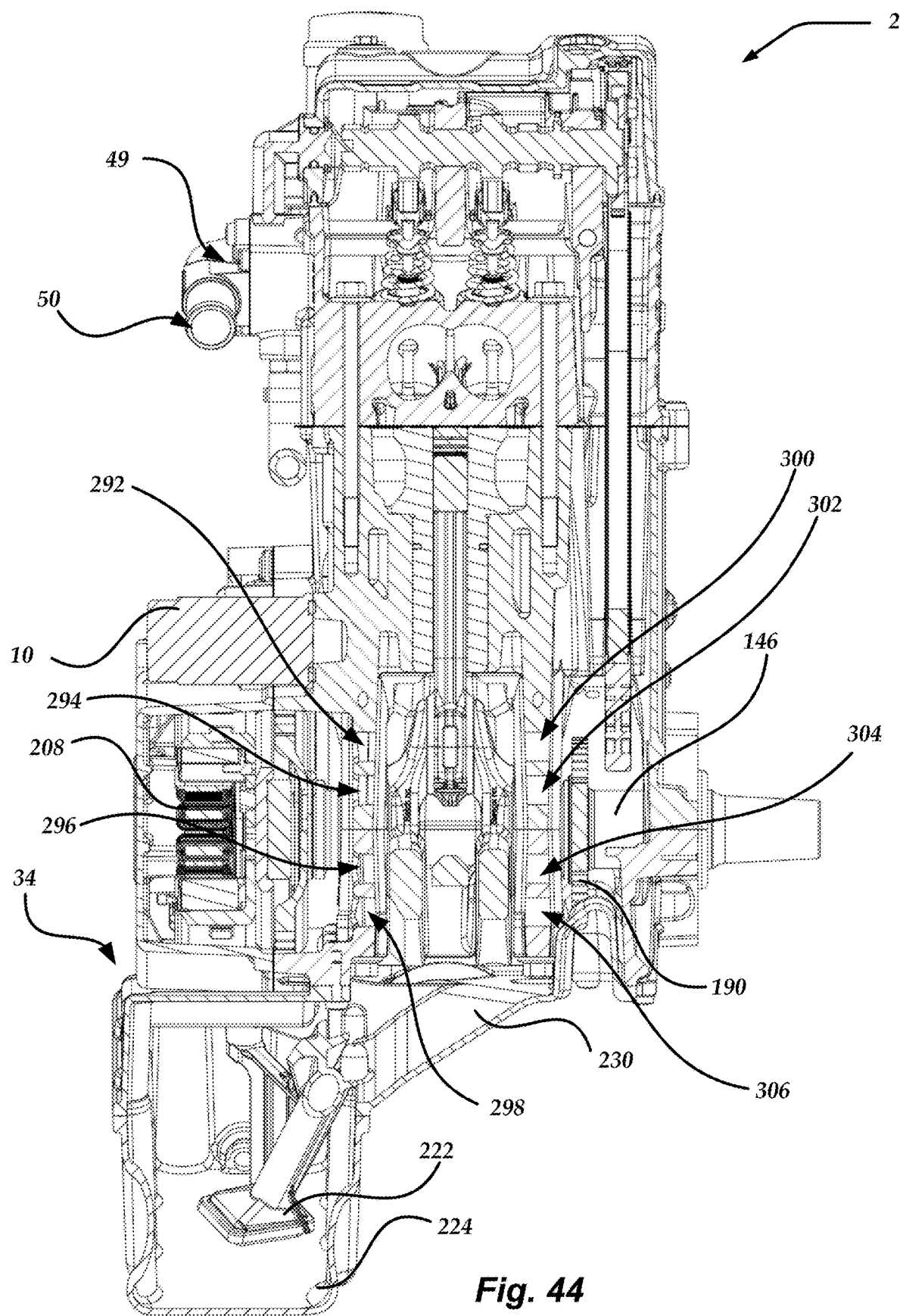
FIG. 44 is a cross-sectional view taken along line 44-44 in FIG. 43.
Figure 45:
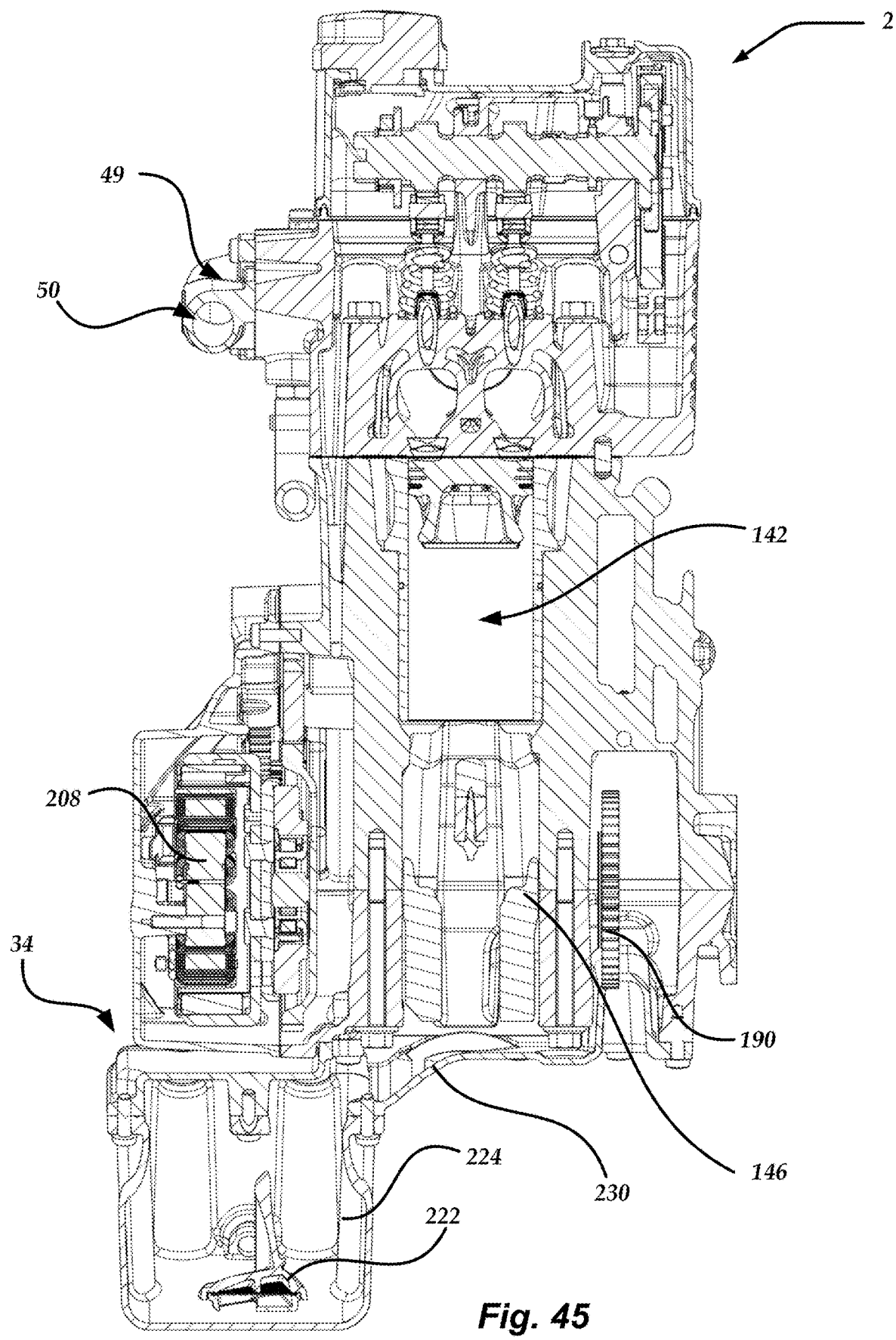
FIG. 45 is a cross-sectional view taken along line 45-45 in FIG. 43.

The terms "front," "forward," "rear," and "rearward" are defined relative to the engine 2 to orient the reader and do not limit the orientation of the engine 2 in a given application, such as a vehicle. The front side of the engine 2 is shown in FIG. 41. The terms "front" and "forward" indicate the right side of FIG. 5 or the rightward direction when viewing FIG. 5. The right side of the engine 2 is shown in FIG. 5. The terms "rear" and "rearward" indicate the left side of FIG. 28 or in the leftward direction when viewing FIG. 28. The left side of the engine 2 is shown in FIG. 28. The rear side of the engine 2 is shown in FIG. 17. The terms "height," "vertical," "upper," "lower," "above," "below," "top," "bottom," "topmost," and "bottom-most" are defined relative to the engine 2 to orient the reader and do not limit the orientation of the engine 2 in a given application, such as a vehicle. The top of the engine 2 is shown in FIG. 7. The bottom of the engine 2 is shown in FIG. 42. The term "lateral" is defined relative to the engine 2 to orient the reader and does not limit the orientation of the engine 2 in a given application, such as a vehicle. The lateral axis is defined as extending to the left and right sides of the engine 2. The term "transverse" refers to a non-parallel orientation and includes yet is not limited to a perpendicular orientation.

Figure 47:
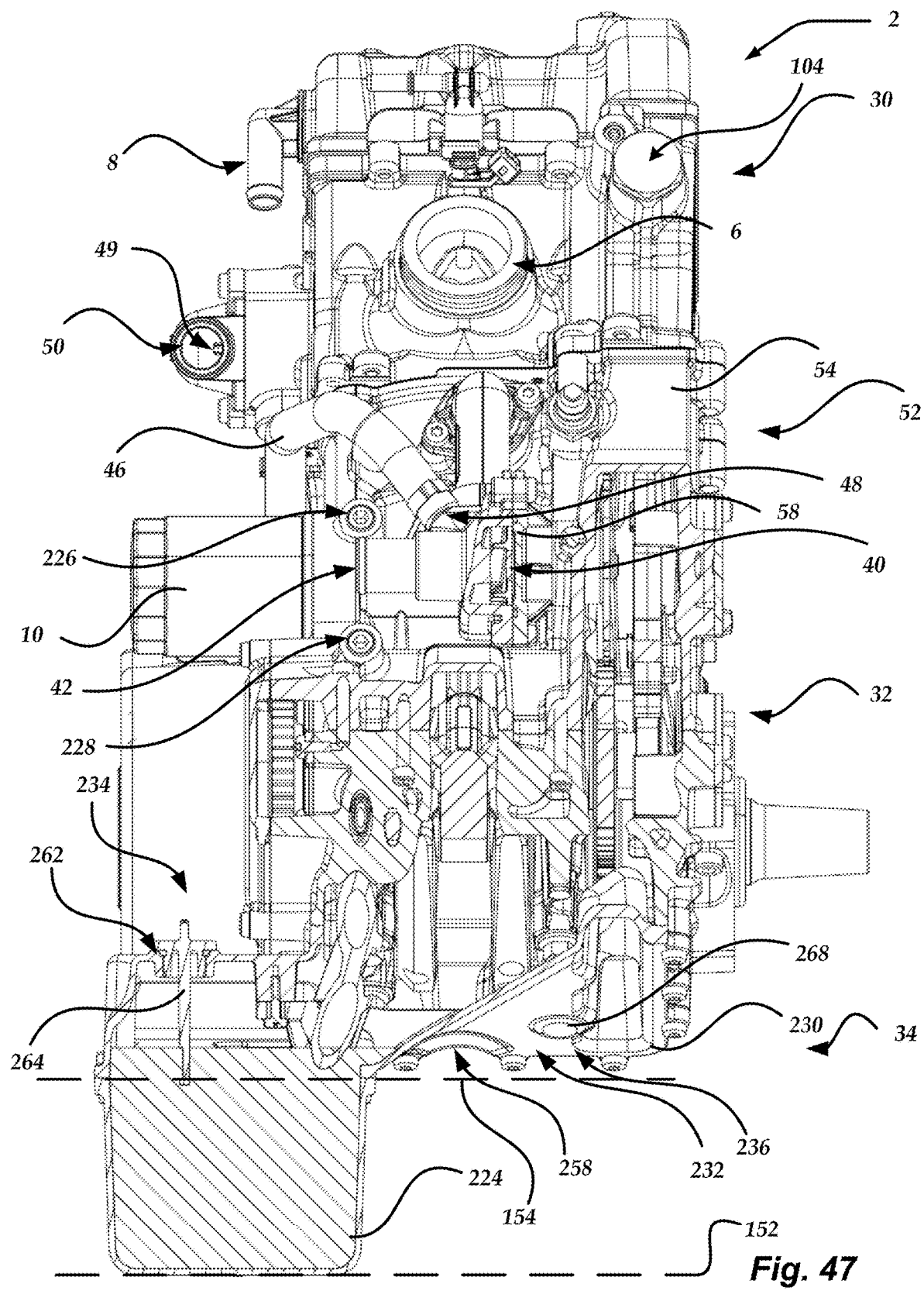
FIGS. 47-49 are cross-sectional views taken along line 46-46 in FIG. 15, with the engine containing oil.
Figure 48:
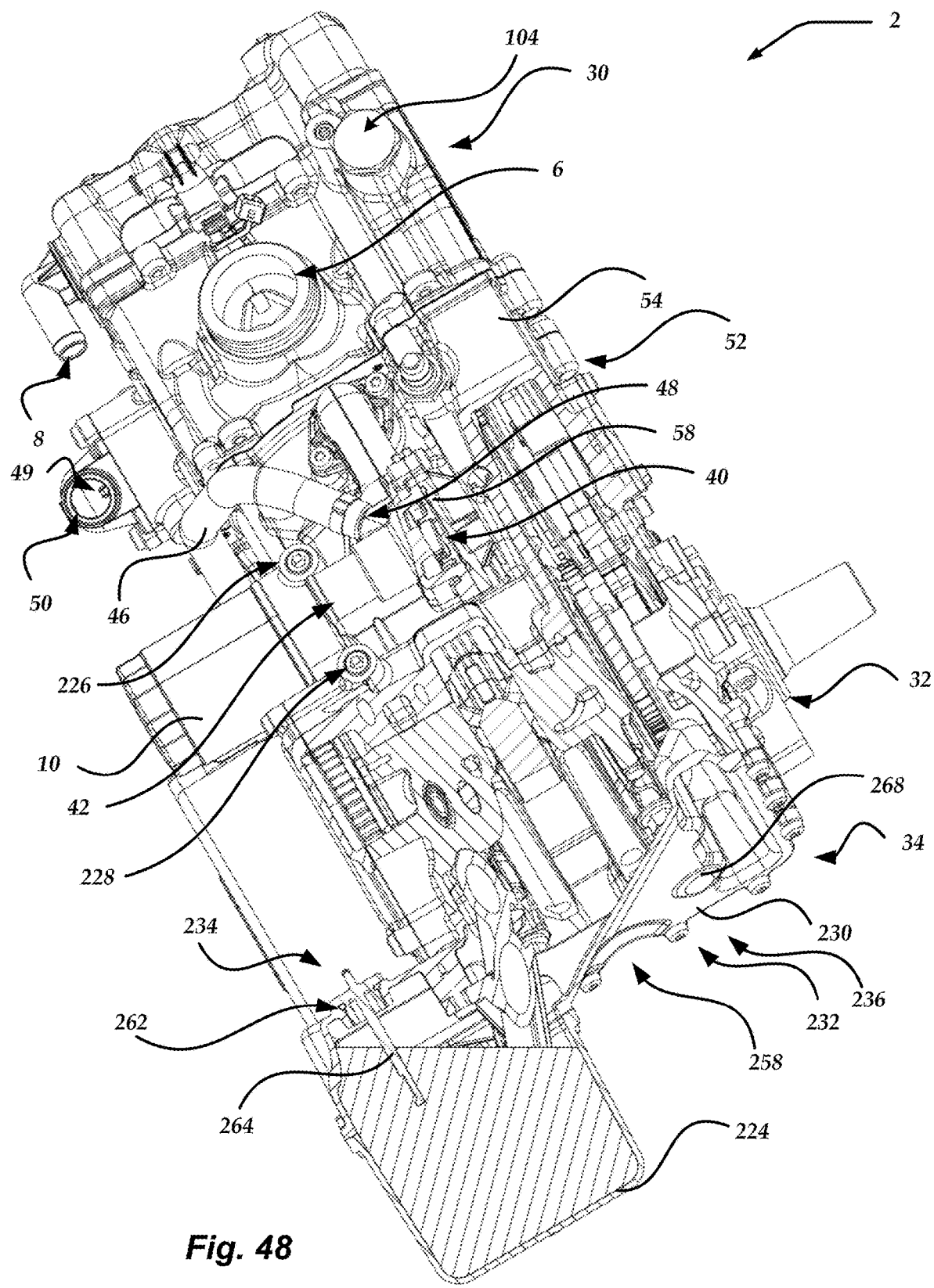
Figure 49:
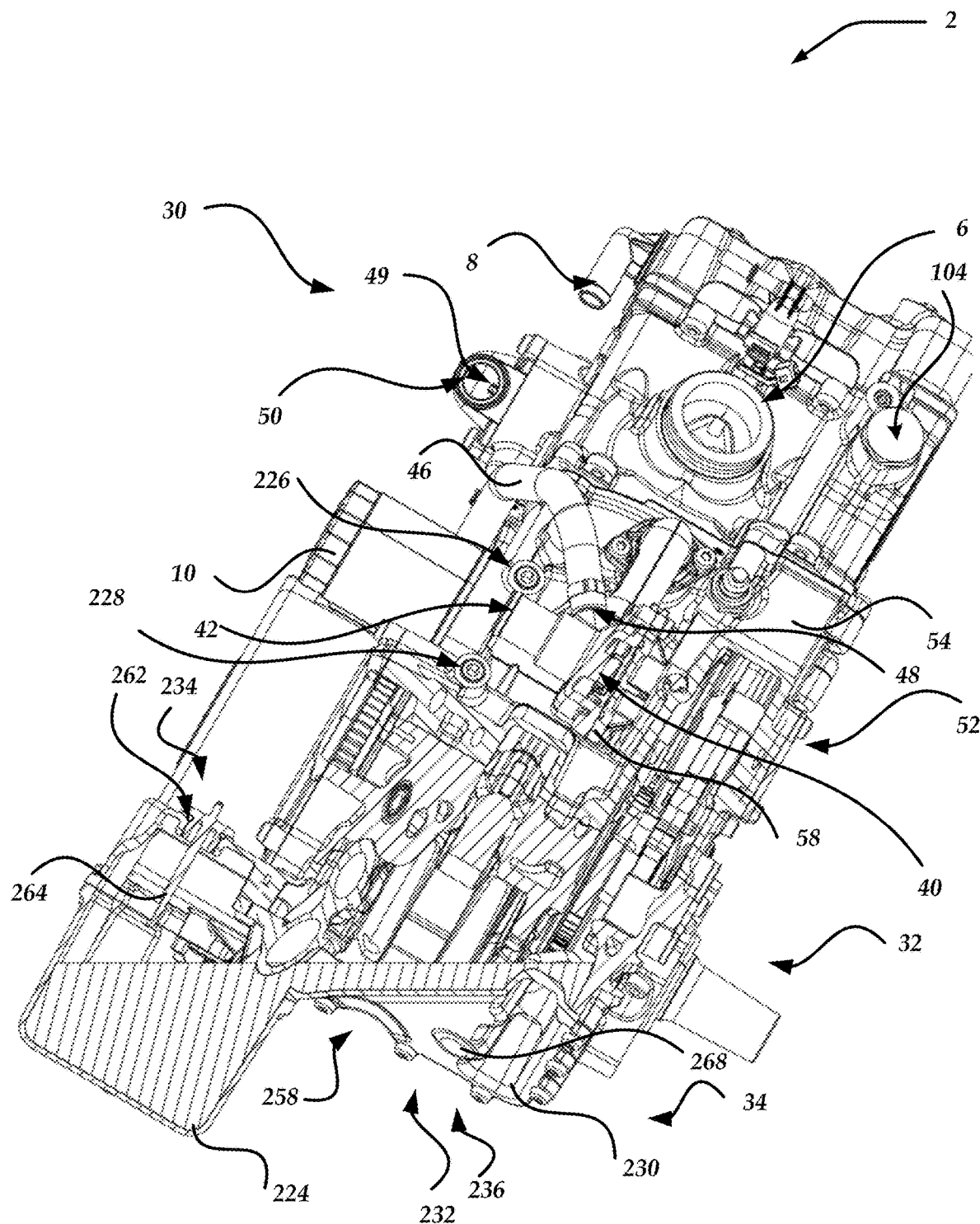
Figure 50:
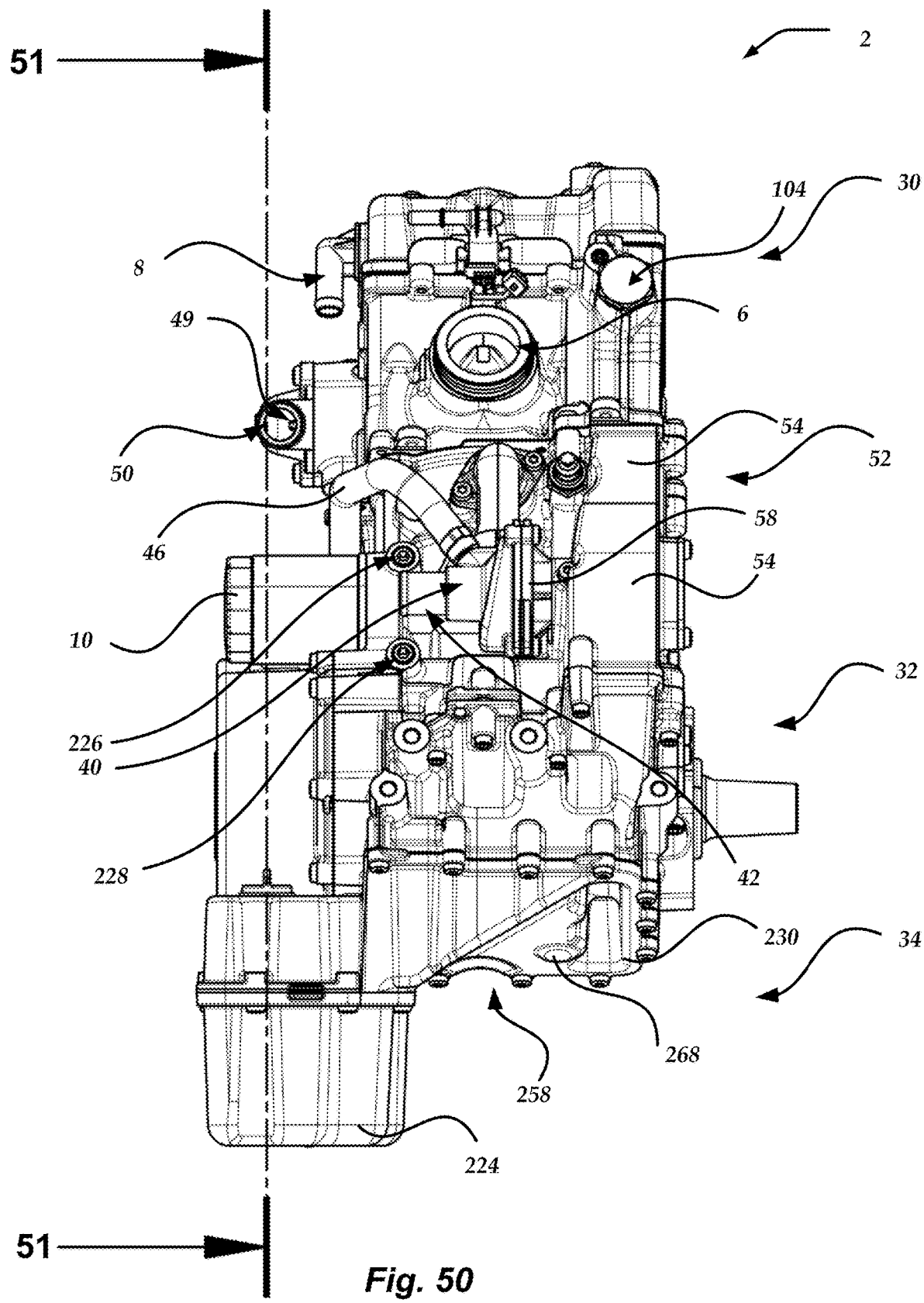
FIG. 50 is a front-side elevational view of the engine of FIG. 1.
Figure 51:
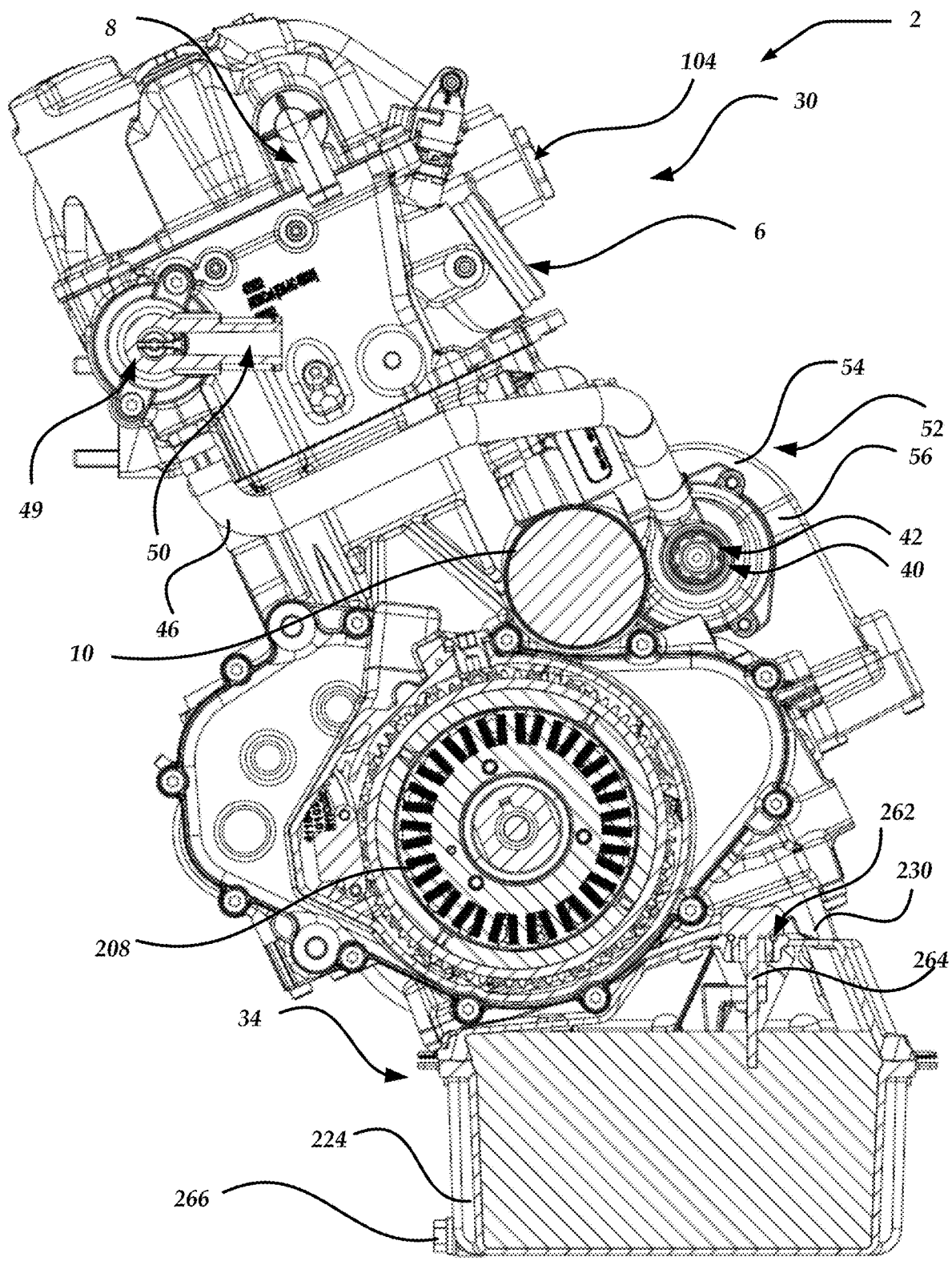
FIGS. 51-53 are cross-sectional views taken along line 51-51 in FIG. 50.
Figure 52:
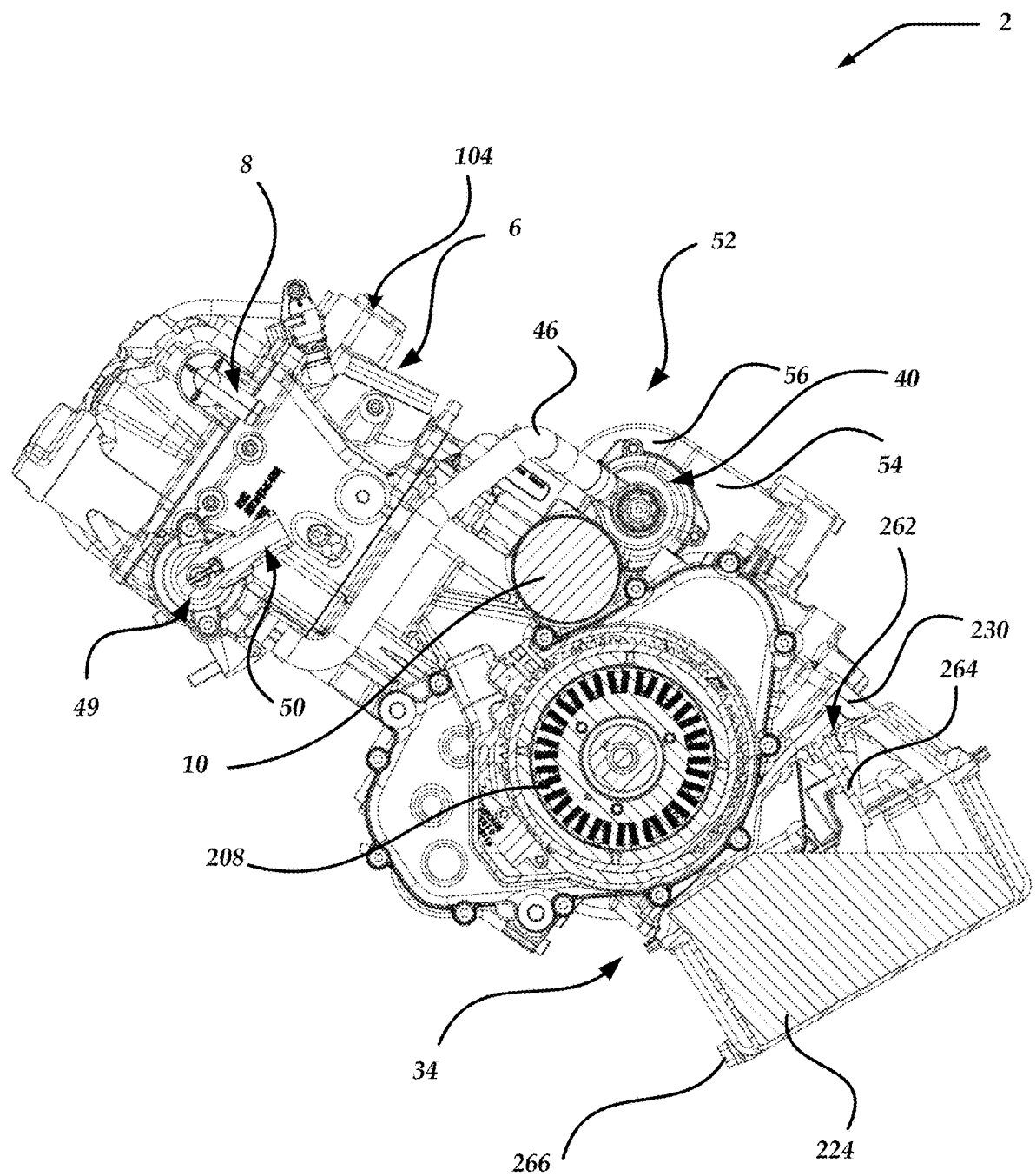
Figure 53:
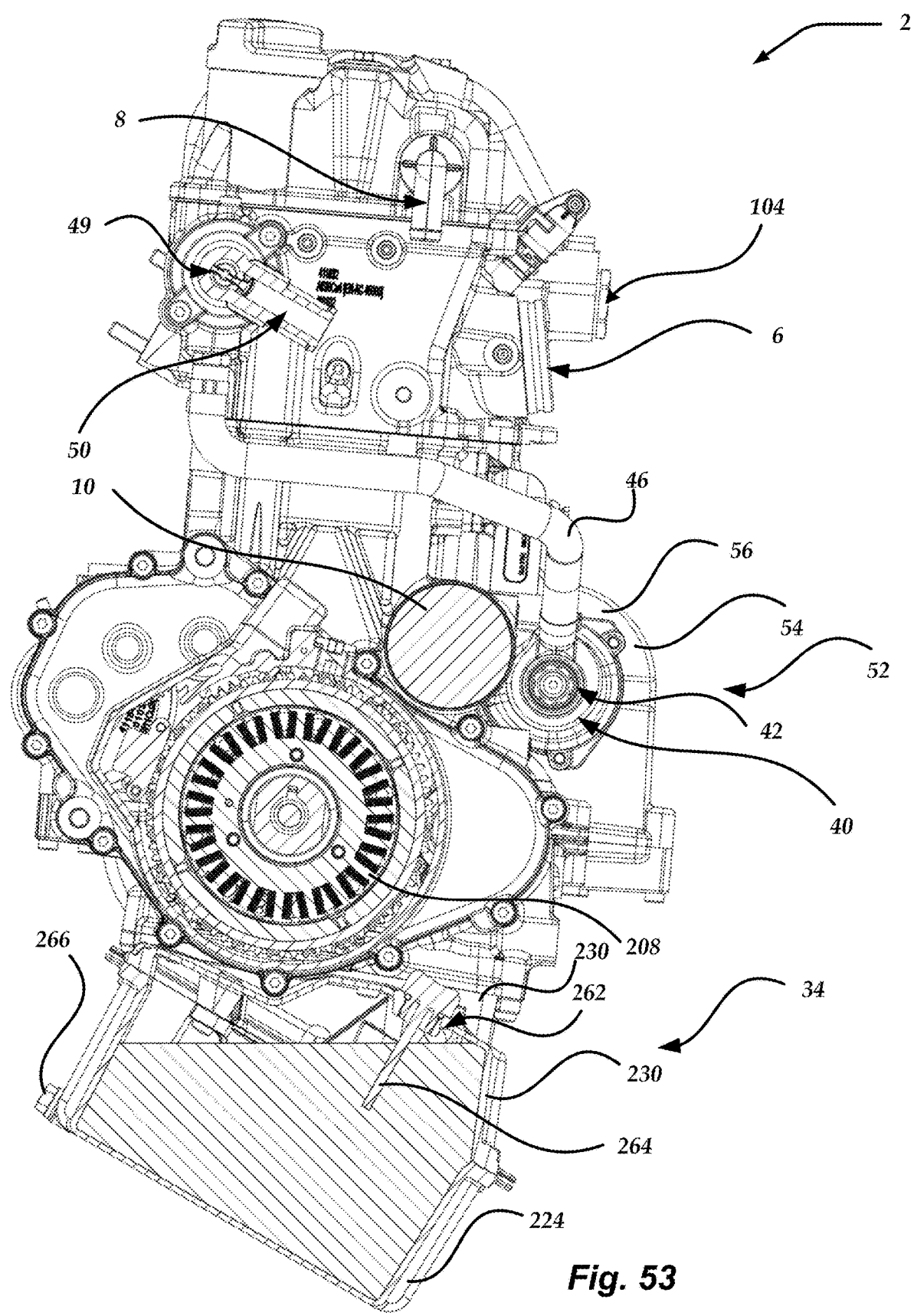

The term "in the default orientation" in the context of the engine 2 refers to an angle away from the orientation of the engine 2 when a plane 152 in which the major bottom surface of the oil pan assembly 34 lies is horizontal (see FIGS. 28 and 47) or when a plane 154 in which a split in the oil pan assembly 34 lies is horizontal (see FIGS. 28 and 47). The term "at an angle relative to the default orientation" in the context of the engine 2 refers to an angle away from the orientation of the engine 2 when a plane 152 in which the major bottom surface of the oil pan assembly 34 lies is horizontal (see FIGS. 28 and 47) or when a plane 154 in which a split in the oil pan assembly 34 lies is horizontal (see FIGS. 28 and 47). The orientation of the engine 2 when installed for a given application, such as a vehicle resting on horizontal ground, may be different than the default orientation. In some embodiments, the angle relative to the default orientation may be up to 15, 20, 25, 30, 35, 40, or more degrees.

The term "plain bearing" is used as consistently used in the art of bearings and refers to a sliding bearing (also known as a slide bearing, solid bearing, journal bearing, or friction bearing). The term "configured" refers to an element being one or more of sized, dimensioned, positioned, or oriented to achieve or provide the recited function or result.

While the preferred embodiments have been illustrated and described, as noted above, many changes can be made without departing from the spirit and scope of the invention. For example, each disclosure of a component preferably having a feature or characteristic is intended to also disclose the component as being devoid of that feature or characteristic, unless the principles of the invention clearly dictate otherwise. Accordingly, the scope of the invention is not limited by the disclosure of the preferred embodiment. Instead, the invention should be determined entirely by reference to the claims that follow. It should also be noted that the claim dependencies or combinations of elements recited in the claims does not reflect an intention to forgo claiming other subject matter disclosed herein. Instead, this disclosure is intended to also disclose the subject matter of any combination of any two or more of the claims, such that subsequent claim sets may recite that any one of the dependent claims depends from any other one or more claims, up to and including all other claims in the alternative (for example, "The engine of any one of the preceding or subsequent claims . . . "). This disclosure is also intended to disclose the subject matter of any one of the dependent claims, as if it was an independent claim, with or without all or a portion of the subject matter of the original independent claim(s) or any other subject matter disclosed herein.

We claim:
1. An engine comprising:
a water pump having a plain bearing that is supplied with pressurized oil;
a balancer shaft that drives the water pump;
an engine housing having an exterior surface; and
a spacer that defines a support surface that is spaced apart from the exterior surface of the engine housing, the water pump being coupled to the support surface and spaced apart from the exterior surface of the engine housing.

2. The engine of claim 1, wherein the water pump has a coolant return port that is coaxial with the spacer.

3. The engine of claim 1, further comprising:
a water pump drive shaft that extends through the spacer, the water pump having an impeller, the water pump drive shaft driving the impeller; and
a balancer driven gear housed in the engine housing, the balancer driven gear driving the water pump drive shaft, the balancer shaft being housed in the engine housing, the balancer shaft driving the balancer driven gear.

4. The engine of claim 1, further comprising a water pump drive shaft that extends through the spacer, the water pump having an impeller, the water pump drive shaft driving the impeller.

5. The engine of claim 1, further comprising:
a water pump drive shaft that extends through the spacer, the water pump having an impeller, the spacer having a tubular structure that defines a plain bearing, the water pump drive shaft having a proximal end portion and an opposite distal end portion coupled to the impeller, the water pump drive shaft extending through the plain bearing and driving the impeller; and a radial seal ring disposed opposite the plain bearing from the proximal end portion of the water pump drive shaft.

6. The engine of claim 5, further comprising a water pump seal disposed between the impeller and the radial seal ring.

7. The engine of claim 1, wherein the spacer includes a male spacer portion and a female spacer portion that is configured to receive the male spacer portion.

8. The engine of claim 7, wherein one of the male spacer portion or the female spacer portion is integral to the engine housing and another of the male spacer portion or the female spacer portion is separable from the engine housing.

9. The engine of claim 1, wherein the spacer includes a male spacer portion and a female spacer portion that is configured to receive the male spacer portion, the male spacer portion defining the support surface, the support surface including a flange that defines a portion of a water pump housing that houses an impeller of the water pump.

10. The engine of claim 1, wherein the engine housing includes a crankcase that defines the exterior surface, the spacer extending from the exterior surface of the crankcase.

11. The engine of claim 1, wherein the engine housing includes a gear housing that houses one or more gears, the gear housing defining the exterior surface, the spacer extending from the exterior surface of the gear housing.

12. The engine of claim 1, wherein the engine housing has a first side portion and a second side portion that is opposite the first side portion, the engine housing including a gear housing that houses one or more gears, the gear housing being disposed on the first side portion of the engine horsing, the gear housing defining the exterior surface, the exterior surface facing the second side portion of the engine housing, the spacer extending from the exterior surface of the gear housing.

13. The engine of claim 1, further comprising a timing chain, the balancer shaft driving the timing chain.

14. The engine of claim 1, further comprising a timing chain, the water pump having an impeller, the balancer shaft driving the timing chain and the impeller of the water pump.

15. The engine of claim 1, further comprising:
one or more camshafts;
a timing chain, the timing chain driving the one or more camshafts, the water pump having an impeller, the balancer shaft driving the timing chain and the impeller of the water pump;
a first intake valve; and
a second intake valve, each of the first intake valve and the second intake valve being transitionable between a respective closed configuration and a respective open configuration, each of the first intake valve and the second intake valve having a respective lift amplitude corresponding to the respective open configuration, the one or more camshafts defining the respective lift amplitudes of the first intake valve and the second intake valve, the respective lift amplitude of the first intake valve being greater than the respective lift amplitude of the second intake valve.

16. The engine of claim 1, further comprising:
a cylinder bore defining a central axis; and
a crankshaft defining a rotational axis, the rotational axis of the crankshaft extending along a plane that is parallel to the central axis of the cylinder bore, the central axis of the cylinder bore being offset from the plane.

17. The engine of claim 1, further comprising:
a cylinder bore defining a central axis;
a balancer shaft defining a rotational axis;
a crankshaft defining a rotational axis, the rotational axis of the crankshaft extending along a first plane that is parallel to the central axis of the cylinder bore, the central axis of the cylinder bore being offset from the first plane; and
a crankcase having a split that extends along a second plane, the rotational axis of the balancer shaft and the rotational axis of the crankshaft extending along the second plane.

18. The engine of claim 1, further comprising:
a cylinder bore defining a central axis, the balancer shaft defining a rotational axis, the water pump having an impeller, the balancer shaft driving the impeller of the water pump;
a crankshaft, defining a rotational axis, the rotational axis of the crankshaft, extending along a first plane that is parallel to the central axis of the cylinder bore, the central axis of the cylinder bore being offset from the first plane; and
a crankcase having a split that extends along a second plane, the rotational axis of the balancer shaft and the rotational axis of the crankshaft extending along the second plane.

19. The engine of claim 1, further comprising a monolithic crankshaft, the engine being a single-cylinder engine.

20. The engine of claim 1, further comprising a crankshaft defining a rotational axis and an oil bore that extends along the rotational axis of the crankshaft.

21. The engine of claim 1, further comprising a crankshaft defining a rotational axis and an oil bore that extends along the rotational axis of the crankshaft, the crankshaft having a bearing, the oil bore having an outlet that is spaced apart from the bearing, the oil bore providing pressurized oil from the bearing to the outlet.

22. The engine of claim 1, further comprising:
a crankshaft having a bearing;
a rotor driven by the crankshaft;
a nozzle configured to spray pressurized oil onto the rotor; and
an oil flow path that provides pressurized oil to the bearing of the crankshaft and that provides pressurized oil from the bearing of the crankshaft to the nozzle.

23. The engine of claim 1, further comprising an oil pan assembly that includes an upper oil pan portion and a lower oil pan portion, the upper oil pan portion having an open top portion and an open bottom portion, the open top portion having a closed bottom, the open bottom portion having a closed top, the lower oil pan portion being coupled to and separable from the open bottom portion of the upper oil pan portion.

24. The engine of claim 23, wherein the closed bottom of the open top portion of the upper oil pan portion has a drive shaft recess that is configured to at least partially receive a drive shaft of the vehicle.

25. The engine of claim 24, wherein the lower oil pan portion is laterally offset from the drive shaft recess and extends below the drive shaft recess.

26. The engine of claim 23, wherein the closed top of the open bottom portion of the upper oil pan portion defines a dipstick access port.

27. The engine of claim 23, wherein the open top portion of the upper oil pan portion defines a first plugged oil drain, and the lower oil pan portion defines a second plugged oil drain.

28. The engine of claim 23, wherein the lower oil pan portion has a bottom that extends along a plane, the closed bottom of the open top portion of the upper oil pan portion has a slope relative to the plane that facilitates providing oil from the open top portion of the upper oil pan portion to the lower oil pan portion.

29. The engine of claim 23, the closed bottom of the open top portion of the upper oil pan portion has a drive shaft recess that is configured to at least partially receive a drive shaft of the vehicle, the lower oil pan portion having a bottom that extends along a plane, the closed bottom of the open top portion of the upper oil pan portion having a slope relative to the plane that facilitates providing oil from the open top portion of the upper oil pan portion over the drive shaft recess to the lower oil pan portion.

30. An engine comprising:
  a water pump having a plain bearing that is supplied with pressurized oil;
  a balancer shaft that drives the water pump;
  a water pump drive shaft, the water pump having an impeller, the water pump drive shaft driving the impeller;
  an engine housing; and
  a balancer driven gear housed in the engine housing, the balancer shaft driving the balancer driven gear, the balancer driven gear driving the water pump drive shaft, the balancer shaft being housed in the engine housing, the balancer shaft driving the balancer driven gear,
  wherein the balancer driven gear is disposed in a first side of the engine housing, the water pump being coupled to a support surface that faces a second side of the engine housing that is opposite the first side of the engine housing.

31. The engine of claim 30, further comprising a spacer that defines the support surface, the engine housing having an exterior surface, the support surface of the spacer being spaced apart from the exterior surface of the engine housing, the water pump being coupled to the support surface and spaced apart from the exterior surface of the engine housing.

32. The engine of claim 30, wherein the water pump drive shaft defines a first axis of rotation, the balancer shaft defining a second axis of rotation, the first axis of rotation being offset from the second axis of rotation, the water pump drive shaft aligning with the balancer shaft when viewed in a dimension that is perpendicular to the first axis of rotation.

33. An engine comprising:
  a water pump having a plain bearing that is supplied with pressurized oil;
  a balancer shaft that drives the water pump;
  an engine housing having an exterior surface;
  a spacer that defines a support surface that is spaced apart from the exterior surface of the engine housing, the water pump being coupled to the support surface and spaced apart from the exterior surface of the engine housing;
  a water pump drive shaft that extends through the spacer, the water pump having an impeller, the spacer having a tubular structure that defines a plain hearing, the water pump drive shaft having a proximal end portion and an opposite distal end portion coupled to the impeller, the water pump drive shaft extending through the plain bearing and driving the impeller; and
  a radial seal ring disposed opposite the plain bearing from the proximal end portion of the water pump drive shaft.

34. The engine of claim 33, further comprising a compression spring that presses the radial seal ring.

35. The engine of claim 34, wherein the compression spring is disposed between the plain bearing and the impeller along the length of the water pump drive shaft.

36. The engine of claim 33, further comprising a water pump seal disposed between the impeller and the radial seal ring.

37. The engine of claim 33, wherein the water pump drive shaft defines a first axis of rotation, the balancer shaft defining a second axis of rotation, the first axis of rotation being offset from the second axis of rotation, the water pump drive shaft aligning with the balancer shaft when viewed in a dimension that is perpendicular to the first axis of rotation.

38. An engine comprising:
  a water pump having a plain bearing that is supplied with pressurized oil;
  a balancer shaft that drives the water pump;
  an engine housing having an exterior surface; and
  a spacer that defines a support surface that is spaced apart from the exterior surface of the engine housing, the water pump being coupled to the support surface and spaced apart from the exterior surface of the engine housing,
  wherein the spacer includes a male spacer portion and a female spacer portion that is configured to receive the male spacer portion,
  wherein the water pump has an impeller and a water pump drive shaft driving the impeller, the water pump drive shaft extending through the male spacer portion and the female spacer portion.

39. The engine of claim 38, wherein one of the male spacer portion or the female spacer portion is integral to the engine housing and another of the male spacer portion or the female spacer portion is separable from the engine housing.

40. The engine of claim 38; wherein the male spacer portion defines the support surface, the support surface including a flange that defines a portion of a water pump housing that houses an impeller of the water pump.

41. The engine of claim 38, further comprising a balancer driven gear housed in the engine housing, the balancer shaft driving the balancer driven gear, the balancer driven gear (hiving the water pump (hive shaft, the balancer shaft being housed in the engine housing, the balancer shaft driving the balancer driven gear, the balancer driven gear being disposed in a first side of the engine housing, the support surface facing a second side of the engine housing that is opposite the first side of the engine housing.

42. The engine of claim 38, wherein the water pump drive shaft defines a first axis of rotation, the balancer shaft defining a second axis of rotation, the first axis of rotation being offset from the second axis of rotation, the water pump drive shaft aligning with the balancer shaft when viewed in a dimension that is perpendicular to the first axis of rotation.

43. The engine of claim 30, wherein the water pump drive shaft extends through the support surface.

* * * * *